US007203431B2

United States Patent
Shoji et al.

(10) Patent No.: US 7,203,431 B2
(45) Date of Patent: Apr. 10, 2007

(54) ABNORMALITY DETERMINING METHOD, ABNORMALITY DETERMINING APPARATUS, AND IMAGE FORMING APPARATUS

(75) Inventors: Hisashi Shoji, Kanagawa (JP); Osamu Satoh, Kanagawa (JP); Masaaki Yamada, Tokyo (JP); Shuji Hirai, Tokyo (JP); Yoshinori Nakagawa, Kanagawa (JP); Tomoko Takahashi, Kanagawa (JP); Katsuaki Miyawaki, Kanagawa (JP); Takashi Seto, Kanagawa (JP); Nekka Matsuura, Kanagawa (JP); Satoshi Ouchi, Tokyo (JP); Yasushi Nakazato, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 11/020,729

(22) Filed: Dec. 27, 2004

(65) Prior Publication Data

US 2005/0157327 A1   Jul. 21, 2005

(30) Foreign Application Priority Data

Dec. 26, 2003  (JP)  ............................. 2003-432708
Feb. 10, 2004  (JP)  ............................. 2004-034055
Mar. 19, 2004  (JP)  ............................. 2004-079470

(51) Int. Cl.
G03G 15/00   (2006.01)
(52) U.S. Cl. ....................................................... 399/9
(58) Field of Classification Search ..................... 399/9
See application file for complete search history.

(56) References Cited

U.S. PATENT DOCUMENTS

2005/0157327 A1   7/2005   Shoji et al.

FOREIGN PATENT DOCUMENTS

| JP | 5-100507 | 4/1993 |
|---|---|---|
| JP | 5-100517 | 4/1993 |
| JP | 5-281809 | 10/1993 |
| JP | 7-104616 | 4/1995 |
| JP | 8-30152 | 2/1996 |
| JP | 08-137344 | 5/1996 |
| JP | 2793419 | 6/1998 |
| JP | 2000-89623 | 3/2000 |
| JP | 2000-259222 | 9/2000 |

(Continued)

OTHER PUBLICATIONS

U.S. Appl. No. 11/452,411, filed Jun. 14, 2006, Shoji et al.

(Continued)

Primary Examiner—Vincent Q. Nguyen
(74) Attorney, Agent, or Firm—Oblon, Spivak, McClelland, Maier & Neustadt, P.C.

(57) ABSTRACT

An image forming apparatus is capable of specifying the type of an occurring abnormality to a certain extent while avoiding the increasingly complicated control that is cause when a plurality of abnormalities is detected individually according to the presence of their respective causes. A normal group data set, which is a collection of normal value combination relating to grouped information constituted by a plurality of information of differing types, is stored in RAM or ROM serving as information storage device of a control unit. At least two or more sets of grouped information, including first grouped information constituted by a plurality of different types of information, and second grouped information constituted by a plurality of information in a different combination to that of the first grouped information, are obtained from the RAM, the ROM, various sensors, and an operation display unit.

7 Claims, 47 Drawing Sheets

FOREIGN PATENT DOCUMENTS

| | | |
|---|---|---|
| JP | 2000-270141 | 9/2000 |
| JP | 2001-175328 | 6/2001 |
| JP | 2001-356655 | 12/2001 |
| JP | 2002-211090 | 7/2002 |
| JP | 2002-283683 | 10/2002 |
| JP | 2004-53944 | 2/2004 |

OTHER PUBLICATIONS

U.S. Appl. No. 11/370,057, filed Mar. 8, 2006, Yamada et al.

U.S. Appl. No. 11/370,823, filed Mar. 9, 2006, Nakagawa et al.

U.S. Appl. No. 11/376,434, filed Mar. 16, 2006, Takahashi et al.

Genichi Taguchi, "Technical Developments in the MT System", Japanese Standards Association Publication, pp. 1-466, (with English Abstract).

U.S. Appl. No. 11/156,552, filed Jun. 21, 2005, Nakagawa et al.

U.S. Appl. No. 11/167,821, filed Jun. 28, 2005, Nakazato et al.

U.S. Appl. No. 11/020,729, filed Dec. 27, 2004, Shoji et al.

U.S. Appl. No. 11/124,276, filed May 9, 2005, Miyahara et al.

U.S. Appl. No. 10/875,277, filed Jun. 25, 2004, Hisashi Shoji et al.

FIG. 17

| GROUP NUMBER (i) | INFORMATION TYPE (j) | | | | |
|---|---|---|---|---|---|
| | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| ... | ... | ... | ... | ... |
| n | $y_{n1}$ | $y_{n2}$ | ... | $y_{nk}$ |
| AVERAGE ($\bar{y}$) | $\bar{y}_1$ | $\bar{y}_2$ | ... | $\bar{y}_k$ |
| STANDARD DEVIATION ($\sigma$) | $\sigma_1$ | $\sigma_2$ | ... | $\sigma_k$ |

FIG. 18

| GROUP NUMBER (i) | INFORMATION TYPE (j) | | | | |
|---|---|---|---|---|---|
| | (1) | (2) | ... | (k) | |
| 1 | $y_{11}$ | $y_{12}$ | ... | $y_{1k}$ | |
| 2 | $y_{21}$ | $y_{22}$ | ... | $y_{2k}$ | |
| ... | ... | ... | ... | ... | |
| n | $y_{n1}$ | $y_{n2}$ | ... | $y_{nk}$ | |
| AVERAGE ($\bar{y}$) | 0 | 0 | ... | 0 | |
| STANDARD DEVIATION ($\sigma$) | 1 | 1 | ... | 1 | |

FIG. 19

| INFORMATION TYPE | TYPE OF INDIVIDUAL ABNORMALITY | | |
|---|---|---|---|
| | PAPER JAM | PHOTOSENSITIVE BODY DETERIORATION | IMAGE DENSITY VARIATION |
| (1) TEMPERATURE | O | O | O |
| (2) HUMIDITY | O | O | O |
| (3) OSCILLATION | O | | |
| (4) TONER CONCENTRATION (FOR FOUR COLORS) | | | O |
| (5) UNIFORM CHARGING POTENTIAL OF PHOTOSENSITIVE BODY (FOR FOUR COLORS) | | O | O |
| (6) POTENTIAL OF PHOTOSENSITIVE BODY AFTER EXPOSURE (FOR FOUR COLORS) | | O | O |
| (7) COLORED AREA RATIO (FOR FOUR COLORS) | O | | O |
| (8) DEVELOPMENT TONER AMOUNT (FOR FOUR COLORS) | O | | O |
| (9) SLATING OF PAPER FRONT END POSITION | O | | |
| (10) PAPER DISCHARGE TIMING | O | | |
| (11) TOTAL CURRENT OF PHOTOSENSITIVE BODY (FOR FOUR COLORS) | | O | |
| (12) DRIVE POWER OF PHOTOSENSITIVE BODY (FOR FOUR COLORS) | | O | |

FIG. 20

| MAHALANOBIS DISTANCE | | | | DETERMINATION | CATEGORY OF OCCURRENCE ABNORMALITY | RESPONSE TO ABNORMALITY |
|---|---|---|---|---|---|---|
| $(D_0)^2$ | $(D_1)^2$ | $(D_2)^2$ | $(D_3)^2$ | | | |
| LESS THAN 10 | LESS THAN 10 | LESS THAN 10 | LESS THAN 10 | NORMAL | NONE | UNNECESSARY |
| | 10 OR MORE | — | — | MINOR ABNORMALITY | PAPER JAM | PERFORM MAINTENANCE CHECK ON COMPONENTS OF CONVEYANCE SYSTEM PREPARE REPLACEMENT COMPONENTS |
| | — | 10 OR MORE | — | | PHOTOSENSITIVE BODY DETERIORATION | PERFORM MAINTENANCE CHECK ON PHOTOSENSITIVE BODIES PREPARE REPLACEMENT PHOTOSENSITIVE BODY |
| | — | — | 10 OR MORE | | IMAGE DENSITY VARIATION | PREPARE REPLACEMENT DEVELOPER PERFORM MAINTENANCE CHECK ON CONCENTRATION REGULATION SYSTEM |
| 10 OR MORE | LESS THAN 10 | LESS THAN 10 | LESS THAN 10 | ABNORMAL | DIFFERENT TO ABOVE THREE CATEGORIES | PERFORM MAINTENANCE CHECK ON ENTIRE COPIER PREPARE REPLACEMENT COMPONENTS |
| | 10 OR MORE | — | — | | PAPER JAM | PREPARE REPLACEMENT COMPONENTS FOR CONVEYANCE SYSTEM CHECK FOR OTHER ABNORMALITIES |
| | — | 10 OR MORE | — | | PHOTOSENSITIVE BODY DETERIORATION | PREPARE REPLACEMENT PHOTOSENSITIVE BODY INVESTIGATE OTHER POSSIBLE CONCURRENT ABNORMALITIES |
| | — | — | 10 OR MORE | | IMAGE DENSITY VARIATION | REPLACE DEVELOPER PERFORM MAINTENANCE CHECK ON CONCENTRATION REGULATION SYSTEM INVERSE OTHER POSSIBLE CONCURRENT ABNORMALITIES |

FIG. 25

| STANDARD THRESHOLD | | |
|---|---|---|
| PAPER JAM | PHOTOSENSITIVE BODY DETERIORATION | IMAGE DENSITY VARIATION |
| 1.8 | 1.5 | 2.1 |

FIG. 26

| PROFICIENCY | THRESHOLD COEFFICIENT |
|---|---|
| LOW | 0.9 |
| MEDIUM | 1.0 |
| HIGH | 1.2 |

FIG. 27

| FAULT APPRECIATION | THRESHOLD COEFFICIENT |
|---|---|
| LOW | 1.2 |
| MEDIUM | 1.0 |
| HIGH | 0.8 |

FIG. 28

| INDUSTRY SECTOR/ DEPARTMENT | TECHNOLOGY | PRODUCTION | SALES | CLERICAL |
|---|---|---|---|---|
| MANUFACTURING | 1.1 | 1.2 | 1.2 | 1.2 |
| CONSTRUCTION | 1.0 | 1.1 | 1.0 | 1.2 |
| PRINTING | 1.0 | 1.8 | 0.9 | 1.1 |

FIG. 29

| ORDER OF OUTPUT FREQUENCY (IN ORDER OF HIGHEST FREQUENCY) | | | | THRESHOLD COEFFICIENT |
|---|---|---|---|---|
| TEXT DOCUMENT | DRAWINGS | ADVERTISING LEAFLETS | PHOTO-GRAPHS | |
| 1 | 2 | 3 | 4 | 1.00 |
| 1 | 2 | 4 | 3 | 1.05 |
| 1 | 3 | 2 | 4 | 1.05 |
| 1 | 3 | 4 | 2 | 1.15 |
| 1 | 4 | 2 | 3 | 1.15 |
| 1 | 4 | 3 | 2 | 1.20 |
| 2 | 1 | 3 | 4 | 1.05 |
| 2 | 1 | 4 | 3 | 1.10 |
| 2 | 3 | 1 | 4 | 1.15 |
| 2 | 3 | 4 | 1 | 1.30 |
| 2 | 4 | 1 | 3 | 1.25 |
| 2 | 4 | 3 | 1 | 1.35 |
| 3 | 1 | 2 | 4 | 1.15 |
| 3 | 1 | 4 | 2 | 1.25 |
| 3 | 2 | 1 | 4 | 1.20 |
| 3 | 2 | 4 | 1 | 1.35 |
| 3 | 4 | 1 | 2 | 1.40 |
| 4 | 4 | 2 | 1 | 1.45 |
| 4 | 1 | 2 | 3 | 1.30 |
| 4 | 1 | 3 | 2 | 1.35 |
| 4 | 2 | 1 | 3 | 1.35 |
| 4 | 2 | 3 | 1 | 1.45 |
| 4 | 3 | 1 | 2 | 1.45 |
| 4 | 3 | 2 | 1 | 1.50 |

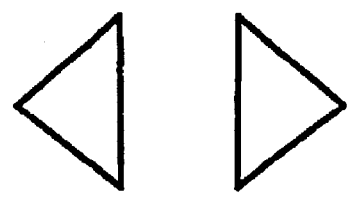
FIG. 33

FIG. 40

| DEVELOPMENT γ VALUE | | | | DEVELOPMENT STARTING VOLTAGE | | | | TONER CONCENTRATION | | | | CHARGING POTENTIAL | | | | LD DRIVE CURRENT | | | | ENVIRON-MENT | | COLORED AREA RATION | | | | OSCILLATION | | | |
|---|---|---|---|---|---|---|---|---|---|---|---|---|---|---|---|---|---|---|---|---|---|---|---|---|---|---|---|---|---|
| Bk | Y | M | O | Bk | Y | M | C | Bk | Y | M | O | Bk | Y | M | O | Bk | Y | M | C | HUMIDITY | TEMP | Bk | Y | M | O | Bk | Y | M | C |
| 1.29 | 1.41 | 1.03 | 1.58 | -7 | -19 | -17 | -1 | 3.21 | 2.75 | 2.98 | 2.94 | 620 | 900 | 580 | 860 | 656 | 660 | 664 | 664 | 27.9 | 40 | 4.08 | 0.97 | 7.73 | 4.84 | 4.59 | 5.65 | 3.12 | 4.20 |
| 2.08 | 1.09 | 1.29 | 1.26 | 3 | -33 | -22 | -23 | 3.51 | 2.28 | 2.46 | 2.56 | 680 | 700 | 640 | 640 | 664 | 640 | 652 | 652 | 27.0 | 29 | 3.74 | 1.97 | 1.96 | 1.52 | 4.81 | 5.03 | 3.18 | 4.00 |
| 1.42 | 1.72 | 1.76 | 1.23 | -11 | -7 | 1 | -30 | 3.34 | 2.10 | 2.47 | 2.63 | 620 | 960 | 580 | 900 | 654 | 664 | 652 | 648 | 28.8 | 41 | 3.73 | 1.97 | 1.94 | 1.54 | 4.28 | 4.91 | 3.06 | 3.79 |
| 1.40 | 1.49 | 1.08 | 1.39 | -20 | 20 | 31 | 17 | 3.59 | 2.25 | 2.69 | 2.57 | 600 | 960 | 700 | 900 | 680 | 664 | 640 | 648 | 28.0 | 30 | 3.72 | 1.97 | 1.94 | 1.57 | 4.57 | 4.84 | 3.20 | 3.83 |
| 1.06 | 1.14 | 1.08 | 1.18 | -11 | -27 | -29 | -25 | 3.34 | 2.13 | 2.48 | 2.40 | 720 | 880 | 700 | 840 | 636 | 644 | 640 | 648 | 28.3 | 28 | 3.72 | 1.97 | 1.95 | 1.55 | 4.31 | 5.44 | 3.08 | 4.29 |
| 1.35 | 1.25 | 1.27 | 1.25 | -17 | -31 | -26 | -26 | 3.21 | 2.01 | 2.37 | 2.37 | 640 | 840 | 640 | 840 | 652 | 652 | 640 | 652 | 28.0 | 25 | 3.72 | 1.94 | 1.95 | 1.55 | 4.11 | 5.28 | 6.95 | 11.40 |
| 1.37 | 1.48 | 1.40 | 1.31 | 17 | 18 | 18 | 21 | 3.18 | 2.27 | 2.73 | 2.78 | 620 | 600 | 660 | 800 | 636 | 660 | 648 | 648 | 28.0 | 23 | 3.72 | 2.02 | 1.98 | 1.58 | 4.14 | 5.03 | 7.85 | 7.08 |
| 1.05 | 1.00 | 1.97 | 1.17 | -16 | -30 | -39 | -33 | 2.97 | 2.39 | 2.35 | 2.43 | 660 | 740 | 800 | 800 | 640 | 632 | 648 | 652 | 28.3 | 24 | 3.74 | 2.04 | 1.99 | 1.64 | 4.26 | 4.99 | 7.84 | 7.05 |
| 1.24 | 1.33 | 1.48 | 1.05 | -12 | -24 | -20 | -6 | 3.29 | 2.13 | 2.57 | 2.31 | 620 | 700 | 590 | 800 | 648 | 640 | 644 | 656 | 28.0 | 27 | 3.73 | 2.05 | 1.97 | 1.55 | 4.28 | 4.96 | 7.81 | 7.37 |
| 1.41 | 1.38 | 1.27 | 1.49 | -27 | -22 | -23 | -11 | 3.00 | 2.08 | 2.35 | 2.43 | 660 | 620 | 540 | 820 | 658 | 656 | 652 | 660 | 28.8 | 30 | 3.73 | 2.03 | 1.95 | 1.95 | 4.75 | 5.03 | 8.73 | 7.51 |
| 1.37 | 1.14 | 1.26 | 1.41 | -2 | -28 | -14 | -14 | 3.00 | 2.15 | 2.47 | 2.43 | 600 | 680 | 840 | 820 | 664 | 652 | 652 | 656 | 28.3 | 28 | 3.72 | 2.03 | 1.95 | 1.95 | 4.22 | 5.37 | 5.12 | 7.59 |
| 1.72 | 1.34 | 1.32 | 1.17 | -13 | -25 | -23 | -29 | 3.08 | 2.32 | 2.81 | 2.83 | 680 | 920 | 840 | 960 | 660 | 656 | 652 | 648 | 28.3 | 38 | 3.72 | 2.03 | 1.99 | 1.55 | 4.47 | 5.40 | 7.40 | 7.23 |
| 1.49 | 1.11 | 2.13 | 1.19 | -13 | -25 | -23 | -24 | 3.46 | 2.50 | 2.65 | 2.81 | 800 | 700 | 860 | 860 | 680 | 640 | 644 | 648 | 28.0 | 30 | 2.71 | 2.01 | 1.64 | 1.84 | 4.44 | 5.10 | 8.38 | 6.22 |
| :: | :: | :: | :: | :: | :: | :: | :: | :: | :: | :: | :: | :: | :: | :: | :: | :: | :: | :: | :: | :: | :: | :: | :: | :: | :: | :: | :: | :: | :: |

ABNORMALITY DETERMINING METHOD, ABNORMALITY DETERMINING APPARATUS, AND IMAGE FORMING APPARATUS

BACKGROUND OF THE INVENTION

1. Field of the Invention

The present invention relates to an abnormality determining apparatus for determining the presence of an abnormality in a detection subject on the basis of stored information stored in information storage means, and a result obtained by information obtaining means for obtaining information about an object, and also to an abnormality determining method and an image forming apparatus.

2. Description of the Background Art

In an image forming apparatus such as a copier, facsimile device, or printer, maintenance is required to replace consumables (toner, for example) and components (a photosensitive body, for example), repair faults, and so on. When a fault occurs, all or a part of the functions of the device must be halted from the occurrence of the fault to the completion of repairs, causing a great time loss for the user. It is therefore desirable to predict the occurrence of a fault in the image forming apparatus, the end of the life of a component, and so on in order to provide the user with a maintenance preparation period, thereby reducing the amount of downtime. Examples of an image forming apparatus which is capable of making such predictions include the device disclosed in Japanese Unexamined Patent Application Publication H5-281809 (Prior Art 1), for example.

In the image forming apparatus disclosed in this Prior Art 1, driving load information regarding a driving source is detected, and early detection of an abnormality in the driving system is performed by comparing the detection result with a standard value. According to this constitution, by detecting an abnormality in the driving system before a fault occurs, a user can be provided with a preparation period to prepare for maintenance to the driving system.

A Mahalanobis Taguchi System, described in the Japanese Standards Association publication "Technical Developments in the MT System" by Genichi TAGUCHI (Prior Art 2), is known as a method of measuring the degree of normality in the state of an object. This MTS method measures the degree of normality in the state of an object in the following manner. First, a plurality of combined normal values relating to a group of information comprising a plurality of types of information indicating the state of a detection subject is obtained, and a normal group data set is constructed therefrom. To take a medical examination as an example, first combined normal values comprising the gender, various blood test results, height, weight, and so on of a healthy person are obtained in advance from a plurality of healthy people, and a normal group data set is constructed therefrom. Next, a multidimensional space is constructed on the basis of the normal group data set. The Mahalanobis distance, which indicates the position of the grouped information obtained from the detection subject in this multidimensional space, is then determined, and an evaluation is performed to determine the degree of similarity between the grouped information for the detection subject and the normal group data set. According to this MTS method, the degree of normality of the detection subject can be determined comprehensively on the basis of the correlation among the various information.

The image forming apparatus disclosed in the aforementioned Prior Art 1 detects in particular driving system abnormalities caused by an excessive load being placed on the driving source. Abnormalities in the driving system may have numerous other causes. Any abnormality can be detected by monitoring the presence of its cause. However, if the presence of the cause of each abnormality is monitored and detected individually, the control required for this monitoring becomes extremely complicated, and as the number of types of abnormality to be detected increases, the control becomes ever more complicated.

Hence the present inventors are currently developing a novel image forming apparatus which is used to determine an abnormality by determining the Mahalanobis distance according to the aforementioned MTS method, on the basis of a normal group data set stored in information storage means and the results obtained by sensors and the like of a plurality of types of information. According to this image forming apparatus, the degree of normality is evaluated on the basis of a Mahalanobis distance determined from a plurality of types of information relating to various abnormalities, rather than detecting a plurality of abnormalities individually according to the presence of their respective causes, and hence the occurrence of these abnormalities can be detected comprehensively. In so doing, the complicated control required to detect a plurality of abnormalities individually according to the presence of their respective causes can be avoided.

However, since this image forming apparatus detects the occurrence of various abnormalities comprehensively by perceiving the degree to which the apparatus has deviated from a normal state, it is difficult to specify the type of the abnormality. As a result, the maintenance response following the detection of the abnormality becomes complicated.

Further, a remote fault diagnosing system is installed in the image forming apparatus disclosed in the aforementioned Prior Art 1. In this remote fault diagnosing system, basic diagnosis data transmitted from a plurality of image forming apparatuses serving as diagnosis subjects are received in a central diagnosing apparatus, and various abnormalities in the individual image forming apparatuses are diagnosed on the basis of these basic data. These various abnormalities include a paper feeding abnormality, an image quality abnormality, and so on. By diagnosing the various abnormalities respectively, a fault in the paper feeding system or image forming system caused by the progression of the diagnosed abnormality can be predicted before its occurrence. Moreover, when diagnosing the various abnormalities, the remote fault diagnosing system takes into account the proficiency of the user of the image forming apparatus and the degree of perception of the fault. This is due to the following reason.

For example, a user who is highly conversant with the image forming apparatus may be able to repair a fault in the image forming apparatus that a general user could not repair. In such a case, the user would not contact a repair service organization to request repairs. If a serviceperson is dispatched nevertheless due to the prediction of the occurrence of the fault, the resulting wasted labor would lead to an increase in service costs. Moreover, depending on the type of fault, each user has a widely differing perception thereof. For example, one-user may suspect a fault in the paper feeding system even when a paper jam occurs rarely, whereas another user may not suspect a fault in the paper feeding system even when paper jams occur comparatively frequently. In the case of the latter user, repair requests are rarely made, even if a serviceperson is dispatched at the stage when the abnormality in the paper feeding system has barely begun to occur. This manner of dispatch also leads to an increase in service costs. Hence by taking into account the proficiency and degree of fault perception of the user, abnormality diagnosis which is suited to each individual user is performed, leading to a reduction in service costs. Note that as a result of dedicated research, the present inventors have discovered that, from among various abnormalities, the degree of perception of each user varies particularly widely in regard to an abnormality in the image quality.

This remote fault diagnosing system diagnoses each of a plurality of abnormalities occurring in the diagnosis subject image forming apparatus individually. Hence as the number of types of abnormality to be diagnosed increases, the calculation amount required for the diagnosis increases, making control more complicated. Moreover, providing the user with a preparation period required to prepare for maintenance in order to reduce downtime is desirable not only in an image forming apparatus, but in various other apparatuses such as manufacturing devices and electric appliances.

Hence the present inventors are currently developing a novel abnormality determining apparatus in which various abnormalities in a detection subject such as an image forming apparatus are determined comprehensively as a single general abnormality, rather than individually. The presence of the general abnormality is determined on the basis of the aforementioned Mahalanobis distance, for example. According to the abnormality determining apparatus constituted in this manner, when at least one of the various abnormalities occurs, the general abnormality is determined comprehensively as "abnormality present", and thus increasingly complicated control due to an increase in the number of types of abnormality in the determination-subject can be suppressed.

However, when the general abnormality is determined as "present" using a method of perceiving the degree of deviation from a normal state, as with the Mahalanobis distance, rather than perceiving the presence of individual abnormalities, it is difficult to specify the type of abnormality that has occurred from among all of the abnormalities that may be incorporated into the general abnormality. As a result, the maintenance response following a determination of "general abnormality present" becomes complicated.

Furthermore, the abnormality determining apparatus is unable to determine various abnormalities in consideration of the user's proficiency and degree of fault perception. As a result, even when an attempt is made to specify the type of the abnormality that has occurred, the abnormality determination precision is not always suited to the user, and depending on the user, abnormalities may be detected unnecessarily, the detection timing may be too late, and so on.

In an image forming apparatus disclosed in Japanese Unexamined Patent Application Publication H05-100517 (Prior Art 3), the life of a photosensitive body is predicted by monitoring the potential state of the photosensitive body. More specifically, forecasts are made regarding faults in and the lifetime of limited locations within the system that monitors this information. This is an important process in itself, but with this method, although it is possible to determine abnormalities in the monitored locations, it is not possible to predict device problems having multiple causes. Particularly in this case of an electrophotographic image forming apparatus, balance is maintained over the entire apparatus by means of control in which process parameters are moved as a whole through process control, and hence it is impossible to determine abnormalities simply by monitoring a single piece of information.

Further, in an image forming apparatus disclosed in Japanese Unexamined Patent Application Publication H08-137344 (Prior Art 4), the state of the image forming apparatus is determined by detecting a check pattern on a photosensitive body to determine whether or not the image thereof is normal. With this method, abnormalities on the upstream side of the image forming operation, including the photosensitive body, can be determined in composite, but abnormalities on the downstream side cannot be determined at all.

Meanwhile, it is also possible to obtain a plurality of types of information expressing the state of an image forming apparatus, calculate a single index value from the plurality of types of information, and determine a change of state in the image forming apparatus on the basis of temporal variation data of the index value. With this method, if information is obtained in advance for each location of the apparatus as the plurality of types of information, the overall operational state of the apparatus can be monitored at all times. Further, when the plurality of types of information varies as a whole, the apparatus can be determined as normal if the information varies as a whole while maintaining a normal balance, and determined as abnormal if not. The important point of this state determining method is that "a calculation parameter for calculating an index value is determined using only a plurality of types of data gathered when the image forming apparatus is in a normal state". The calculation parameter is a reference expressing a normal state, whereas the index value, which is calculated after the calculation parameter is fixed using temporal momentary data (or the average data of a fixed time period), has a characteristic whereby it becomes larger as the image forming apparatus moves further from a normal state. Thus the location of the image forming apparatus which is moving toward an abnormality can be determined.

A problem which arises at this time is "when should the calculation parameter be fixed?". In such a determination, it is presumed that a normal data set obtained in a factory environment prior to shipping, for example, would be insufficient. This is because an actual usage environment on the market is considered to differ from a factory environment, and hence, by obtaining a large number of normal data sets in the actual usage environment, the calculation parameter can be determined appropriately for the actual usage conditions in the customer location. At this time, a device or system is required to determine whether or not the image forming apparatus is in a normal state. The calculation parameter is defined originally to determine the state of a device, but the normal state of the device must be ensured using other means until the calculation parameter is fixed.

SUMMARY OF THE INVENTION

The present invention has been designed in consideration of the background described above, and it is a first object thereof to provide an abnormality determining method which is capable of specifying the type of an occurring abnormality to a certain extent while avoiding the increasingly complicated control that is caused when a plurality of abnormalities is detected individually according to the presence of the respective causes thereof, as well as an abnormality determining apparatus, and an image forming apparatus.

A second object of the present invention is to provide an abnormality determining method and abnormality determining apparatus which are capable of determining the presence of an abnormality with a precision suited to each individual user, while suppressing increasingly complicated control occurring when various abnormalities are determined individually and an increasingly complicated maintenance response following a determination.

A third object of the present invention is to provide an abnormality determining method and abnormality determining apparatus which are capable of determining a calculation parameter at an arbitrary timing after a plurality of types of information has been obtained continuously over time on the market, and thereby determine an element which is approaching an abnormal state.

An abnormality determining method of the present invention comprises an information storing step for storing information about an object in an information storage device; an information obtaining step for obtaining information about an object using information obtaining device; and a determining step for determining the presence of an abnormality in a detection subject on the basis of the stored information in the information storage means and the obtained information obtained by the information obtaining device. In the information storing step, a normal group data set, which is a collection of normal value combinations of grouped information constituted by a plurality of different types of information, is stored in the information storage device. In the information obtaining step, at least two or more sets of grouped information, comprising first grouped information constituted by a plurality of different types of information and second grouped information having a different combination to that of the first grouped information, are obtained by the information obtaining device. In the determining step, a Mahalanobis distance is determined for each set of grouped information on the basis of the normal group data set and the obtained results of each set of grouped information, and used to determine the presence of an abnormality in the detection subject.

An abnormality determining apparatus of the present invention comprises an information storage device for storing information about an object; an information obtaining device for obtaining information about an object; and a determining device for determining the presence of an abnormality in a detection subject on the basis of the stored information in the information storage device and the obtained results obtained by the information obtaining device. A normal group data set, which is a collection of normal value combinations of grouped information constituted by a plurality of different types of information, is stored in the information storage device. At least two or more sets of grouped information, comprising first grouped information constituted by a plurality of different types of information and second grouped information constituted by a plurality of information in a different combination to that of the first grouped information, are obtained by the information obtaining device. The determining device determines a Mahalanobis distance for each set of grouped information on the basis of the normal group data set and the obtained results of each set of grouped information, and uses the Mahalanobis distance to determine the presence of an abnormality in the detection subject.

An image forming apparatus of the present invention comprises an image forming device for forming an image on a recording medium; and an abnormality determining apparatus for determining the presence of an abnormality in said image forming apparatus. The abnormality determining apparatus comprises an information storage device for storing information about an object; an information obtaining device for obtaining information about an object; and a determining device for determining the presence of an abnormality in a detection subject on the basis of the stored information stored in the information storage device and the obtained results obtained by the information obtaining device. A normal group data set serving as a collection of normal value combinations of grouped information constituted by a plurality of different types of information is stored in the information storage means. At least two or more sets of grouped information, comprising first grouped information constituted by a plurality of different types of information and second grouped information constituted by a plurality of information in a different combination to that of the first grouped information, are obtained by the information obtaining device. The determining device determines a Mahalanobis distance for each set of grouped information on the basis of the normal group data set and the obtained results of each set of grouped information, and uses the Mahalanobis distance to determine the presence of an abnormality in the detection subject.

An abnormality determining method of the present invention comprises an information obtaining step for obtaining information about an object using an information obtaining device; a determining step for determining the presence of an abnormality in a detection subject on the basis of the obtained information obtained by the information obtaining device; a calculating step for performing a predetermined calculation on the basis of the obtained information obtained by the information obtaining device in the determining step; and a comparing step for comparing the calculation result of the calculating step to a predetermined threshold, an abnormality being determined to be present when, in the comparing step, the calculation result has reached the threshold, exceeds said threshold, or falls below the threshold. The determining step includes a general abnormality determining step for determining the presence of a general abnormality, which is capable of incorporating a plurality of types of abnormality, by comparing one of the calculation results obtained on the basis of a plurality of types of the obtained information to the threshold, and an individual abnormality determining step for determining, only when the general abnormality is determined as present in the general abnormality determining step, the presence of one of a plurality of types of abnormality that can be incorporated into the general abnormality by comparing one of the calculation results obtained on the basis of at least one of the plurality of types of obtained information to the threshold. Initial setting is performed on at least one of a plurality of the thresholds, used individually in each of the individual abnormality determining steps, in accordance with information regarding a user of the detection subject.

An abnormality determining apparatus of the present invention comprises an information obtaining device for obtaining information about an object; and a determining device for implementing a predetermined calculation on the basis of the information obtained by the information obtaining device, and determining the presence of an abnormality in a detection subject as present when the result of the calculation has reached a predetermined threshold, exceeds said threshold, or falls below the threshold. The determining device is constituted to determine the presence of a general abnormality, which is capable of incorporating a plurality of types of abnormality, by comparing one of the calculation results obtained on the basis of a plurality of types of the obtained information to the threshold, and implement processing to determine individually the presence of one of a plurality of types of abnormality that can be incorporated into the general abnormality for each type of abnormality, only when the general abnormality is determined as present, by comparing one of the calculation results obtained on the basis of at least one of said plurality of types of obtained information to the threshold.

An abnormality determining apparatus of the present invention comprises an information obtaining device for obtaining information about an object; and a determining deviced for implementing a predetermined calculation on the basis of the information obtained by the information obtaining device, and determining an abnormality in a detection subject as present when the result of the calculation has reached a predetermined threshold, exceeds the threshold, or falls below the threshold. The determining device is constituted to determine the presence of a general abnormality, which is capable of incorporating a plurality of types of abnormality, by comparing one of the calculation results obtained on the basis of a plurality of types of the obtained information to the threshold, and implement processing to determine individually the presence of one of a plurality of types of abnormality that can be incorporated into the general abnormality for each type of abnormality, only when the general abnormality is determined as present, by comparing one of the calculation results obtained on the basis of at least one of the plurality of types of obtained information to the threshold.

A state determining apparatus of the present invention comprises an information obtaining device for obtaining a plurality of types of information relating to an operation of a subject device; an index value calculating device for calculating a single index value from the obtained plurality of information; and a determining device for determining a state of the subject device using the calculated index value. A calculation parameter for calculating the index value is determined on the basis of said plurality of types of information obtained during a normal operation of the subject device. The information obtaining device gathers the plurality of types of information, from which the calculation parameter is derived, continuously during a normal operation when the subject device has been shipped onto the market.

An image forming apparatus for forming a visible image on a recording medium on the basis of inputted image information in accordance with the present invention comprises an information obtaining device for obtaining a plurality of types of information relating to an operation of the image forming apparatus; an index value calculating device for calculating a single index value from the obtained plurality of information; a determining device for determining a state of the image forming apparatus using the calculated index value; and a state determining apparatus for gathering the plurality of types of information continuously during a normal operation when the image forming apparatus has been shipped onto the market, and determining a calculation parameter for calculating the index value on the basis of the plurality of types of information obtained during a normal operation of the image forming apparatus.

An image quality detecting apparatus of the present invention is provided detachably on an image forming apparatus, for detecting an image quality of an image on a sheet of paper formed with said image, which is discharged from the image forming apparatus and introduced into the image quality detecting apparatus. The image quality detecting apparatus comprises a paper discharge tray on which paper discharged from the image forming apparatus is stacked; a collection unit for collecting paper on which image quality detection is complete; a switching device for switching a paper conveyance direction between the paper discharge tray and the collection unit; and an image quality detecting device for detecting the image quality of an image formed on a sheet of paper conveyed to the collection unit side.

A state determining apparatus of the present invention comprises an information obtaining device for obtaining a plurality of types of information relating to an operation of an image forming apparatus serving as a subject device; an index value calculating device for calculating a single index value from the obtained plurality of information; and a determining device for determining a state of the image forming apparatus using the calculated index value. A calculation parameter for calculating the index value is determined on the basis of the the plurality of types of information obtained during a normal operation of the image forming apparatus, and an image quality detecting device for detecting an image quality of an output image to determine whether or not the image forming apparatus is operating normally on the market are provided separately to and detachably from a main body of the image forming apparatus. The image quality detecting device is removed from the image forming apparatus after a preset time period has elapsed.

BRIEF DESCRIPTION OF THE DRAWINGS

The above and other objects, features, and advantages of the present invention will become more apparent from the following detailed description taken with the accompanying drawings, in which:

FIG. 17 is an obtained data table illustrating a normal data obtaining process;

FIG. 18 is a normalized data table constructed on the basis of the obtained data table;

FIG. 19 is a table showing an example of a relationship between categories of abnormality types in the copier of this embodiment, and the grouped information required to determine the presence of the abnormalities within these categories;

FIG. 20 is a table showing an example of a relationship between each category and a Mahalanobis distance;

FIG. 25 is a table showing an example of a standard threshold for three thresholds relating to a paper jam, deterioration of a photosensitive body, and variation in image density in the second embodiment;

FIG. 26 is a table showing an example of a relationship between a user proficiency level and a threshold coefficient;

FIG. 27 is a table showing an example of a relationship between a fault perception level, serving as user information, and the threshold coefficient;

FIG. 28 is a table showing a relationship between the user type, the department, and the threshold coefficient;

FIG. 29 is a table showing a relationship between an output image type, an output frequency, and the threshold coefficient;

FIG. 33 is a pattern diagram showing an example of a display screen displayed on an operation display unit of the copier when function restriction has been performed by function restricting means;

FIG. 40 is a table showing a part of multiple types of data gathered from a copier of the third embodiment;

DESCRIPTION OF THE PREFERRED EMBODIMENTS

Embodiments of the present invention will be described in detail below. Note that in each embodiment, examples in which an electrophotographic copier (to be referred to simply as "copier" hereafter) serves as an image forming apparatus will be described.

First Embodiment

The first embodiment mainly serves to achieve the aforementioned first object of the present invention.

First, before describing an abnormality determining apparatus to which the first embodiment is applied, an example of an image forming apparatus serving as the detection subject of the abnormality determining apparatus will be described.

Figure 1:
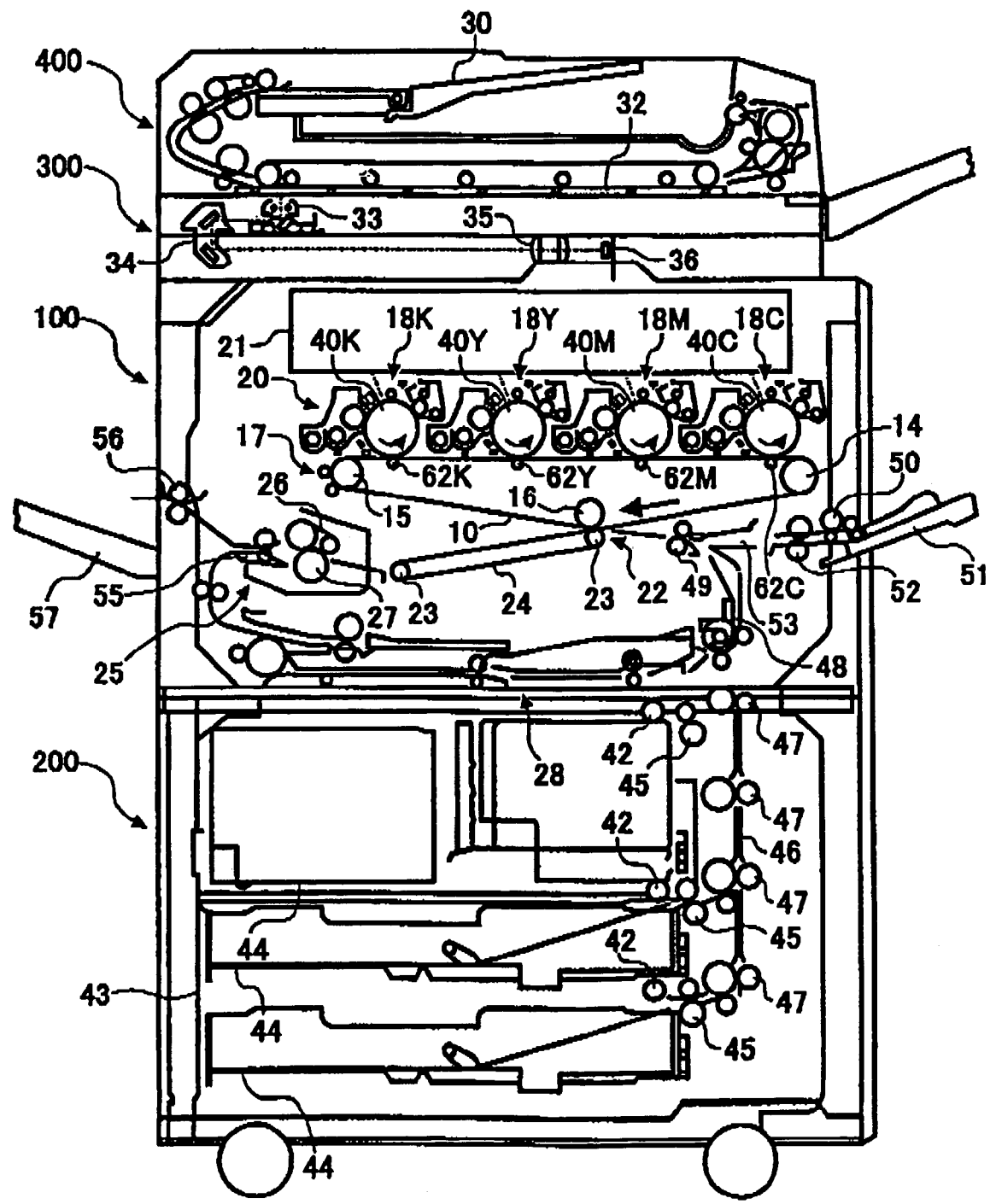
FIG. 1 is a view showing an outline of the constitution of an electrophotographic copier serving as an example of an image forming apparatus according to a first embodiment of the present invention.

FIG. 1 is a schematic constitutional diagram showing the copier serving as an image forming apparatus which may be used as the detection subject of the abnormality determining apparatus to which the present invention is applied. The copier comprises image forming means constituted by a printer unit 100 and a paper feed unit 200, a scanner unit 300, and an original conveyance unit 400. The scanner unit 300 is attached to the top of the printer unit 100, and the original conveyance unit 400, constituted by an automatic document feeding device (ADF), is attached to the top of the scanner unit 300.

The scanner unit 300 reads image information of an original placed on a contact glass 32 using a reading sensor 36, and transmits the read image information to a control unit not shown in the drawing. The control unit controls a laser, LED, or the like, not shown in the drawing, disposed within an exposure device 21 of the printer unit 100 on the basis of the image information received from the scanner unit 300 to irradiate four drum-shaped photosensitive bodies 40K, Y, M, C with laser recording light L. By means of this irradiation, an electrostatic latent image is formed on the surface of the photosensitive bodies 40K, Y, M, C. This latent image is then subjected to a predetermined developing process to be developed into a toner image. Note that the suffixes K, Y, M, C following the reference numerals indicate black, yellow, magenta, and cyan specifications.

In addition to the exposure device 21, the printer unit 100 comprises primary transfer rollers 62K, Y, M, C, a secondary transfer device 22, a fixing device 25, a paper discharge device, a toner supply device not shown in the drawing, and so on.

The paper feed unit 200 comprises an automatic paper feed portion disposed beneath the printer unit 100 and a manual paper feed portion disposed on the side face of the printer unit 100. The automatic paper feed portion comprises two paper cassettes 44 disposed one on top of the other inside a paper bank 43, feed rollers 42 for feeding transfer paper serving as a recording medium from the paper cassettes, a separation roller 45 for separating the fed transfer paper and conveying it to a feed path 46, and so on. Conveyance rollers 47 for conveying the transfer paper to a feed path 48 in the printer unit 100, and soon, are also provided. The manual paper feed portion comprises a manual paper feed tray 51, a separation roller 52 for separating the transfer paper on the manual paper feed tray 51 into single sheets and feeding the paper toward a manual feed path 53, and so on.

A pair of registration rollers 49 is disposed near the end of the feed path 48 of the printer unit 100. The registration roller pair 49 receive the transfer paper fed from the paper cassettes 44 or manual paper feed tray 51, and then, at a predetermined timing, feed the paper to a secondary transfer nip formed between an intermediate transfer belt 10 serving as an intermediate transfer body and a secondary transfer device 22.

When an operator wishes to make a copy of a color image on this copier, s/he sets the original on an original table 30 of the original conveyance unit 400. Alternatively, the operator opens the original conveyance unit 400 and sets the original on the contact glass 32 of the scanner unit 300, and then closes the original conveyance unit 400 so that the original is held down. The operator then presses a start switch not shown in the drawing. When the original is set on the original conveyance unit 400, the scanner unit 300 begins to operate after the original is conveyed to the contact glass 32, and when the original is set on the contact glass 32, the scanner unit 300 begins to operate immediately. A first traveling body 33 and a second traveling body 34 then move such that light emitted from a light source in the first traveling body 33 is reflected toward the second traveling body 34 from the surface of the original. This light is then further reflected by a mirror on the second traveling body 34 so as to pass through an image-forming lens 35 and enter a reading sensor 36. Thus the light is read as image information.

Once the image information has been read in this manner, a drive motor in the printer unit 100, not shown in the drawing, drives one of three support rollers 14, 15, 16 to rotate such that the other two support rollers are driven to rotate thereby. In so doing, the intermediate transfer belt 10 wrapped around the rollers is caused to perform an endless motion. Laser recording such as that described above and a development process to be described below are also implemented. Monochrome images in black, yellow, magenta, and cyan are then formed on the photosensitive bodies 40K, Y, M, C as the photosensitive bodies 40K, Y, M, C rotate. These monochrome images are then superposed in succession at K, Y, M, and C primary transfer nips formed in locations where the photosensitive bodies 40K, Y, M, C contact the intermediate transfer belt 10, and thereby electrostatically transferred to form a four-color superposed toner image. The toner image is then formed on the photosensitive bodies 40K, 40Y, 40M, 40C.

Meanwhile, the paper feed unit 200 operates one of the three feed rollers such that transfer paper of a size corresponding to the image information is fed, and thus leads the transfer paper to the feed path 48 in the printer unit 100. Having entered the feed path 48, the transfer paper is halted temporarily between the registration roller pair 49, and then fed at an appropriate timing into the secondary transfer nip formed at the contact portion between the intermediate transfer belt 10 and a secondary transfer roller 23 of the secondary transfer device 22. The four-color superposed toner image on the intermediate transfer belt 10 and the transfer paper are then adhered together in synchronization at the secondary transfer nip. Then, as a result of a transfer electric field formed at the nip, nip pressure, and so on, the four-color superposed toner image is subjected to secondary transfer onto the transfer paper, where the toner image combines with the white of the paper to form a full color image.

Having passed through the secondary transfer nip, the transfer paper is conveyed to the fixing device 25 by the endless motion of a conveyor belt 24 of the secondary transfer device 22. The full color image is then fixed by the action of pressure applied by a pressure roller 27 of the fixing device 25 and heat applied by a heating belt, and then passes discharge rollers 56 to be discharged onto a paper discharge tray 57 provided on the side face of the printer unit 100.

Figure 2:
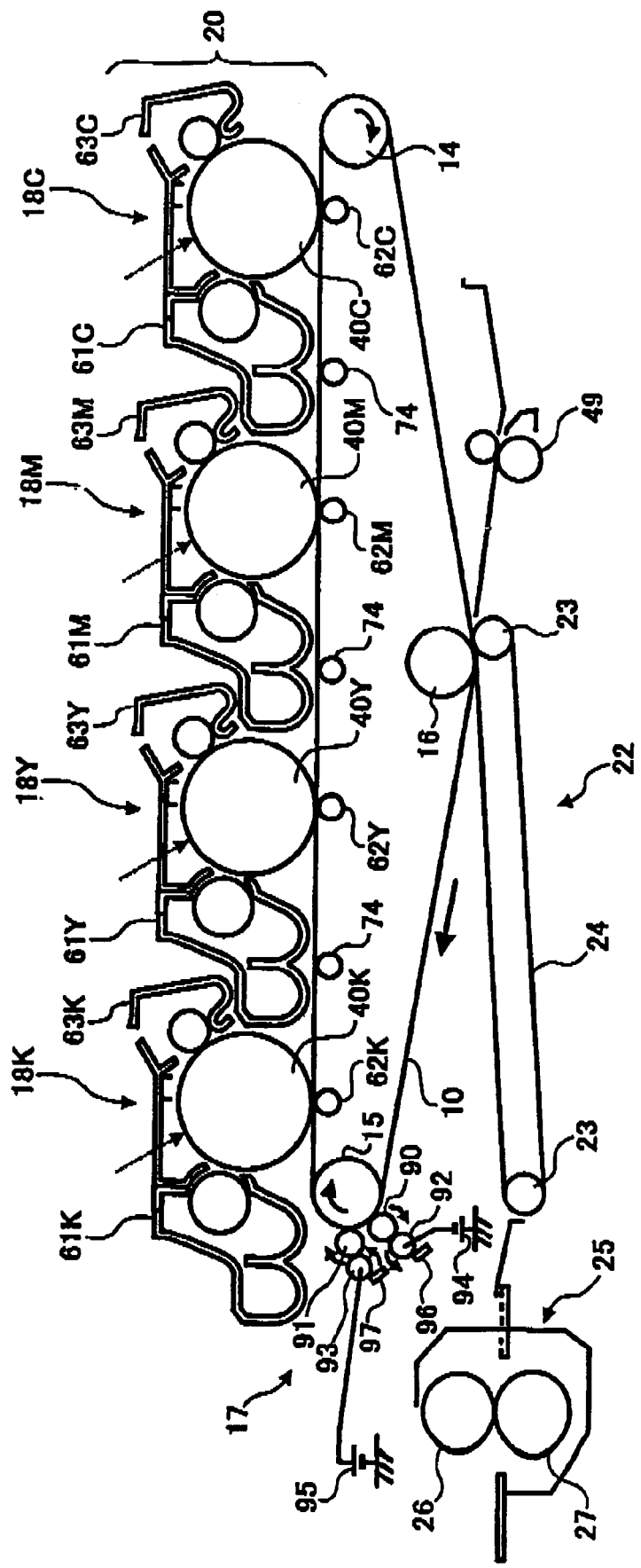
FIG. 2 is a view showing an outline of the constitution of a printer unit in the copier.

FIG. 2 is an enlarged view showing the constitution of the printer unit 100. The printer unit 100 comprises a belt unit, four process units 18K, Y, M, C for forming toner images in each color, the secondary transfer device 22, a belt cleaning device 17, the fixing device 25, and so on.

The belt unit is caused to perform an endless motion while the intermediate transfer belt 10 wrapped around a plurality of rollers is caused to contact the photosensitive bodies 40K, Y, M, C. At the K, Y, M, C primary transfer nips where the photosensitive bodies 40K, Y, M, C contact the intermediate transfer belt 10, the intermediate transfer belt 10 is pushed toward the photosensitive bodies 40K, Y, M, C from the rear surface side thereof by the primary transfer rollers 62K, Y, M, C. A primary transfer bias is applied to the primary transfer rollers 62K, Y, M, C respectively by power sources not shown in the drawing. As a result, a primary transfer electric field which transfers the toner images formed on the photosensitive bodies 40K, Y, M, C electrostatically toward the intermediate transfer belt 10 is formed at the K, Y, M, C primary transfer nips. Conductive rollers 74 contacting the rear surface of the intermediate transfer belt 10 are disposed between each of the primary transfer rollers 62K, Y, M, C. These conductive rollers 74 prevent the primary transfer bias applied to the primary transfer rollers 62K, Y, M, C from flowing into the adjacent process unit via a medium resistance base layer 11 on the rear surface side of the intermediate transfer belt 10.

The process units 18K, Y, M, C are supported on a common carrier as a single unit comprising the photosensitive bodies 40K, Y, M, C and several other devices, and are removable from the print unit 100. The black process unit 18K, for example, comprises the photosensitive body 40K, and also a developing unit 61K serving as developing means for developing an electrostatic latent image formed on the surface of the photosensitive body 40K into a black toner image, a photosensitive body cleaning device 63K for cleaning residual toner adhered to the surface of the photosensitive body 40K after passing through the primary transfer nip, a neutralizing device, not shown in the drawing, for neutralizing the surface of the photosensitive body 40K after cleaning, a charging device, not shown in the drawing, for uniformly charging the surface of the photosensitive body 40K after neutralization, and soon. Apart from storing toner of different colors, the other color process units 18K, Y, M, C are constituted substantially identically. In this copier, the four process units 18K, Y, M, C are constituted in a so-called tandem form, disposed in series opposing the intermediate transfer belt 10 in the endless motion direction thereof.

Figure 3:
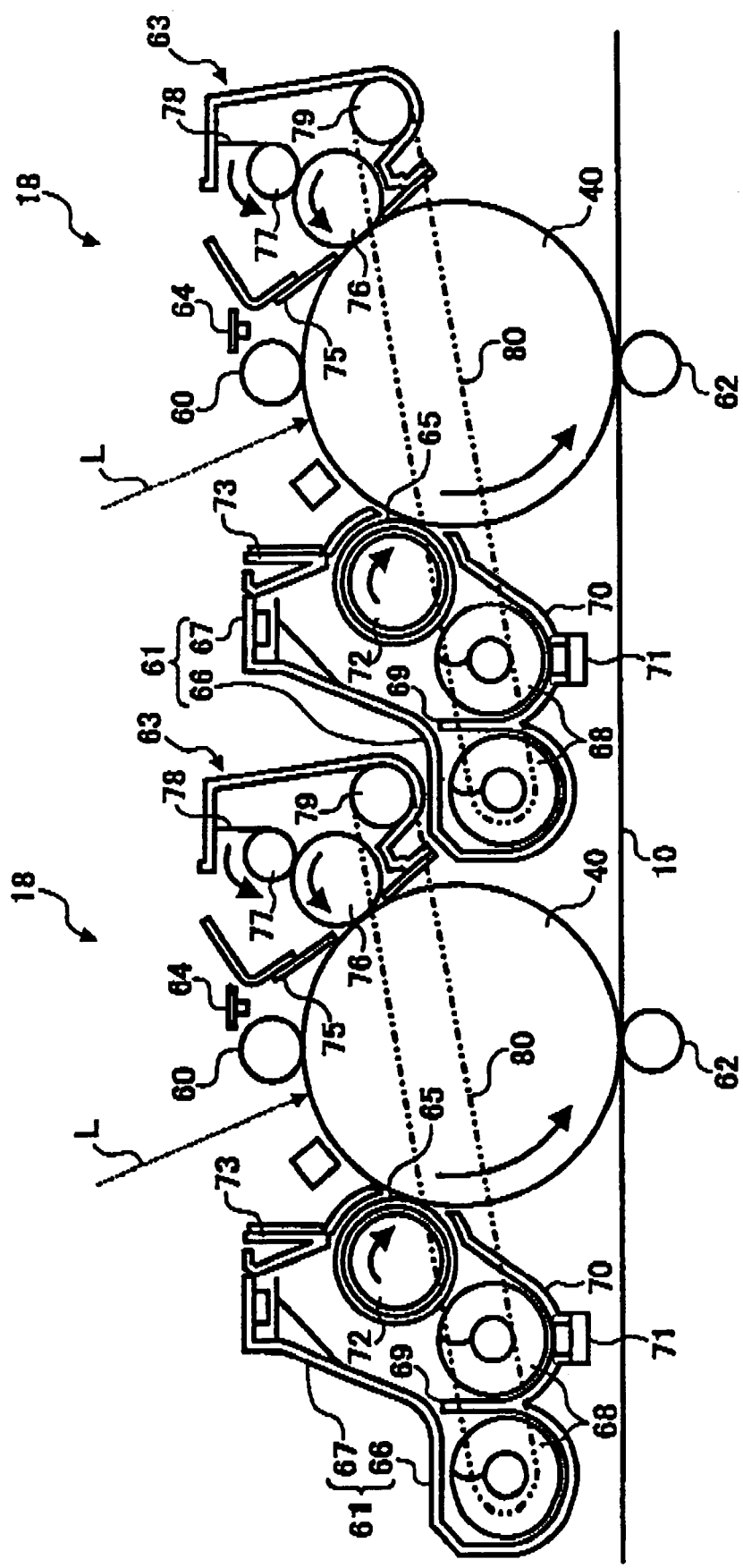
FIG. 3 is a partially enlarged view showing the constitution of a tandem unit in the copier.

FIG. 3 is a partially enlarged view showing a part of a tandem portion 20 comprising the four process units 18K, Y, M, C. Note that apart from the color of the toner, the four process units 18K, Y, M, C are constituted substantially identically, and hence the suffixes K, Y, M, C attached to each reference numeral have been omitted from the drawing. As shown in the drawing, the process unit 18 comprises a charging device 60 serving as charging means, the developing device 61, the primary transfer roller 62 serving as primary transfer means, the photosensitive body cleaning device 63, a neutralizing device 64, and so on, disposed around the photosensitive body 40.

A drum-shaped object constituted by a cylinder made of aluminum or the like, which is coated with an organic photosensitive material having a photosensitive property to form a photosensitive layer, is used as the photosensitive body 40. Note, however, that an object in the form of an endless belt may be used. As the charging device 60, an object which is rotated by causing a charging roller charged with a charging bias to contact the photosensitive body 40 is used. A scorotron charger or the like, which performs charging processing in a state of non-contact with the photosensitive body 40, may be used.

The developing device 61 uses a two-component developer containing a magnetic carrier and a non-magnetic toner to develop latent images. The developing device 61 comprises an agitating unit 66 which supplies the two-component developer stored in the interior of the developing device 61 to a developing sleeve 65 by conveying and agitating the two-development toner simultaneously, and a developing unit 67 which transfers the toner of the two-component developer adhered to the developing sleeve 65 to the photosensitive bodies 40K, Y, M, C.

The agitating unit 66 is provided in a lower position than the developing unit 67, and comprises two screws 68 disposed in parallel, a partition plate provided between the two screws, a toner concentration sensor 71 provided on the bottom face of a developing case 70, and so on.

The developing unit 67 comprises the developing sleeve 65 opposing the photosensitive body 40 through an opening in the developing case 70, a magnet roller 72 provided in the interior of the developing sleeve 65 so as to be incapable of rotating, a doctor blade 73, the tip end of which approaches the developing sleeve 65, and so on. The gap between the doctor blade 73 and developing sleeve 65 is set at approximately 500 [μm] at its narrowest. The developing sleeve 65 has a sleeve-form which is capable of non-magnetic rotation. The magnet roller 72, which is constituted not to rotate with the developing sleeve 65, comprises five magnetic poles N1, S1, N2, S2, S3, for example, in the rotary direction of the developing sleeve 65 from the location of the doctor blade 73. These magnetic poles cause magnetic force to act on the two-component developer on the sleeve in predetermined positions in the rotary direction. As a result, the two-component developer transmitted from the agitating unit 66 is attracted to and carried on the surface of the developing sleeve 65, and a magnetic brush is formed on the surface of the sleeve along the line of magnetic force.

The magnetic brush is restricted to an appropriate layer thickness as it passes through the opposing position with the doctor blade 73 with the rotation of the developing sleeve 65, and is then conveyed to a developing region opposite the photosensitive body 40. The magnetic brush is then transferred onto the electrostatic latent image by the potential difference between the developing bias applied to the developing sleeve 65 and the electrostatic latent image on the photosensitive body 40, and thus contributes to development. The magnetic brush is then returned to the developing unit 65 as the developing sleeve 67 continues to rotate, where it is removed from the surface of the sleeve by the effect of a repulsive magnetic field between the magnetic poles on the magnetic roller 72, and returned to the agitating unit 66. In the agitating unit 66, the two-component developer is replenished with an appropriate amount of toner on the basis of the detection result of the toner concentration sensor 71. In this example, the developing sleeve 65 has a diameter of 18 [mm], and the surface thereof is subjected to sandblast processing or processing to form a plurality of grooves having a depth of one to several mm such that the surface roughness (Rz) is approximately 10 to 30 [μm].

Note that instead of the two-component developer, a single-component developer which does not contain a magnetic carrier may be employed in the developing device 61.

Further, in this copier the linear speed of the photosensitive body 40 is set at 200 [mm/sec], and the linear speed of the developing sleeve 65 is set at 240 [mm/sec]. The diameter of the photosensitive body 40 is set at 50 [mm], the thickness thereof is set at 30 [μm], the beam spot diameter of the optical system is set at 50×60 [μm], and the light quantity is set at 0.47 [mW] The charging potential $V_0$ (before exposure) of the photosensitive body 40 is set at −700 [V], the post-exposure potential $V_L$ is set at −120 [V], and the developing bias voltage is set at −470 [V]. In other words, development is performed at a developing potential of 350 [V].

The charging amount of the toner on the developing sleeve 65 is preferably within a range of −10 to −30 [μC/g]. A developing gap, which is the gap between the photosensitive body. 40 and developing sleeve 65, may be set within a conventional range of 0.8 to 0.4 [mm], but by reducing this value, the developing efficiency can be improved.

A system whereby a polyurethane rubber cleaning blade 75 is pressed against the photosensitive body 40 is used as the photosensitive body cleaning device 63, but another system may be employed. To improve cleanability, in this example the cleaning device 63 comprises a contact conductive fur brush 76, the outer peripheral surface of which contacts the photosensitive body 40 and which is rotatable in the direction of the arrow in the drawing. A metallic electrostatic roller 77 for applying a bias to the fur brush 76 is provided rotatably in the direction of the arrow in the drawing, and the tip end of a scraper 78 is pressed against the electrostatic roller 77. The toner that is removed from the electrostatic roller 77 by the scraper 78 drops onto a collection screw 79 and is thus collected.

The photosensitive body cleaning device 63 constituted in this manner removes residual toner from the photosensitive body 40 using the fur brush 76 rotating in a counter direction to the photosensitive body 40. The toner which adheres to the fur brush 76 is removed by the electrostatic roller 77 which is applied with a bias and rotates in the counter direction to the fur brush 76 while contacting the fur brush 76. The toner which adheres to the electrostatic roller 77 is cleaned by the scraper 78. The toner which gathers in the photosensitive body cleaning device 63 is moved to one side of the photosensitive body cleaning device 63 by the collecting screw 79, returned to the developing device 61 by a toner recycling device 80, and reused.

The neutralizing device 64 is constituted by a neutralizing lamp or the like which emits light in order to remove the surface potential of the photosensitive body 40. Having been neutralized in this manner, the surface of the photosensitive body 40 is uniformly charged by the charging device 60, and then subjected to optical recording processing.

The secondary transfer device 22 is provided below the belt unit in the drawing. The secondary transfer device 22 is caused to perform an endless motion by wrapping the secondary transfer belt 24 around the two rollers 23. One of the two rollers 23 serves as a secondary transfer roller that is charged with a secondary transfer bias by a power source not shown in the drawing. This secondary transfer roller 23 sandwiches the intermediate transfer belt 10 and secondary transfer belt 24 between itself and the roller 16 of the belt unit. Thus the two belts move in the same direction while contacting each other at the contact portion, thereby forming a secondary transfer nip. By means of a secondary transfer electric field and nip pressure, the four color superposed toner image on the intermediate transfer belt 10 is subjected to secondary transfer onto the transfer paper that is conveyed to the secondary transfer nip from the registration roller pair 49, thus forming a full color image. Having passed through the secondary transfer nip, the transfer paper is separated from the intermediate transfer belt 10 and carried on the surface of the secondary transfer belt 24 to the fixing device 25 as the belt performs its endless motion. Note that secondary transfer may be performed by a transfer charger or the like instead of the secondary transfer roller.

After passing through the secondary transfer nip, the surface of the intermediate transfer belt 10 reaches the support position of the support roller 15. Here, the intermediate transfer belt 10 is interposed between the belt cleaning device 17 which contacts the front surface (outer loop surface) of the belt, and the support roller 15 which contacts the rear surface. The residual toner adhered to the front surface is removed by the belt cleaning device 17, whereupon the belt enters the K, Y, M, C primary transfer nips in succession so that the next four color toner image can be superposed.

The belt cleaning device 17 comprises two fur brushes 90, 91 as cleaning members. These fur brushes 90, 91 each have a diameter of 20 [mm], are constituted by a plurality of acrylic carbon filaments filled into a rotary core at a density of 6.25 [D/F, 100,000/inch$^2$], and exhibit an electric resistance of approximately 1×10$^7$ [Ω]. The fur brushes 90, 91 wipe residual toner from the belt mechanically by having the plurality of filaments rotate in a counter direction to the filling direction of the filaments while contacting the intermediate transfer belt 10. The wiped residual toner is also attracted electrostatically and collected by applying a cleaning bias using a power source not shown in the drawing.

Metallic rollers 92, 93 rotate in a forward direction or reverse direction to the fur brushes 90, 91 while contacting the fur brushes 90, 91 respectively. Of the two metallic rollers 92, 93, a negative voltage is applied to the metallic roller 92 positioned at the upstream side in the direction of rotation of the intermediate transfer belt 10 by a power source 94, whereas a positive voltage is applied to the metallic roller 93 positioned at the downstream side by a power source 95. The tip ends of blades 96, 97 contact the metallic rollers 92, 93 respectively. By means of this constitution, while the intermediate transfer belt 10 performs an endless motion in the direction indicated by an arrow in the drawing, the upstream side fur brush 90 cleans the surface of the intermediate transfer belt 10. At this time, if −700 [V], for example, are applied to the metallic roller 92 and −400 [V] are applied to the fur brush 90, first the positive polarity toner on the intermediate transfer belt 10 is transferred electrostatically to the fur brush 90 side. The toner transferred to the fur brush side is then transferred to the metallic roller 92 from the fur brush 90 due to the potential difference, and is scraped off by the blade 96.

A lot of toner is left on the intermediate transfer belt 10 even after the fur brush 90 has removed the toner from the intermediate transfer belt 10 in the manner described above. This toner is charged to negative polarity by the negative bias applied to the fur brush 90. This charging is assumed to be performed by charge injection or discharge. Next, the downstream fur brush 91 is used to perform cleaning by applying a positive bias, and thus the remaining toner can be removed. The removed toner is transferred to the metallic roller 93 from the fur brush 91 by the potential difference, scraped off by the blade 97, and collected in a tank not shown in the drawing.

Although most of the toner is removed from the surface of the intermediate transfer belt 10 by this cleaning performed by the fur brush 91, a little toner still remains. The remaining toner on the intermediate transfer belt 10 is charged to a positive polarity by the positive bias applied to the fur brush 91 as described above. This toner is transferred to the side of the photosensitive bodies 40K, Y, M, C by a transfer electric field applied at the primary transfer position, and collected by the photosensitive body cleaning device 63.

Although the registration roller pair 49 is, in many cases, grounded, a bias may be applied in order to remove paper particles of the transfer paper P. A conductive rubber roller, for example, is used to apply the bias. The roller may have a diameter of 18 [μm], and be covered with conductive NBR rubber having a thickness of 1 [μm]. The electric resistance is equivalent to the volume resistivity of the rubber material, and hence approximately $10 \times 10^9$ [Ω×cm]. A voltage of about −800 [V] is applied to the side (front side) on which the toner is transferred. A voltage of about +200 [V] is applied to the rear surface side of the paper.

Generally, in the intermediate transfer system, paper particles cannot easily move to the photosensitive bodies, and hence the intermediate transfer system may be grounded without taking paper particle transfer greatly into account. The voltage is generally applied as a DC bias, but may be applied as an AC voltage containing a DC offset component in order to charge the transfer paper P more evenly. Thus the paper surface, having passed through the registration roller pair 49 applied with a bias in this manner, is charged slightly to the negative side. Accordingly, during transfer from the intermediate transfer belt 10 to the transfer paper P, the transfer conditions may vary from those when no voltage is applied to the registration roller pair 49.

Note that in this embodiment, a transfer paper turning device 28 (see FIG. 1) is provided below the secondary transfer device 22 and fixing device 25 in parallel with the aforementioned tandem portion 20. Thus the transfer paper, having finished image fixing processing on one side, is turned over using a switching claw to switch the path of the transfer paper to the transfer paper turning device side, and returned to the secondary transfer nip. Secondary transfer processing and fixing processing are then implemented on the image on the other side of the transfer paper, whereupon the transfer paper is discharged onto the paper discharge tray.

Figure 4:
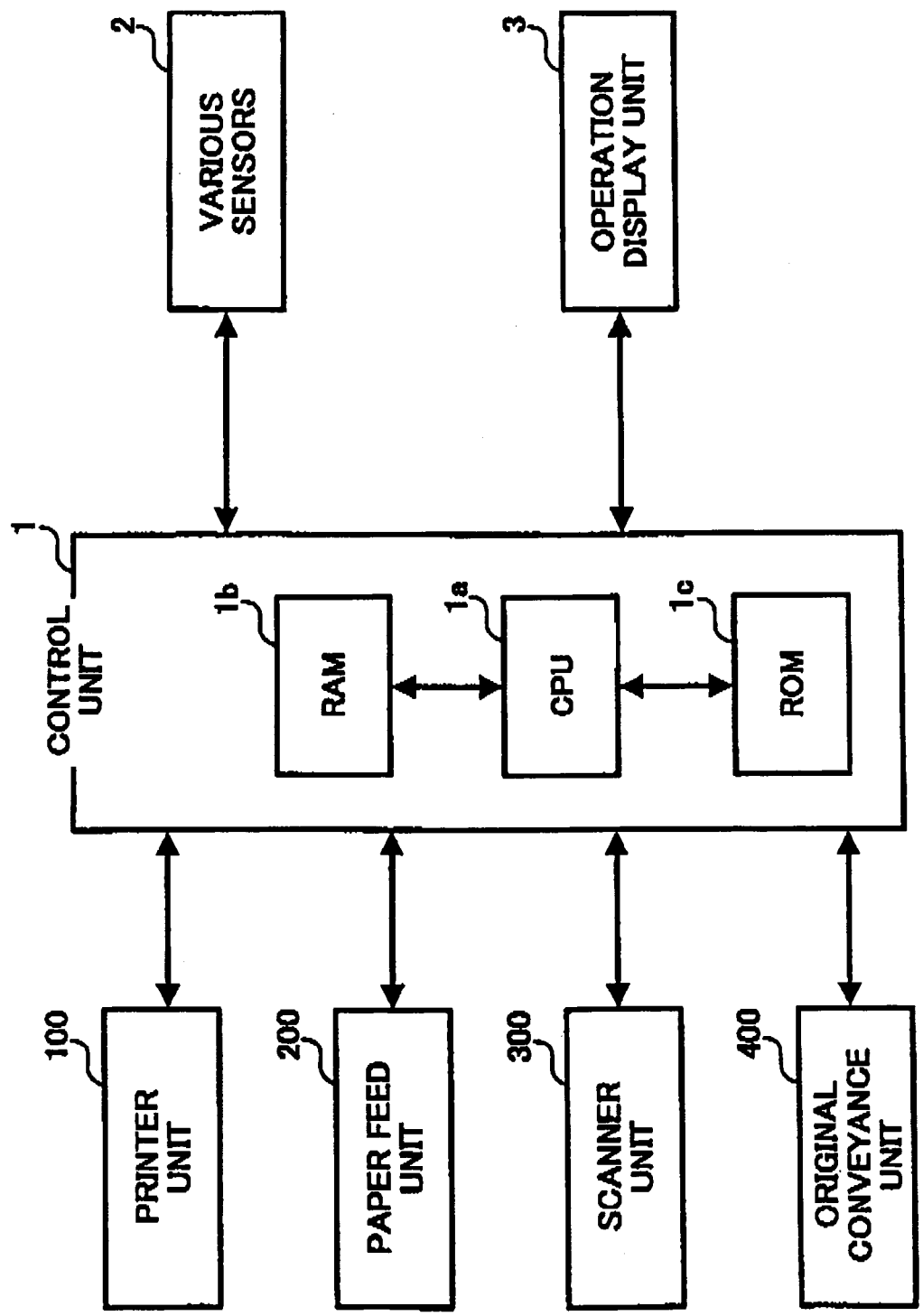
FIG. 4 is a block diagram showing a part of the constitution of an electric circuit in the copier.

This copier comprises information obtaining means for obtaining various information relating to the state of the constitutional components of the copier and phenomena occurring in the interior of the copier. These information obtaining means are constituted by a control unit 1, various sensors 2, an operation display device 3, and so on, shown in FIG. 4. The control unit 1 serves as control means for controlling the entire copier, and comprises ROM 1*c* serving as information storage means storing a control program, RAM 1*b* serving as information storage means for storing calculation data, control parameters, and the like, a CPU 1*a* serving as calculation means, and so on. The operation display unit 3 comprises a display unit 3*a* constituted by a liquid crystal display or the like for displaying written information and the like, an operating unit 3*b* for receiving input information from an operator through a keypad or the like, and transmitting this input information to the control unit 1, and so on. In this copier, the information obtaining means constituted by the control unit 1, various sensors 2, operation display unit 3, and so on function as an abnormality determining apparatus comprising determining means for determining an abnormality in the detection subject copier on the basis of the stored information stored in the information storage means such as the ROM 1*c* and various information obtained by the obtaining function of the information obtaining means itself.

The information that is obtained by the information obtaining means of this copier includes sensing information, control parameter information, input information, image reading information, and so on. This information will now be described in detail.

(a) Sensing Information

The items that may be obtained as sensing information include driving relationships, various characteristics of the recording medium, developer characteristics, photosensitive body characteristics, various electrophotographic processing states, environmental conditions, and various characteristics of the recorded object. This sensing information will be described in outline below.

(a-1) Driving Information Includes:

detecting the rotation speed of the photosensitive drum using an encoder, reading the current value of the drive motor, reading the temperature of the drive motor;

similarly detecting the driving state of cylindrical or belt-form rotary components such as the fixing rollers, paper conveyance rollers, and drive rollers; and detecting sound generated by driving using a microphone installed in the interior of the device or outside of the device.

(a-2) Paper Conveyance Conditions Include:

reading the position of the front end/rear end of the conveyed paper using a transmission type or reflection type optical sensor, or a contact type sensor, detecting the occurrence of a paper jam, and reading deviations in the transmission timing of the front end/rear end of the paper, or variation in a perpendicular direction to the conveyance direction;

similarly determining the traveling speed of the paper by means of the detection timing of a plurality of sensors; and determining slippage between the feed roller and the paper during paper feeding by comparing a measured value of the roller rotation speed and the travel of the paper.

(a-3) Various Characteristics of a Recording Medium Such as Paper

This information greatly affects the image quality and sheet conveyance stability. The following methods are used to obtain information relating to the paper type.

The paper thickness is determined by fixing the paper between two rollers and detecting relative positional displacement of the rollers using an optical sensor or the like, or detecting an equal displacement to the travel of a member that is pushed upward when the paper is introduced.

The surface roughness of the paper is determined by causing a guide or the like to contact the surface of the paper prior to transfer, and detecting the oscillation, sliding sound, or the like produced by this contact.

The gloss of the paper is determined by irradiating luminous flux of a prescribed angle of aperture at a prescribed angle of incidence, and measuring the luminous flux of a prescribed angle of aperture that is reflected in a specular reflection direction using a sensor.

The rigidity of the paper is determined by detecting the amount of deformation (curvature) of a pressed piece of paper.

A determination as to whether or not the paper is recycled paper is performed by irradiating the paper with ultraviolet light and detecting its transmittivity.

A determination as to whether or not the paper is backing paper is performed by irradiating the paper with light from a linear light source such as an LED array, and detecting the light reflected from the transfer surface using a solid state imaging element such as a CCD.

A determination as to whether or not the paper is OHP paper is performed by irradiating the paper with light, and detecting regular reflection light having a different angle to that of the transmitted light.

The moisture content of the paper is determined by measuring the absorption of infrared light or μ wave light.

The curl is detected using an optical sensor, contact sensor, or similar.

The electric resistance of the paper is determined by causing a pair of electrodes (feed rollers or the like) to contact the recording paper and measuring the electric resistance directly, or measuring the surface potential of the photosensitive body or intermediate transfer body following transfer, and estimating the resistance value of the recording paper from the measured value.

(a-4) Developer Characteristics

The characteristics of the developer (toner/carrier) in the device fundamentally affect the electrophotographic process function, and are therefore an important factor in the operation and output of the system. It is vital to obtain information regarding the developer. The following items may be cited as examples of developer characteristics.

Regarding the toner, the charging amount and distribution, fluidity, cohesion, bulk density, electric resistance, external additive amount, consumption amount or remaining amount, fluidity, and toner concentration (mixing ratio of toner and carrier) may be cited as characteristics.

Regarding the carrier, the magnetic property, coating thickness, spent amount, and so on may be cited as characteristics.

It is usually difficult to detect items such as those described above individually in the interior of the image forming apparatus. Therefore, an overall characteristic of the developer is detected. The overall characteristic of the developer may be measured in the following ways, for example.

A test latent image is formed on the photosensitive body, developed under predetermined developing conditions, and the reflection density (optical reflectance) of the formed toner image is measured.

A pair of electrodes is provided in the developing device, and the relationship between the applied voltage and current (resistance, permittivity, and so on) is measured.

A coil is provided in the developing device, and the voltage-current characteristic (inductance) is measured.

A level sensor is provided in the developing device, and the developer volume is detected. The level sensor may be an optical sensor, a capacitance sensor, or similar.

(a-5) Photosensitive Body Characteristics

Similarly to the developer characteristics, the photosensitive body characteristics relate closely to the electrophotographic process function. Examples of information regarding the photosensitive body characteristics include the photosensitive film thickness, the surface characteristics (coefficient of friction, irregularities), surface potential (before and after each process), surface energy, scattered light, temperature, color, surface position (deflection), linear speed, potential attenuation speed, resistance/capacitance, surface moisture content, and so on. From among these examples, the following information can be detected within the image forming apparatus.

Variation in the capacitance accompanying film thickness variation can be detected by detecting the current flowing from a charging member to the photosensitive body, and simultaneously comparing the voltage applied to the charging member with the voltage-current characteristic relating to a preset dielectric thickness of the photosensitive body to determine the film thickness.

The surface potential and temperature can be determined by a well-known sensor.

The linear speed is detected by an encoder or the like attached to a rotary shaft of the photosensitive body.

Scattered light from the surface of the photosensitive body is detected by an optical sensor.

(a-6) State of the Electrophotographic Process

As is well-known, toner image formation through electrophotography is performed by a succession of processes comprising: uniform charging of the photosensitive body; latent image formation (image exposure) by means of laser light or the like; development using toner (coloring particles) carrying an electric charge; transfer of the toner image onto a transfer material (in the case of a color image, this is performed by superposing toner onto an intermediate transfer body or the recording medium, which is the final transfer body, or by means of superposition development onto the photosensitive body during development); and fixing of the toner image on the recording medium. The various information at each of these stages greatly affects the image and other system output. It is important to obtain this information in order to evaluate the stability of the system. Specific examples of ways in which information relating to the state of the electrophotographic process is obtained are as follows:

the charging potential and exposure unit potential are detected by a well-known surface potential sensor;

the gap between the charging member and photosensitive body during non-contact charging is detected by measuring the amount of light passing through the gap;

the electromagnetic wave caused by charging is perceived by a wideband antenna;

the sound generated by charging;

the exposure intensity; and the exposure optical wavelength.

Further, the following can be cited as methods of obtaining various states of the toner image.

The pile height (height of the toner image) is detected by measuring depth from the vertical direction using a displacement sensor, and measuring shielding length from the horizontal direction using a parallel ray linear sensor.

The toner charging amount is measured by a potential sensor which measures the potential of an electrostatic latent image on a solid portion and the potential when the latent image has been developed, and determined from the ratio thereof to an adhesion amount calculated by a reflection density sensor in the same location.

Dot fluctuation or scattering is determined by detecting a dot pattern image using an infrared light area sensor on the photosensitive body and area sensors of wavelengths corresponding to each color on the intermediate transfer body, and then implementing appropriate processing.

The offset amount (after fixing) is read by optical sensors in locations corresponding to the surface of the recording-paper and the surface of the fixing roller respectively, and determined by comparing the two obtained sensor values.

The remaining transfer amount is determined by disposing optical sensors after the transfer step (on the PD and the belt) and measuring the amount of reflected light from the remaining transfer pattern following the transfer of a specific pattern.

Color unevenness during superposition is detected by a full color sensor which detects the surface of the recording paper following fixing.

(a-7) Formed Toner Image Characteristics

Image density and color are detected optically (by either reflected light or transmitted light; the projection wavelength is selected according to the color). To obtain density and single color information, this detection may be performed on the photosensitive body or intermediate transfer body, but to measure a color combination, such as color unevenness, the detection must be performed on the paper.

Gradation is determined using an optical sensor by detecting the reflection density of a toner image formed on the photosensitive body or a toner image transferred onto a transfer body at each gradation level.

Definition is detected using a monocular sensor with a small spot diameter or a high resolution line sensor by reading a developed or transferred image to determine a repeated line pattern.

Graininess (roughness) is determined by the same method used to detect the definition, by reading a halftone image and calculating the noise component.

Registration skew is determined by providing an optical sensor at each end of the main scanning direction following registration, and measuring the difference between the ON timing of the registration rollers and the detection timing of the two sensors.

Mis-color registration is determined by detecting the edge portions of a superposed image on the intermediate transfer body or recording paper using a monocular small-diameter spot sensor or a high resolution line sensor.

Banding (density unevenness in the conveyance direction) is detected by measuring density unevenness in the sub scanning direction on the transfer paper using a small-diameter spot sensor or a high resolution line sensor, and measuring the signal quantity at a specific frequency.

Glossiness (unevenness) is detected by providing apiece of recording paper formed with a uniform image so as to be scanned by a regular reflection-type optical sensor.

Fogging is detected using a method of reading an image background portion using an optical sensor for scanning a comparatively wide region on the photosensitive body, intermediate transfer body, or recording paper, or a method of obtaining image information for each area of the background region using a high resolution area sensor, and counting the number of toner particles in the image.

(a-8) Physical Characteristics of Printed Objects in the Image Forming Apparatus Image deletion/fading and so on is determined by scanning a toner image on the photosensitive body, intermediate transfer body, or recording paper using an area sensor, and subjecting the obtained image information to image processing.

Scattering is determined by scanning an image on the recording paper using a high resolution line sensor or an area sensor, and calculating the amount of toner scattered around the periphery of the pattern portion.

Rear end blank spots and bet across blank spots are detected by a high resolution line sensor on the photosensitive body, intermediate transfer body, or recording paper.

Curling, rippling, and folding are detected by a displacement sensor. It is effective to dispose a sensor in a location near to the two end parts of the recording paper to detect folding.

Contamination and flaws on the cross-cut surface are detected by an area sensor provided vertically in the paper discharge tray by capturing an image of and analyzing the cross-cut surface when a certain amount of delivered paper has accumulated.

(a-9) Environmental Conditions

To detect temperature, a thermocouple system which extracts as a signal a thermoelectromotive force generated at a contact point joining two different metals or a metal and a semiconductor, a resistivity variation element using temperature-based variation in the resistivity of a metal or semiconductor, a pyroelectric element in which, with a certain type of crystal, the charge in the crystal is polarized with an increase in temperature to generate a surface potential, a thermomagnetic effect element which detects change in the magnetic property according to temperature, and so on may be employed.

To detect humidity, an optical measurement method for measuring the optical absorption of $H_2O$ or an OH group, a humidity sensor which measures variation in the electric resistance value of a material due to water vapor adsorption, and so on may be employed.

Various gases are detected by measuring change in the electric resistance of an oxide semiconductor basically accompanying gas adsorption.

To detect airflow (direction, flow speed, gas type), an optical measurement method or the like may be used, but an air-bridge type flow sensor which, due to its small size, enables a reduction in the size of the system, is particularly useful.

To detect air pressure and pressure, methods such as using a pressure sensitive material to measure the mechanical displacement of a membrane may be employed. Similar methods may be used to detect oscillation.

(b) Regarding Control Parameter Information

An operation of the image forming apparatus is determined by the control unit, and hence it is effective to use the input/output parameters of the control unit directly.

(b-1) Image Formation Parameters

These are direct parameters output as a result of calculation processing performed by the control unit for the purpose of image formation, such as the following:

set values of the process conditions set by the control unit, for example the charging potential, developing bias value, fixing temperature set value, and so on;

similarly, set values of various image formation parameters for halftone processing, color correction, and so on;

various parameters set by the control unit to operate the device, for example the paper conveyance timing, the execution period of a preparatory mode prior to image formation, and so on.

(b-2) User Operating History

The frequency of various operations selected by the user, such as the number of colors, number of sheets, image quality instructions, and so on.

The frequency of paper size selections by the user.

(b-3) Power Consumption

The total power consumption over the entire period or a specific time unit (one day, one week, one month, etc.), or the distribution, variation (derivative), and cumulative value (integral) thereof.

(b-4) Information Regarding Consumption of Consumables

Usage of the toner, photosensitive body, and paper over the entire period or a specific time unit (one day, one week, one month, etc.), or the distribution, variation (derivative), and cumulative value (integral) thereof.

(b-5) Information Regarding the Occurrence of a Fault

The frequency with which a fault occurs (by type) over the entire period or a specific time unit (one day, one week, one month, etc.), or the distribution, variation (derivative), and cumulative value (integral) thereof.

(c) Input Image Information

The following information can be obtained from image information transmitted from a host computer as direct data or image information obtained after being read from an original image by a scanner and subjected to image processing.

The cumulative number of color pixels is determined by counting image data by GRB signal for each pixel.

Using a method such as that described in Japanese Patent Publication No. 2621879, for example, an original image can be divided into characters, halftone dots, photographs, and background, and thus the ratio of the character portion, halftone portion, and so on can be determined. The ratio of colored characters can be determined in a similar manner.

By counting the cumulative value of the color pixels in each of a plurality of regions partitioned in the main scanning direction, the toner consumption distribution in the main scanning direction can be determined.

The image size is determined according to image size signals generated by the control unit or the distribution of color pixels in the image data.

The character type (size, font) is determined from attribute data of the characters.

The various information cited above can be obtained by well-known techniques in a typical image forming apparatus. The information obtaining means of the copier described up to this point are capable of obtaining at least the information described in the following sections (1) to (12).

(1) Temperature

Figure 5:
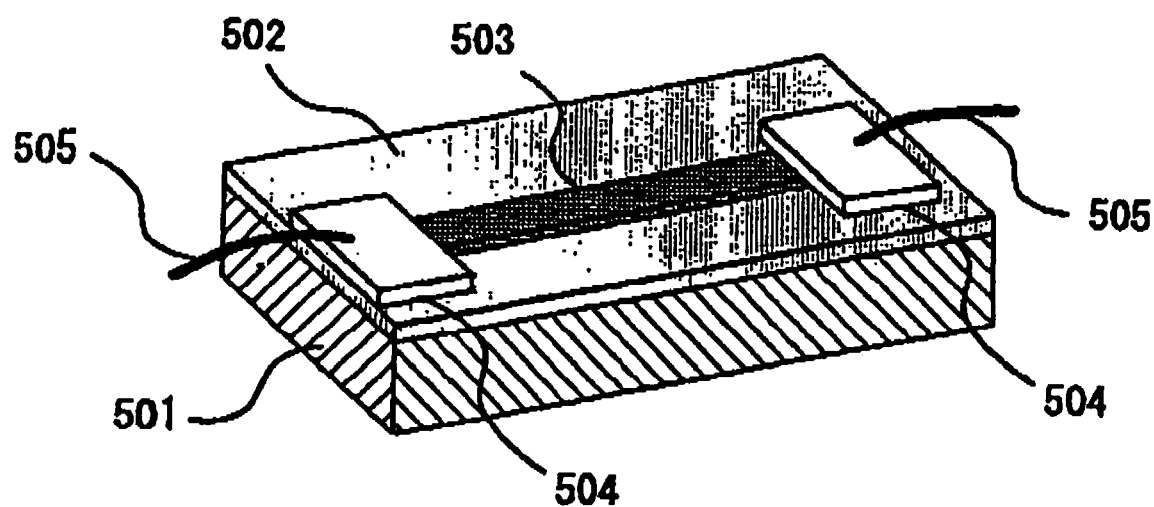
FIG. 5 is a perspective view showing the constitution of a thin-film type resistance variation element in a temperature sensor of the copier.

The copier comprises a temperature sensor using a resistance variation element to obtain temperature information due to the simple principles and constitution of the resistance variation element and the possibility of reducing the element to an extremely small size. FIG. 5 is a perspective view showing a thin film-type resistance variation element in this temperature sensor. The resistance variation element may be constructed as follows. First, a dielectric film 502 is formed on a substrate 501, and then a thin film-form sensor unit 503 constituted by a metallic or semiconductor material is provided thereabove. Pad electrodes 504 are provided at each end of the sensor unit 503, and finally, a lead wire 505 is connected to the pad electrodes 504. In this resistance variation element, the electric resistance of the sensor unit 503 varies with a variation in the ambient temperature, and this variation may be derived as a variation in voltage or current. Since the sensor unit 503 is a thin film, the entire element can be reduced in size, and is therefore easy to incorporate into the system.

Figure 6:
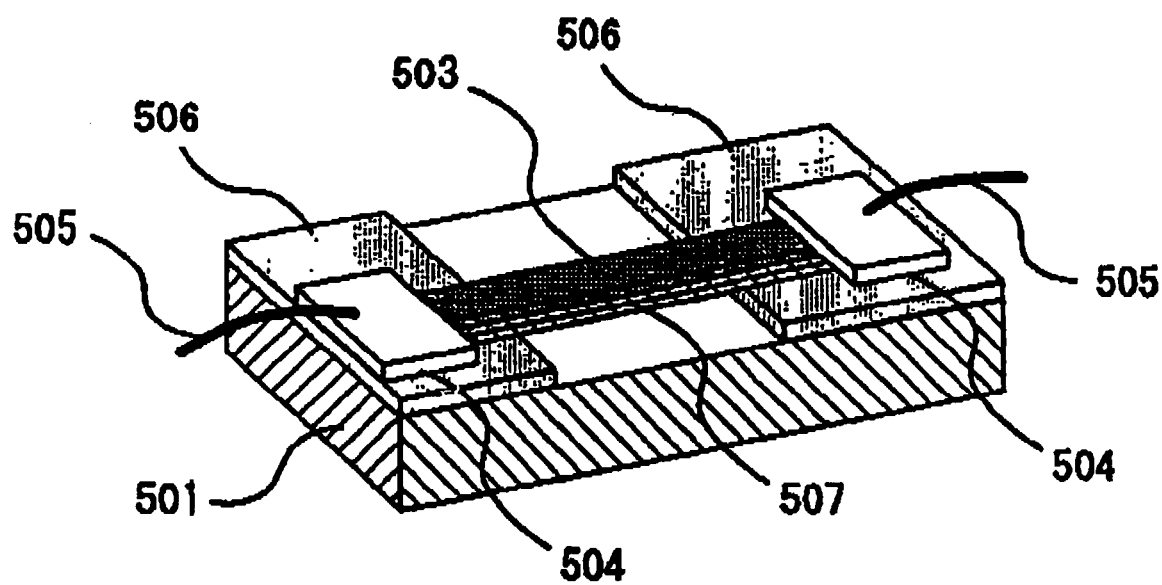
FIG. 6 is a perspective view showing the constitution of a resistance variation element constituted differently to that shown in FIG. 5.

FIG. 6 is a perspective view showing a resistance variation element having a different constitution to that shown in FIG. 5. This resistance variation element differs from the resistance variation element shown in FIG. 5 in that the thin film-form sensor unit 503 is disposed on a thin film bridge 507 which is suspended in midair and separated from the substrate 501 via a spacer 506. By means of such a constitution, heat dissipation from the sensor unit 503 is prevented, and the responsiveness of the sensor unit 503 to temperature is improved. With this constitution, it is possible to detect only radiation heat from the measured portion, which is favorable during non-contact measurement.

(2) Humidity

Figure 7:
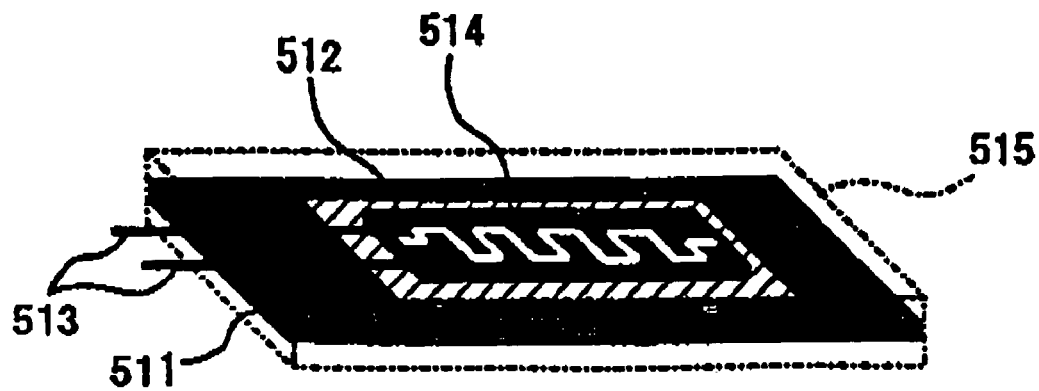
FIG. 7 is a perspective view showing the constitution of a humidity sensor installed in the copier.

A humidity sensor which can be reduced to a small size is useful. The basic principle thereof is that when water vapor is adsorbed to a moisture-sensitive ceramic, ion conduction is increased by the adsorbed water such that the electric resistance of the ceramic decreases. The moisture-sensitive ceramic material is a porous material such as an alumina-based ceramic, apatite-based ceramic, $ZrO_2$—MgO based ceramic, or similar. FIG. 7 is a perspective view showing a humidity sensor installed in the copier. A comb-shaped electrode 512 is provided on an insulating substrate 511, and terminals 513 are connected to each end thereof. A moisture-sensitive layer 514 (typically, a moisture-sensitive ceramic) is provided and the entire sensor is covered by a case 515. When water vapor is adsorbed to the moisture-sensitive ceramic through the case 515, the electric resistance falls, and this may be measured as voltage or current variation.

(3) Oscillation

Figure 8:
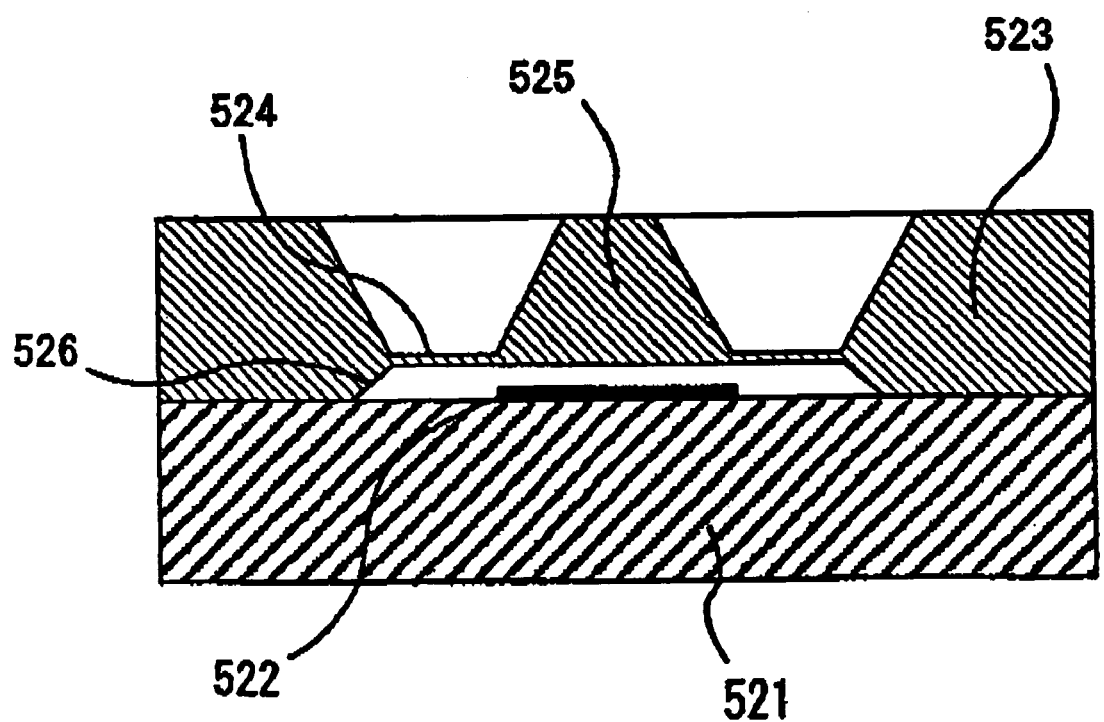
FIG. 8 is a sectional view showing the constitution of a vibration sensor installed in the copier.

The oscillation sensor is basically the same as a sensor which measures air pressure and pressure, and a sensor using silicon, which can be reduced to an extremely small size and installed in the system easily, is particularly useful. The motion of an oscillator manufactured on a thin silicon diaphragm can be measured by measuring volumetric change between the oscillator and a counter electrode provided opposite the oscillator, or using the piezoresistance effect of the Si diaphragm itself. FIG. 8 is a sectional view showing an oscillation sensor installed in the copier. A counter electrode 522 is provided on an insulating substrate 521. Next, a thin diaphragm 524 and an oscillator 525 are provided on a silicon substrate 523. A stepped portion 526 is then formed to maintain the gap with the counter electrode 522, and joined to the substrate 521 comprising the counter electrode 522 formed in advance. When peripheral oscillation or pressure is applied to the sensor in this state, the oscillator 525 begins to oscillate, and this may be measured as volumetric change between the oscillator 525 and the counter electrode 522.

(4) Toner Concentration (for Four Colors)

Figure 9:
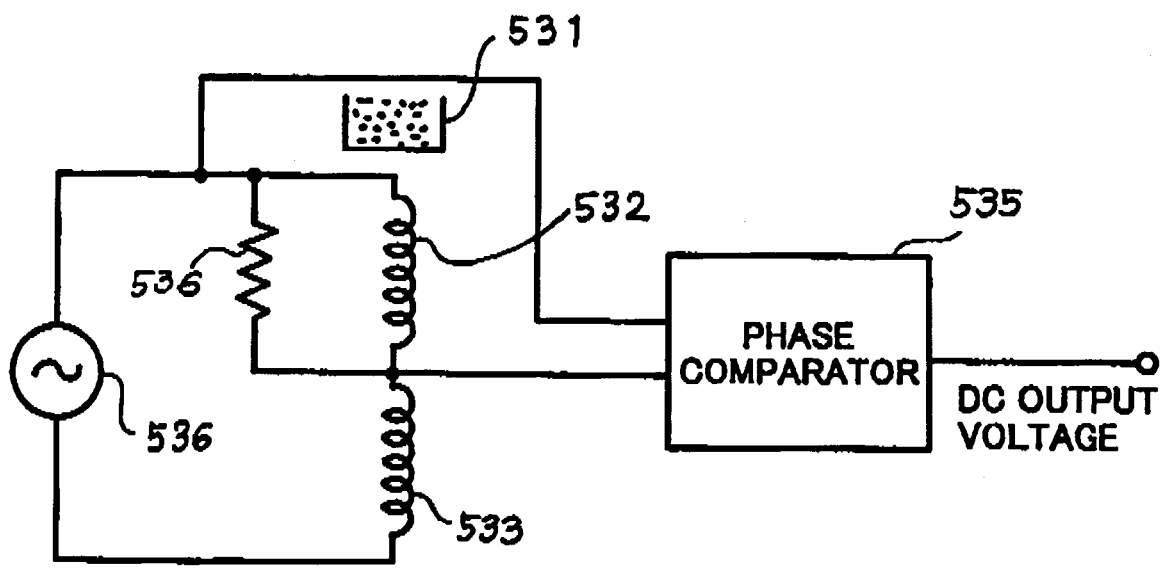
FIG. 9 is a view showing an outline of the constitution of a concentration detecting unit of a toner concentration sensor installed in the copier.
Figure 10:
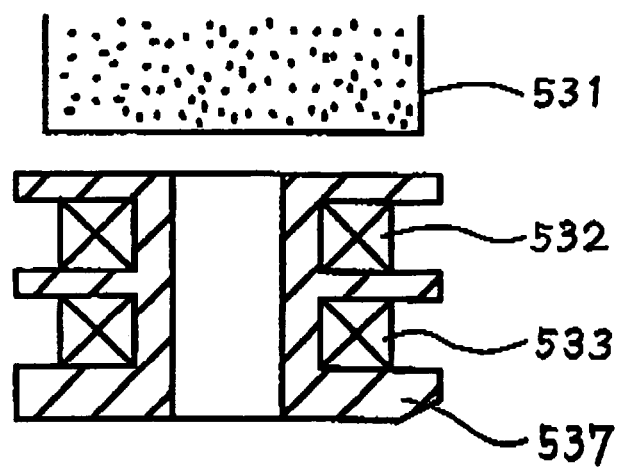
FIG. 10 is a view showing an outline of the constitution of a potential measuring system installed in the copier.

The toner concentration is detected for each color. A known sensor may be used as the toner concentration sensor. For example, the toner concentration may be detected using a sensing system disclosed in Japanese Unexamined Patent Application Publication H6-289717, which measures variation in the magnetic permeability of the developer in a developing device. FIG. 9 is a schematic diagram showing the constitution of a concentration detection unit of a toner concentration sensor installed in this copier. For example, a reference coil 533 is connected differentially to a detection coil 532 disposed in the vicinity of a developer 531 formed from a mixture of a magnetic carrier and a non-magnetic toner. The inductance of the detection coil 532 varies in accordance with variation in the magnetic permeability caused by an increase or decrease in the toner concentration (directly, in the magnetic carrier), whereas the inductance of the reference coil 533 is not affected by variation in the toner concentration. An alternating current drive source 534 which oscillates at 500 [kHz], for example, is connected to the series circuit constituted by the two coils 532, 533 so as to drive the two coils 532, 533. A differential output is derived from the connection point of the two coils 532, 533, and this output is connected to a phase comparator 535. One of the outputs of the alternating current drive source 534 is connected separately to the phase comparator 535, and thus the phase of the voltage and differential output voltage from the drive source 534 are compared. A sensitivity setting resistance 536 (R1) is connected in series with at least one of the detection coil S32 and the reference coil 533 (the detection coil 532 in the illustrated example) in order to increase sensitivity to variation in the toner concentration, thereby enabling control of the sensitivity characteristic. An assembly drawing of the two coils is shown in FIG. 10. The two coils 532, 533 are wound on a tubular coil support 537 adjacent to each other in the vertical direction of the drawing. The detection coil 532 is positioned on the side nearest the developer 531 in order to detect variation in the magnetic permeability, and the reference coil 533 is disposed on the far side so that the magnetic permeability does not change even when the toner concentration varies.

(5) Photosensitive Body Uniform Charging Potential (for Four Colors)

Figure 11:
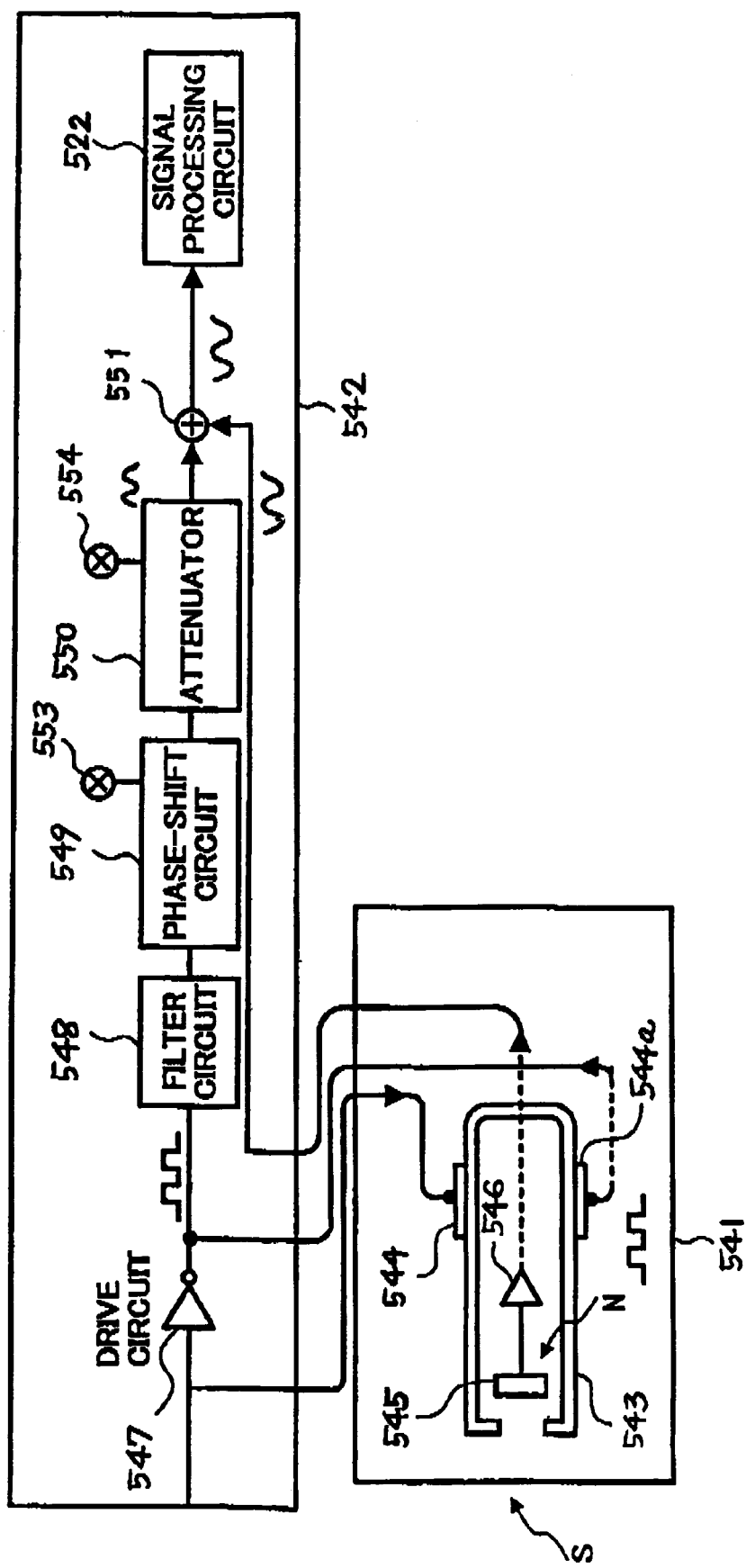
FIG. 11 is a view showing an outline of the constitution of the potential measuring system for detecting a charging potential that is used in the first embodiment.

The uniform charging potential is detected in the photosensitive bodies 40K, Y, M, C of each color. FIG. 11 is a schematic diagram showing the constitution of a potential measuring system installed in the copier. In the drawing, the reference numeral 541 denotes a sensor unit substrate attached opposite a physical object (not shown). The reference numeral 542 denotes a signal processing unit substrate for transmitting drive signals to and receiving sensor output from the sensor unit substrate 541. A tuning fork 543 serving as chopping means and a piezoelectric element 544 are provided within the sensor unit substrate 541. The piezoelectric element 544 is driven by a drive signal from the signal processing unit substrate 542. In this potential measuring system, a self-oscillation system loop is used such that when one piezoelectric element 544 is driven, the resulting oscillation is transmitted to another piezoelectric element 544a through the tuning fork 543, and then returns to the drive source. The reference numeral 545 denotes a measuring electrode (to be referred to as "electrode" hereafter) which receives an electric line of force from the physical object. The reference numeral 546 denotes an amplifier which amplifies the temporal variation in the electric line of force S received by the electrode 545.

A piezoelectric element drive circuit 547, a filter 548, and a piezoelectric element drive circuit 549 are provided in the signal processing unit substrate 542. The filter 548 shapes a waveform. The phase-shift circuit 549 aims to shift the phase difference between the drive signal fed into the sensor and the actual drive signal by 180° so that they cancel each other out. The phase difference between the two signals typically differs according to the feed path. An attenuator 550 serves to adjust the size of a phase-adjusted correction signal. An adding circuit 551 adds the correction signal to the sensor output. A processing circuit 552 processes the final signal output, and thus determines the potential of the physical object. The reference numerals 553, 554 denote a phase-shift circuit and an attenuator adjusting volume respectively. With this constitution, the phase-shift and attenuator gain are optimized such that an opposite phase and a signal of the same level can be added as a correction signal, thus enabling only sensor output based on the actual physical object to be detected. Further, by providing adjustment means, characteristic variation accompanying change over time can be dealt with by means of adjustment, and thus the reliability of the sensor is improved.

(6) Post-Development Potential of Photosensitive Body (for Four Colors)

The surface potential of the photosensitive bodies 40K, Y, M, C following optical recording is detected in the same manner as that described in (5).

(7) Colored Area Ratio (for Four Colors)

The colored area ratio is determined for each color from the ratio of the total cumulative value of the pixels to be colored and the total cumulative value of all of the pixels, which is learned from the input image information.

(8) Development Toner Amount (for Four Colors)

The toner adhesion amount per unit area on each of the toner images developed on the photosensitive bodies 40K, Y, M, C is determined on the basis of the optical reflectance produced by a reflection photosensor. The reflection photosensor irradiates a physical object with LED light, and detects the reflected light using a light-receiving element. A correlative relationship is established between the toner adhesion amount and the optical reflectance, and hence the toner adhesion amount can be determined on the basis of the optical reflectance.

(9) Slanting of Paper Front End Position

A pair of optical sensors is disposed at a point on the paper feed path from the feed roller of the paper feed unit 200 to the secondary transfer nip in order to detect the transfer paper at both ends of an orthogonal direction to the conveyance direction, and thus the two ends of the conveyed transfer paper in the vicinity of the front end thereof are detected. The two optical sensors are used to measure the time required for the paper to pass through, using the time at which a feed roller drive signal is issued as a reference, and slanting of the transfer paper in relation to the conveyance direction is determined on the basis of a divergence in this time.

(10) Paper Discharge Timing

The transfer paper is detected by an optical sensor after passing through a pair of discharge rollers (56 in FIG. 1). Similarly in this case, measurement is performed with the time at which the feed roller drive signal is issued as a reference.

(11) Photosensitive Body Total Current (for Four Colors)

The current flowing out to earth from the photosensitive bodies 40K, Y, M, C is detected. This current can be detected by providing current measuring means between the photosensitive body substrate and the ground terminal.

(12) Drive Power of Photosensitive Body (for Four Colors)

The drive power (current×voltage) consumed by the drive source (motor) of the photosensitive bodies during driving is detected by an ammeter, a voltmeter, and so on.

Next, the characteristic constitution of this copier will be described.

The copier is designed to determine whether or not an abnormality has occurred in the apparatus by determining a Mahalanobis distance using an MTS method on the basis of grouped information constituted by a plurality of types of information obtained by the information obtaining means. To implement this determination, an inverse matrix of a normal group data set obtained in advance is stored in the ROM 1c of the control unit 1. The CPU 1a determines on the basis of this inverse matrix whether or not an abnormality is present in the grouped information comprising all or some combinations of the various information obtained by the information obtaining means, and then displays fault warning information on the operation display unit 3 in accordance with the result. In other words, in this copier the control unit 1 functions as determining means for determining the presence of an abnormality in the detection subject copier. Note that a notification method using sound, characters, a lamp display, and so on, instead of display on the operation display unit 3, may be employed as notification means for notifying the user of the fault warning information.

FIG. 17 is an obtained data table illustrating a normal data obtaining process performed to construct the inverse matrix described above on the basis of the various information obtained from the copier in a normal state. In this obtained data table, an example is illustrated in which the inverse matrix is constructed from n sets of grouped information comprising k types of information.

In the normal data obtaining process, first, k types of information $y_{11}, y_{12}, \ldots, y_{1k}$, constituting a first set of grouped information, are obtained respectively by the information obtaining means, and stored in information storage means such as RAM of a test machine as data on the first row of the data table. Next, k types of information $y_{21}, y_{22}, \ldots, y_{2k}$, constituting a second set of grouped information, are obtained respectively by the information obtaining means, and stored in the information storage means as data on the second row of the data table. The third set to the nth set of grouped information are then obtained similarly and stored in the information storage means as data on the third row to the nth row of the data table. Finally, the average and standard deviation a of the respective n sets are determined for the k types of information constituting each set of grouped information and stored in the information storage means as data on the n+1 and n+2 rows respectively.

Once the normal data obtaining process is complete, an information normalization process is implemented to construct a normalized data table such as that shown in FIG. 18. This normalized data table is constructed on the basis of the obtained data table described above.

Data normalization refers to processing for transforming the absolute value information of the obtained information into variable information. The normalized data of the various information is calculated on the basis of the following Eq. (1). Note that in the following expression, the symbol i denotes any one of the n sets of grouped information, and the symbol j denotes any one of the k types of information.

$$Y_{ij} = (y_{ij} - \overline{y}_j)/\sigma_j \qquad \text{Eq. (1)}$$

Once this information normalization process is complete, a correlation coefficient calculation process is performed. In the correlation coefficient calculation process, a correlation coefficient $r_{pq}$ ($r_{pq}$) is calculated on the basis of the following Eq. (2) for all possible combinations ($_kC_2$ variants) of two different types of the k types of normalized data in the n groups of normalized data sets.

$$r_{pq} = r_{qp} = \frac{\sum_{i=1}^{n} (Y_{ip} \times Y_{iq})}{\sqrt{\sum_{i=1}^{n} (Y_{ip})^2 \times \sum_{i=1}^{n} (Y_{iq})^2}} \qquad \text{Eq. (2)}$$

When the correlation coefficient $r_{pq}$ ($r_{pq}$) has been calculated for all of the combinations, a k×k correlation coefficient matrix R is constructed with 1 as its diagonal element and the correlation coefficient $r_{pq}$ as the remaining elements of the p rows and q columns. The content of the correlation coefficient matrix R is as shown in Eq. (3).

$$R = \begin{pmatrix} 1 & r_{12} & r_{13} & \cdots & r_{1k} \\ r_{21} & 1 & r_{23} & \cdots & r_{2k} \\ r_{31} & r_{32} & 1 & \cdots & r_{3k} \\ \cdots & \cdots & \cdots & \cdots & \cdots \\ r_{k1} & r_{k2} & r_{k3} & \cdots & 1 \end{pmatrix} \qquad \text{Eq. (3)}$$

Once this correlation coefficient calculation process is complete, a matrix transformation process is implemented. By means of this matrix transformation process, the correlation coefficient matrix R shown in Eq. (3) is transformed into an inverse matrix A ($R^{-1}$) shown in Eq. (4).

$$A = \begin{pmatrix} a_{11} & a_{12} & a_{13} & \cdots & a_{1k} \\ a_{21} & a_{22} & a_{23} & \cdots & a_{2k} \\ a_{31} & a_{32} & a_{33} & \cdots & a_{3k} \\ \cdots & \cdots & \cdots & \cdots & \cdots \\ a_{k1} & a_{k2} & a_{k3} & \cdots & a_{kk} \end{pmatrix} = R^{-1} \qquad \text{Eq. (4)}$$

In this copier, the inverse matrix A constructed by the series of processes described above, comprising the normal data obtaining process, the information normalization process, the correlation coefficient calculation process, and the matrix transformation process, is stored in the ROM 1c. Then, the Mahalanobis distance D on the multidimensional space produced by the inverse matrix A is calculated on the basis of Eq. (5) for the grouped information constituted by all or some combinations of the various information obtained periodically by the information obtaining means.

$$D^2 = \frac{1}{k} \sum_{P=1}^{k} \sum_{q=1}^{k} a_{pq} Y_p Y_q \qquad \text{Eq. (5)}$$

Figure 12:
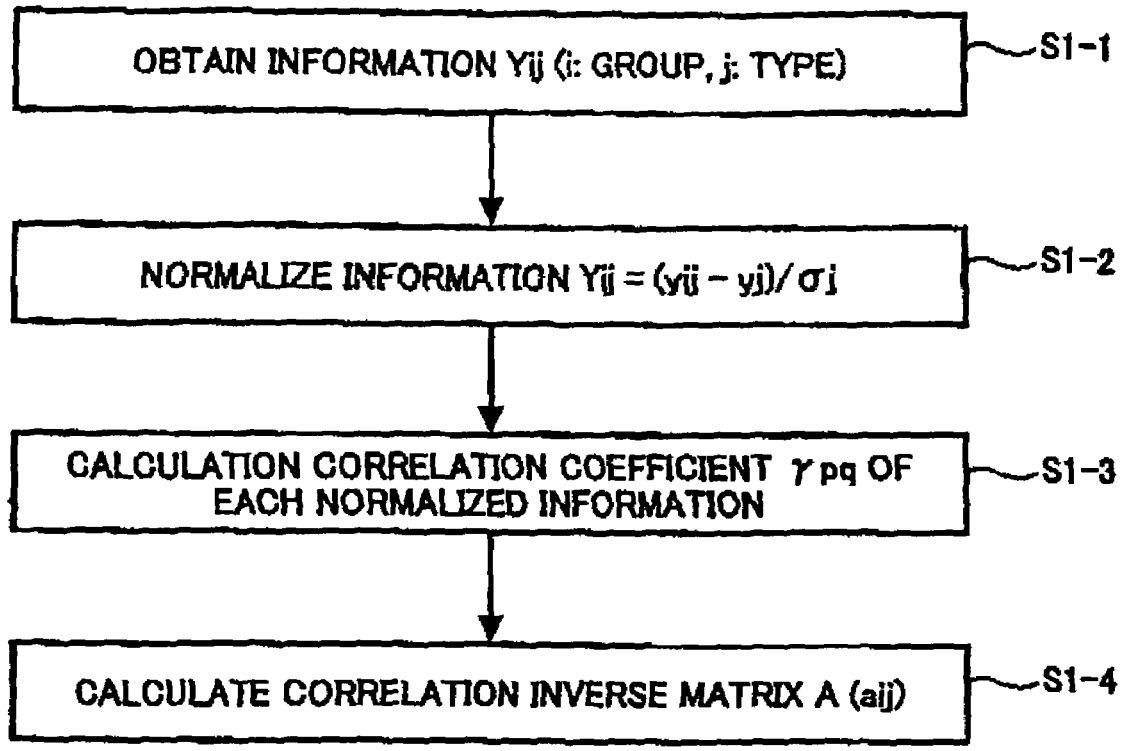
FIG. 12 is a flowchart showing a series of processes from a normal data obtaining process to a matrix transformation process.

FIG. 12 is a flowchart showing the series of processes from the normal data obtaining process to the matrix transformation process. In the flowchart, first n groups of k pieces of information relating to the state of the copier are obtained while the copier is operative (step 1-1: hereafter, step will be abbreviated to S). Next, an average value and standard deviation σ are calculated on the basis of the above Eq. (1) for each type (j) of information, and a normalized data table is constructed from the calculation results (S1-2). The correlation coefficient matrix R is then constructed on the basis of the normalized data table (S1-3), and then transformed into the inverse matrix A (S1-4).

Figure 13:
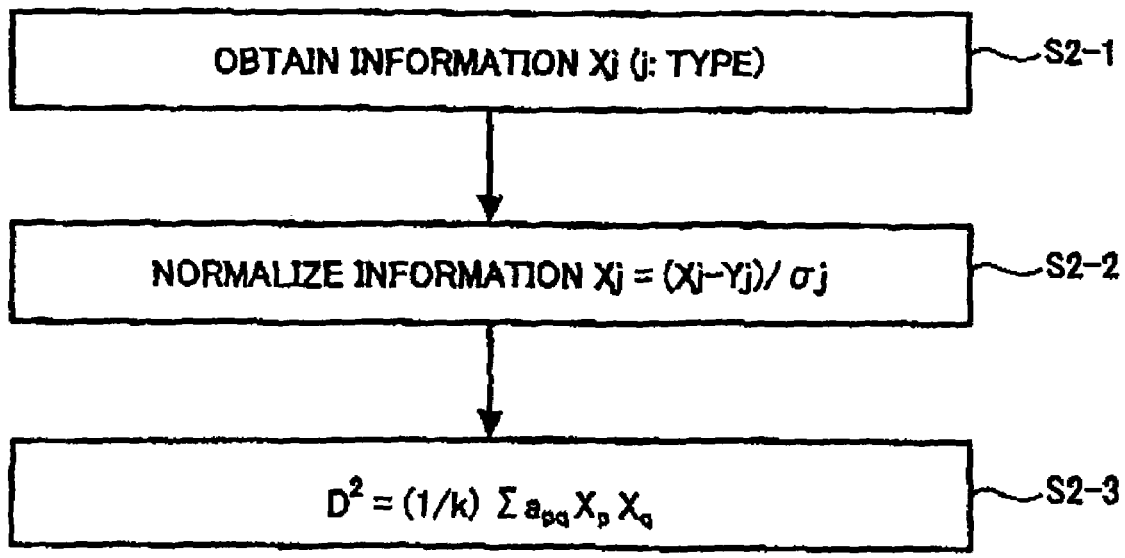
FIG. 13 is a flowchart showing a procedure for calculating a Mahalanobis distance D on the basis of an inverse matrix A and various obtained data.

FIG. 13 is a flowchart showing a procedure for calculating the Mahalanobis distance D on the basis of the inverse matrix A and the various obtained data. In this procedure, first k types of data $x_1, x_2, \ldots, x_k$ in any state are obtained (S2-1). The data types correspond to $Y_{11}, y_{12}, \ldots, y_{1k}$, and so on. Next, the obtained data are normalized respectively to $X_1, X_2, \ldots, X_k$ on the basis of Eq. (1) above. Then, using Eq. (5) above, which is determined using the element $a_{kk}$ of the constructed inverse matrix A, the square of the Mahalanobis distance D is calculated. The symbol Σ in the drawing denotes the sum relating to the suffixes p and q.

The control unit 1 compares the Mahalanobis distance D determined in this manner to a preset threshold. When the Mahalanobis distance D is greater than the threshold, the control unit 1 determines the obtained grouped information to be abnormal data deviating greatly from a normal distribution, and hence displays fault warning information on the operation display unit 3.

An example in which the inverse matrix A serving as a normal group data set is stored in the ROM 1c was described, but the normal group data set may be stored as the aforementioned obtained data table storing the various information obtained in the normal data obtaining process, the aforementioned normalized data table, the aforementioned correlation coefficient matrix R, and so on instead of the inverse matrix A. When one of these normal group data sets is stored instead of the inverse matrix A, the inverse matrix A should be constructed on the basis of the data prior to abnormality determination.

According to the copier constituted in this manner, the presence of an abnormality in the obtained results of the grouped information constituted by all or some combinations of various information is determined using an MTS method, and hence various types of abnormality can be discovered in a wide range. Moreover, since there is no need to monitor the presence of the causes of each individual abnormality, an increase in control complexity caused by such monitoring can be avoided. However, it is difficult to specify the type of abnormality when an abnormality is discovered in a test copier on which this type of abnormality determination is performed.

Hence in this copier, abnormality types are divided into several categories, and the grouped information required to determine the individual abnormalities within the categories is obtained for each category. Mahalanobis distances D are then determined respectively on the basis of the obtained results and the inverse matrix A serving as the corresponding normal group data set.

FIG. 19 is a table showing an example of a relationship between categories of abnormality types in the copier, and the grouped information required to determine an abnormality within these categories.

In FIG. 19, an example is shown in which abnormalities relating to three categories are determined respectively on the basis of the 12 items and 33 types (5 items+7 items×four colors) of obtained information from the aforementioned (1) temperature to (12) drive power of photosensitive body. As shown in the drawing, for an abnormality relating to a paper jam, a determination can be made on the basis of grouped information comprising the following 7 items and 13 types of information: (1) temperature; (2) humidity; (3) oscillation; (7) colored area ratio×four colors; (8) development toner amount×four colors; (9) slanting of paper front end position; and (10) paper discharge timing. Hereafter, this grouped information will be referred to as first grouped information.

An abnormality relating to deterioration of the photosensitive body can be determined on the basis of grouped information comprising the following 7 items and 22 types of information: (1) temperature; (2) humidity; (5) uniform charging potential of the photosensitive body×four colors; (6) potential of the photosensitive body after exposure×four colors; (7) colored area ratio×four colors; (11) total current of photosensitive body×four colors; and (12) drive power of photosensitive body×four colors. Hereafter, this grouped information will be referred to as second grouped information.

An abnormality relating to variation in the image density can be determined on the basis of grouped information comprising the following 7 items and 22 types of information: (1) temperature; (2) humidity; (4) toner concentration× four colors; (5) uniform charging potential of the photosensitive body×four colors; (6) potential of the photosensitive body after exposure×four colors; (7) colored area ratio×four colors; and (8) development toner amount×four colors. Hereafter, this grouped information will be referred to as third grouped information.

As is clear from FIG. 19, the first, second, and third grouped information each have a different combination of information. This is due to the fact that the combination of information required to determine the individual abnormalities in each category differs according to the category. Hence, by obtaining at least two or more sets of grouped information differing in their combinations of information and determining the respective Mahalanobis distances D thereof, specification of the type of the abnormality that is occurring can be narrowed to a category unit. In the example in FIG. 19, by determining the Mahalanobis distance D for each of the first, second, and third sets of grouped information, the abnormality type can be narrowed to the corresponding one of the three categories.

To determine the Mahalanobis distance D, an inverse matrix A having the same combination as the grouped information obtained periodically from the detection subject copier must be constructed. In FIG. 19, for example, if an inverse matrix A comprising the 12 items and 33 types (5 items+7 items×four colors) of information is used in common for all of the first, second, and third group information, abnormalities cannot be determined accurately. In the case of the first grouped information, the Mahalanobis distance D must be determined using an inverse matrix A comprising the same 7 items and 13 types of information that are included therein. Accordingly, inverse matrices A for determining the Mahalanobis distance D in each category must be prepared prior to determination.

There are two main methods of preparing an inverse matrix A for the respective sets of grouped information. In the first method, unique inverse matrices A (or alternative normal group data sets) for each set of grouped information are stored in the information storage means such as the ROM 1c. In the second method, an inverse matrix A is stored only for an all-type set of grouped information comprising at least all of the types of information included in each set of grouped information. When this method is used, the individual inverse matrices A for the respective sets of grouped information are constructed respectively on the basis of a desired combination of normal values selected from the inverse matrix A constituted by the collection of all-type grouped information. In FIG. 19, for example, only the inverse matrix A constituted by the collection of all-type grouped information (12 items, 33 types) is stored. The inverse matrix A constituted by the collection of first grouped information corresponding to a paper jam is then constructed by selecting 7 items and 13 types of information from the all-type grouped information. With this method, the amount of information to be stored in the information storage unit can be reduced below that of the first method. Hence in this copier, unique inverse matrices A for each set of grouped information are constructed according to the second method.

When an inverse matrix A for each category is constructed from information selected from the all-type grouped information in this manner, a Mahalanobis distance D can be determined for the all-type grouped information as well as for each set of grouped information. By determining the former Mahalanobis distance D, abnormalities in other categories can be determined as well as abnormalities in the categories corresponding respectively to the sets of grouped information. For example, by determining the Mahalanobis distance D of the all-type grouped information in the example in FIG. 19, an abnormality can be determined in another category in addition to the paper jam, photosensitive body deterioration, and image density variation categories.

FIG. 20 shows an example of a relationship between each category and the Mahalanobis distance. Note that in FIG. 20, $(D_0)^2$ indicates the square value of the Mahalanobis distance of the all-type grouped information (12 items, 33 types) in FIG. 19. Further, $(D_1)^2$ indicates the square value of the Mahalanobis distance of the first grouped information (7 items, 13 types) corresponding to an abnormality relating to a paper jam. $(D_2)^2$ indicates the square value of the Mahalanobis distance of the second grouped information (7 items, 22 types) corresponding to an abnormality relating to deterioration of the photosensitive body. $(D_3)^2$ indicates the square value of the Mahalanobis distance of the third grouped information (7 items, 22 types) corresponding to an abnormality relating to variation in the image density.

As shown in FIG. 20, although the Mahalanobis distances $(D_1)^2$, $(D_2)^2$, $(D_3)^2$ corresponding to each category are all lower than the threshold 10, this does not necessarily mean that there are absolutely no abnormalities in the copier. Even though these Mahalanobis distances are less than the threshold, the Mahalanobis distance $(D_0)^2$ of the all-type grouped information may be equal to or greater than the threshold. In such a case, it may be considered that an abnormality has occurred in a category which does not correspond to any of the paper jam, photosensitive body deterioration, and image density variation categories. Conversely, even when one of the Mahalanobis distances $(D_1)^2$, $(D_2)^2$, $(D_3)^2$ falls below the threshold 10, this does not necessarily mean that the Mahalanobis distance $(D_0)^2$ of the all-type grouped information also equals or exceeds the threshold. Even though the copier as a whole may not be in an abnormal state, a minor abnormality may be discovered by focussing on each category one by one. In such a case, one of the Mahalanobis distances for the three categories equals or exceeds the threshold, whereas the Mahalanobis distance $(D_0)^2$ of the all-type grouped information falls below the threshold.

By determining the Mahalanobis distance $(D_0)^2$ of the all-type grouped information in addition to the Mahalanobis distances $(D_1)^2$, $(D_2)^2$, $(D_3)^2$ for each category in this manner, it is also possible to determine the extent of the abnormality (whether or not the abnormality is minor) in each category. Hence in this copier, abnormalities are determined on the basis of the plurality of Mahalanobis distances corresponding individually to the respective sets of grouped information, and the Mahalanobis distance $(D_0)^2$ of the all-type grouped information.

Note that an example was described in which the thresholds for the respective Mahalanobis distances were all set to 10, but it is preferable that the thresholds be set to different values in accordance with the actual abnormalities.

There are two main methods of storing the inverse matrix A or the alternative normal group data set (the obtained data table, for example) in the information storage means such as the ROM 1c. In the first method, a normal standard device is operated to obtain a standard inverse matrix A, and the same inverse matrix A is stored in advance, prior to factory shipment, in the information storage means of each individual finished copier. In the second method, the individual finished copiers are shipped without storing the inverse matrix A, and the inverse matrix A is stored on the basis of the obtained results of various information obtained during an initial operation at the shipment destination. Immediately after shipment, the finished copiers are in a normal state, having recently undergone inspection, and therefore the obtained results of the various information obtained during the initial operation may be used as normal values. When the second method is employed, an inverse matrix constructed on the basis of various information obtained in reality in the individual finished copiers, rather than an inverse matrix constructed on the basis of a test operation of a standard machine, is used as the inverse matrix A (or the alternative normal group data set). Hence, variation among finished products in the normal values of the various information used to determine an abnormality, caused by precision errors in the various components and so on, can be avoided, thus preventing deterioration of the determination precision. Moreover, the inverse matrix A is constructed automatically at the shipment destination, and hence cost increases arising when the inverse matrix A is constructed at the factory before shipment by performing a test operation on each finished product can also be avoided. Therefore, in this copier the inverse matrix A (or the alternative normal group data set) is constructed according to the second method during an initial operation at the shipment destination.

When the copier determines that an abnormality has occurred on the basis of a comparison between the calculated Mahalanobis distance D and the threshold, fault warning information is displayed on the operation display unit 3 as described above to notify the user or the like of the abnormality. Hence the operation display unit 3 is caused to function as notification means for notifying the determination results of the abnormality determining apparatus. The notification means may perform notification through sound or notification through recording on a recording medium instead of notification through display.

Figure 14:
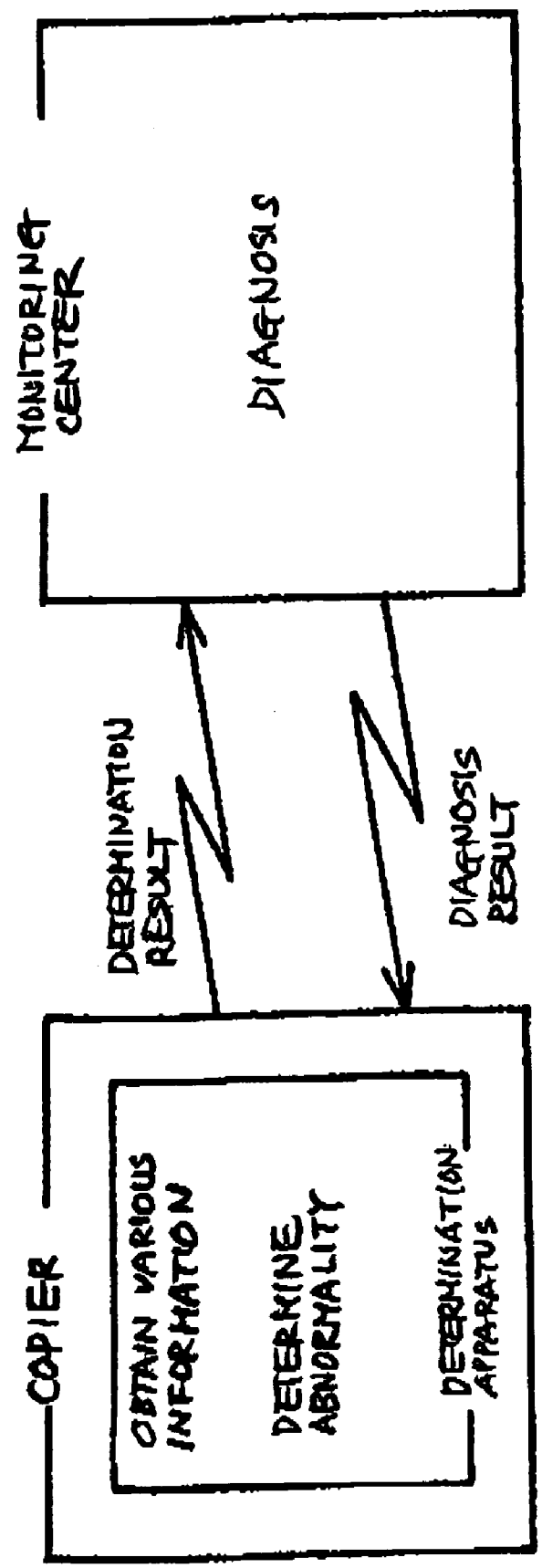
FIG. 14 is a view illustrating communication between the copier and a monitoring sensor disposed in a remote location.

The fault warning information may take any form, such as information, characters, words, numerical values such as the Mahalanobis distance D, a graph, and so on, providing the user or the like is informed of the danger of a fault occurring. Further, in addition to, or instead of, informing a person at the shipment destination, a person in a remote monitoring center may be informed via a communication line, as shown in FIG. 14. In so doing, the diagnosis of a specialist can be obtained. The abnormality determination results are preferably stored in succession in the information storage means such as the RAM 1b. By storing the determination results in succession, the temporal progression of the abnormality and so on can be investigated at a later stage.

Depending on the determination result, it is desirable that the image forming conditions be modified or a part of the image forming operation be restricted. More specifically, the following responses in (a) to (c) may be considered.

(a) Halting the Apparatus

In cases such as when the Mahalanobis distance D reaches the abnormality threshold or the increase rate of the Mahalanobis distance D rises over time, the apparatus may be halted forcibly and a request for maintenance transmitted to the user.

(b) Restricting the Image Forming Operation or Modifying the Control Parameters (b-1) Modifying the color mode (b-2) Modifying the recording speed (b-3) Modifying the screen ruling in the halftone portion of the image (b-4) Modifying the halftone processing method (b-5) Restricting the types of paper that can be used (b-6) Modifying the registration control parameters (b-7) Modifying the image formation process parameters (uniform charging potential, exposure amount, development bias, transfer bias, etc.).

(c) Replenishing or Replacing Consumables or Components

Replenishment or replacement may be performed automatically on the basis of the Mahalanobis distance D calculation result.

Depending on the type of the abnormality that has occurred, the abnormality may be repaired automatically using a type of mechanism or function. By implementing control to repair such types of abnormality automatically, maintainability can be improved even further.

Figure 15:
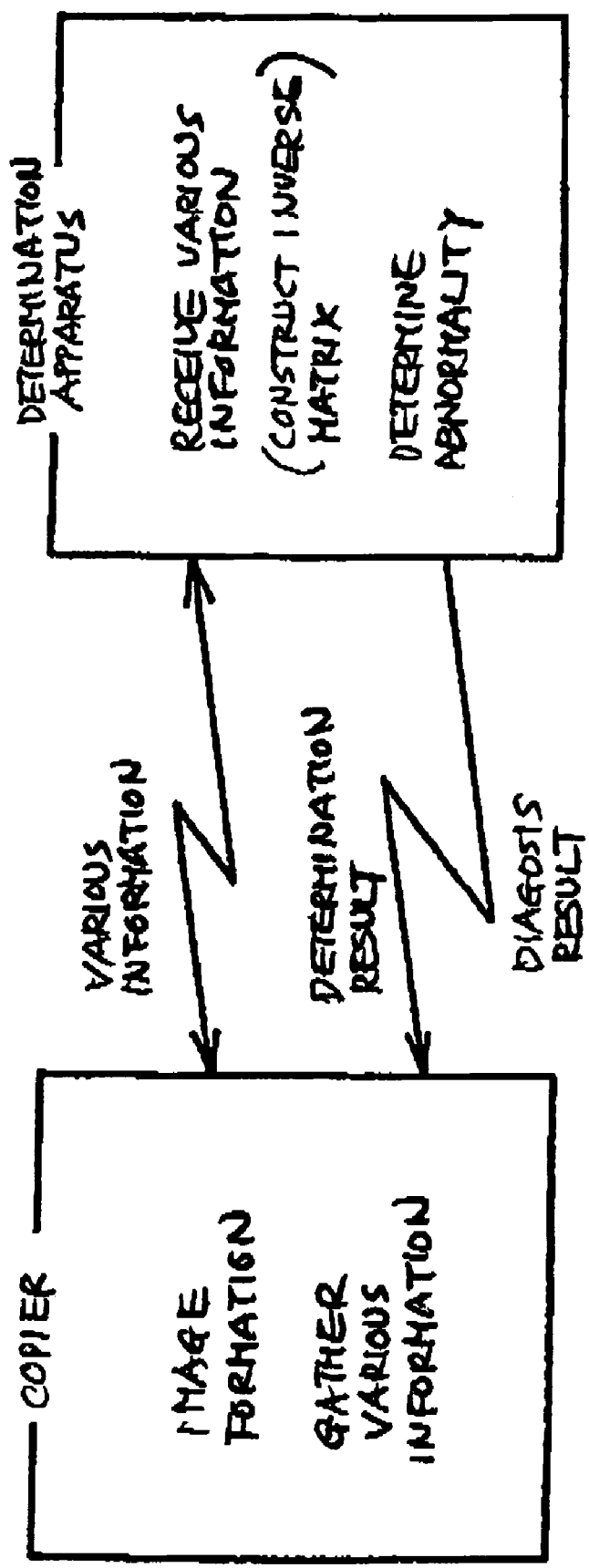
FIG. 15 is a view illustrating communication between an abnormality determining apparatus according to a modification of the first embodiment, and a copier serving as a detection subject thereof.
Figure 16:
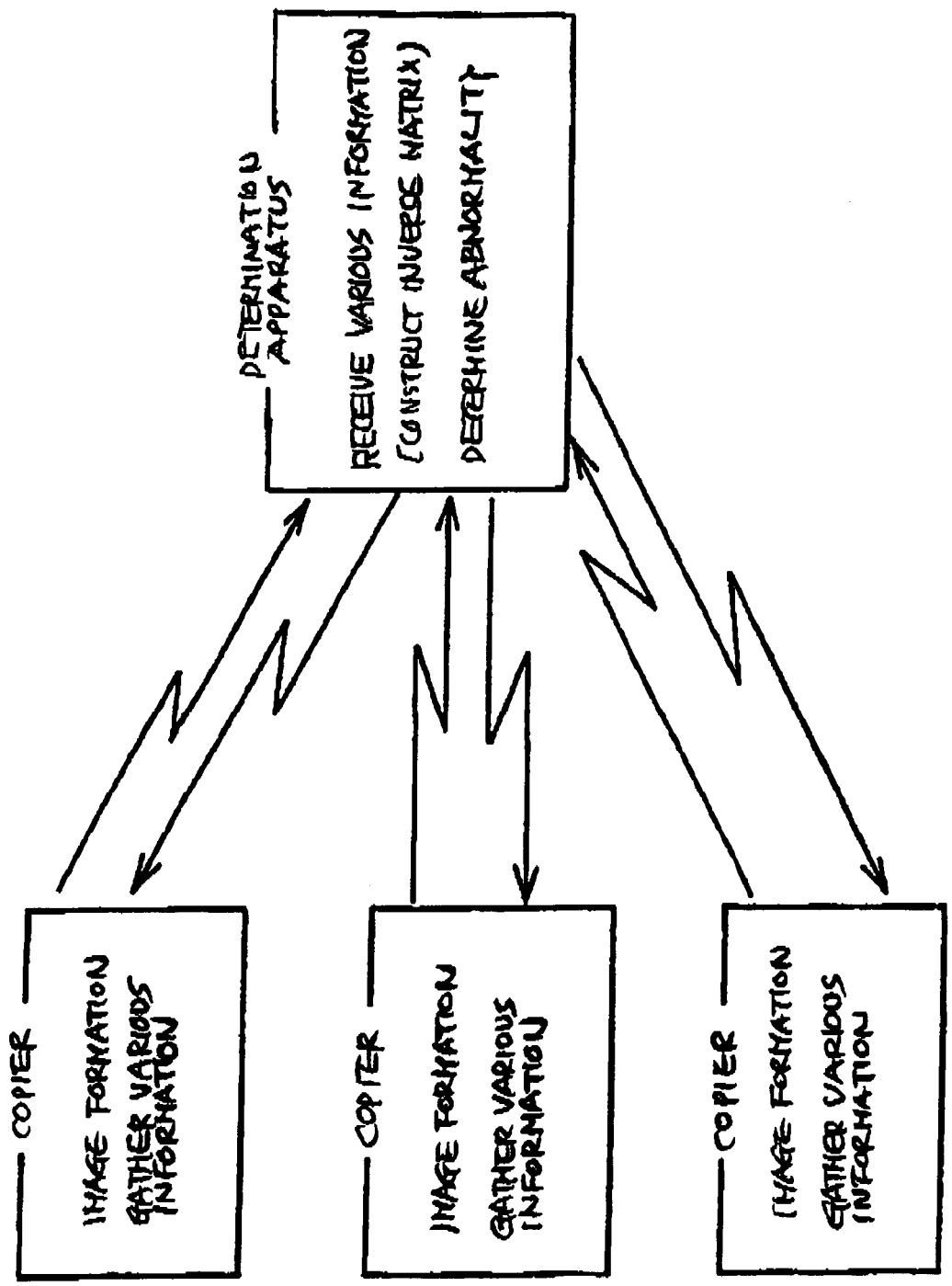
FIG. 16 is a view illustrating another modification of the communication performed between the abnormality determining apparatus and a plurality of copiers.

Up to this point, examples in which the abnormality determining apparatus is installed in the main body of the copier have been described. However, as shown in FIG. 15, the abnormality determining apparatus may be constituted separately to the copier. In this case, reception means of the abnormality determining apparatus for receiving various information transmitted from the copier over a communication line function as the information obtaining means of the abnormality determining apparatus, rather than the various sensors and control unit installed in the copier. As a result, determination and diagnosis of an abnormality can be performed in a remote location removed from the copier. Moreover, as shown in FIG. 16, abnormalities in each of a plurality of copiers can be determined by having a single abnormality determining apparatus manage the plurality of copiers centrally. Further, if transmission means for transmitting a determination result to the outside over a communication line are provided in the abnormality determining apparatus, the determination result can be transmitted to various copiers disposed in different remote locations, and thus notified to the respective operators. The communication line may take any form, either wired or wireless, using optical fiber instead of electric lines, and so on.

In this copier, as described above, a normal group data set (the inverse matrix A, for example) for the set of all-type grouped information constituted by at least all of the types of information included in the various sets of grouped information is stored as a normal group data set in the information storage means such as the ROM. The CPU $1a$ serving as determination means then constructs unique normal group data sets for each set of grouped information on the basis of a combination of normal values selected from the normal group data set for the all-type grouped information. With this constitution, for the reasons described above, the amount of information to be stored in the information storage means can be reduced in comparison with a case where unique normal group data sets are stored respectively for each set of grouped information.

Further, in this copier the CPU $1a$ determines the presence of an abnormality in the detection subject copier on the basis of a plurality of Mahalanobis distances corresponding individually to the various sets of grouped information, constituted by combinations of several pieces of information from the all-type grouped information, and the Mahalanobis distance of the all-type grouped information. With this constitution, for the reasons described above, abnormalities can be determined in other categories in addition to abnormalities in the categories corresponding to the various sets of grouped information, such as abnormalities relating to a paper jam, abnormalities relating to a deterioration of the photosensitive body, and abnormalities relating to variation in the image density. Moreover, the extent of the abnormality in each category (whether or not the abnormality is minor) can be determined.

Further, in this copier, the printer unit 100 and paper feed unit 200 serving as image forming means develop a latent image formed on a photosensitive body serving as a latent image carrier into a toner image using a developing unit serving as developing means, and then transfer the toner image onto transfer paper serving as a recording medium using transfer means. With this constitution, abnormalities in the electrophotographic image forming process can be detected by the abnormality determining apparatus. Electrophotographic image forming apparatuses feature (1) a large number of constitutional components and a complicated development causal relationship, (2) a tendency to be affected by the usage environment, for example the temperature and humidity, (3) a tendency to be affected by deterioration of consumables such as units and components, (4) large differences in usage conditions depending on the user, and so on. In an image forming apparatus having such a complicated constitution and development process, even abnormalities such as faults having no obvious cause can be predicted by means of simple data processing.

Further, in this copier, at least one of the plurality of types of information obtained by the information obtaining means is detection information detected by sensors, control parameter information used to control the image forming apparatus, image information for forming a latent image, and information relating to a toner image following development. The detection value information detected by sensors provided in the copier includes information relating to the internal state of the apparatus and the peripheral state of the apparatus, which are closely linked to the state of the copier. The control parameter value information, which is used to control the copier, includes information regarding the content of the control, which greatly affects the operational state of the copier. The image information for forming a latent image and information relating to a toner image following development include information regarding the image forming function, which greatly affects the state of the copier. By calculating the Mahalanobis distance D from this information, changes of state in the copier can be determined with a high degree of precision, and hence the occurrence of an abnormality can also be predicted with a high degree of precision.

Further, in this copier, the CPU $1a$ is caused to function as normal group data set construction means for constructing a normal group data set such as the inverse matrix A on the basis of the obtained results of the information obtaining means. With this constitution, for the reasons described above, deterioration of the determination precision caused by component errors in each finished printer can be avoided, and cost increases arising when a test operation is performed to construct each inverse matrix for each finished product prior to shipment can also be avoided.

Further, in this copier, notification means such as the operation display unit 3 are provided for issuing fault warning information, which is the determination result of the abnormality determining apparatus. With this constitution, a user can be informed that a fault may occur, and is thus provided with a sufficient preparation period for carrying out appropriate fault-prevention measures.

Further, by providing transmission means in this copier for transmitting the determination result of the abnormality determining apparatus to the outside over a communication line, for the reasons described above, the diagnosis of a specialist in a remote location can be obtained.

Further, by providing operation restricting means in this copier for placing restrictions on the image forming operation on the basis of the determination result of the abnormality determining apparatus, temporary restrictions can be placed on specific operations in accordance with the result of an abnormality prediction, and thus heavy damage can be forestalled.

Further, by providing restoration control means in this copier for performing restoration control to restore the functions of the image forming means on the basis of the determination result of the abnormality determining apparatus, a restoration control mode can be executed in accordance with the result of an abnormality prediction, and thus heavy damage can be forestalled.

Further, in the example where the abnormality determining apparatus is constituted separately to the copier, reception means for receiving a plurality of information transmitted from an external copier via a communication line are provided as the information obtaining means. With this constitution, the plurality of information is received and obtained from a copier disposed in a remote location, and hence an abnormality in the copier can be determined without being on site.

Also in this example, transmission means are provided for transmitting the determination result of the determining means to the external copier. With this constitution, the determination result is transmitted by the transmission means, and hence a user in the remote location in which the copier is disposed can be informed of the occurrence of an abnormality.

Also in this example, information relating to the copier serving as an image forming apparatus is obtained as the plurality of information, whereupon the presence of abnormalities in the information is determined. With this constitution, abnormalities can be determined in an externally disposed copier serving as a detection subject.

According to the first embodiment as described above, a Mahalanobis distance is determined on the basis of a normal group data set stored in information storage means such as a hard disk, RAM, or ROM and grouped information comprising a plurality of information obtained from a detection subject, and this Mahalanobis distance is used to determine the presence of an abnormality. As a result, increasingly complicated control occurring when a plurality of abnormalities are detected individually according to the presence of their respective causes can be avoided.

Also according to the first embodiment, Mahalanobis distances are determined for at least two or more sets of grouped information, for example grouped information comprising a plurality of information relating to the paper feed system in the image forming apparatus, grouped information comprising a plurality of information relating to the image writing system, and soon. By evaluating the respective Mahalanobis distances, occurring abnormalities can be specified to a certain extent according to category, for example a category relating to the paper feed system, a category relating to the image writing system, and so on.

Second Embodiment

The second embodiment mainly serves to achieve the aforementioned second object of the present invention.

Note that FIGS. 1 to 13 and 17 to 19 and the description pertaining to these drawings, which were referenced in the first embodiment, are also applied substantially to the second embodiment. Accordingly, repetitive description has been omitted, and the particular features of the second embodiment are described in detail.

First, the basic constitution of an abnormality determining apparatus according to the second embodiment will be described.

It is assumed that the detection subject of this abnormality determining apparatus is the same copier as that described up to this point, and that the abnormality determining apparatus determines the presence of an abnormality in the interior of the copier.

Figure 21:
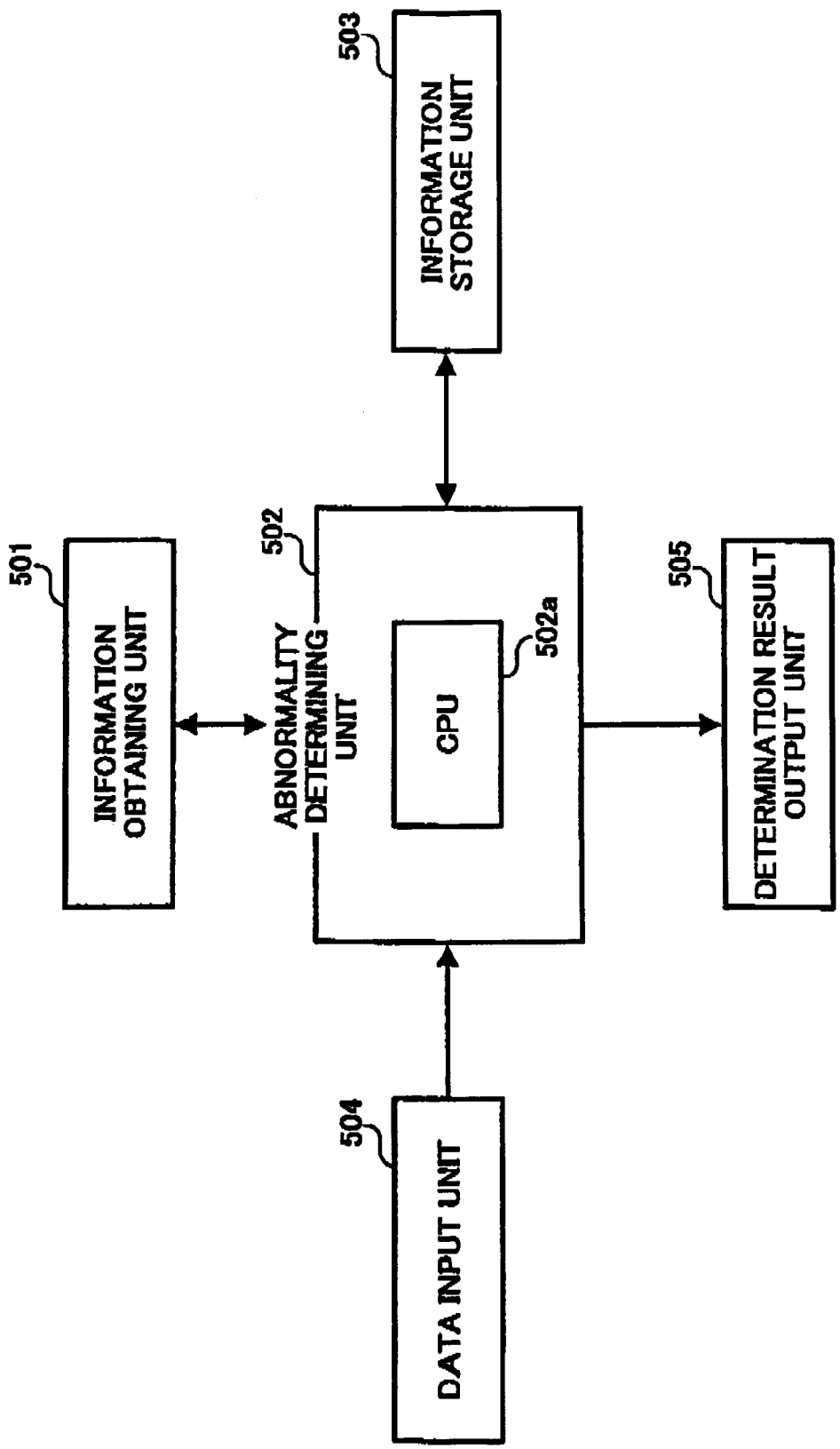
FIG. 21 is a block diagram showing the constitution of the main parts of an electric circuit in an abnormality determining apparatus according to a second embodiment of the present invention.

The constitution of the main parts of an electric circuit in this abnormality determining apparatus is shown in FIG. 21. As shown in the drawing, the abnormality determining apparatus comprises an information obtaining unit 501 serving as information obtaining means for obtaining information about an object, an abnormality determining unit 502 serving as abnormality determining means, an information storage unit serving as information storage means, a data input unit 504 serving as data input means, and so on. A determination result output unit 505 serving as determination result outputting means for outputting the result of a determination performed by the abnormality determining means is also provided.

The information obtaining unit 501 obtains the aforementioned information of (1) to (12) from the detection subject copier, not shown in the drawing. The information of (1) to (12) obtained by the information obtaining unit 501 is transmitted to the abnormality determining unit 502. The abnormality determining unit 502 comprises calculation means (a CPU 501a in the illustrated example) for performing various calculations required to determine the presence of an abnormality. Hence the information transmitted from the information obtaining unit 501 is used as is in the calculation processing for determining an abnormality, or used after being stored in the information storage unit 503. More specifically, predetermined calculations are implemented on the basis of the information of (1) to (12) transmitted from the information obtaining unit 501, and the presence of an abnormality in the copier is determined on the basis of the result of a comparison between the calculation result and a predetermined threshold stored in the information storage unit 503.

The result of the determination performed by the abnormality determining unit 502 is output by the determination result output unit 505. This output may take the form of characters to be recognized by a user of the copier, an image display, audio output, and so on, and also includes a mode in which the determination result information is output to an external device such as a personal computer or printer. By means of this output, the determination result of the abnormality determining unit 502 is acknowledged by the user of the copier, a serviceperson in a remote location, and so on. Note that the information obtaining unit 501 is constituted by RAM, ROM, a hard disk, or similar, which stores information such as a control programs and algorithm, for example, as well as the various information obtained by the information obtaining unit 501. The data input unit 504 receives data input for storing a threshold to be described below in the information storage unit 503, and the threshold data that are received in this manner are transmitted to the information storage unit 503 via the abnormality determining unit 502.

Next, the characteristic constitution of this abnormality determining apparatus will be described.

The abnormality determining unit 502 is constituted to determine a general abnormality comprising a plurality of types of abnormality, and a plurality of individual abnormalities constituting this plurality of types of abnormality, as an abnormality in the copier. More specifically, three abnormalities relating to a paper jam, deterioration of the photosensitive bodies, and variation in the image density are determined respectively as the plurality of individual abnormalities. The general abnormality includes these three individual abnormalities.

When determining the three individual abnormalities, the aforementioned thresholds corresponding to each individual abnormality are read from the information storage unit 503 and compared with the aforementioned calculation result. These thresholds are stored in the information storage unit 503 by means of data input into the data input unit 504 serving as data input means.

In the abnormality determining apparatus constituted in this manner, the presence of the individual abnormalities is determined only when the general abnormality including the three individual abnormalities is detected, and hence complicated control required to confirm the presence or absence of each individual abnormality upon each determination can be avoided. Moreover, when the general abnormality is detected, the detected individual abnormality is specified from among the three individual abnormalities included in the general abnormality. By means of this specification, the maintenance response following detection of the general abnormality can be prevented from becoming too complicated.

Also in the abnormality determining apparatus, the three thresholds used respectively to determine the three individual abnormalities are set initially by a serviceperson or user and updated by the user through an input operation into the data input means. By means of this initial setting and updating, the individual abnormalities can be determined with a degree of precision suited to each individual user.

This abnormality determining apparatus may be constituted integrally with the copier serving as the detection subject to function as apart of the copier, or may be constituted separately to the copier to determine the presence of an abnormality on the basis of the information of (1) to (12) transmitted from the copier.

Figure 22:
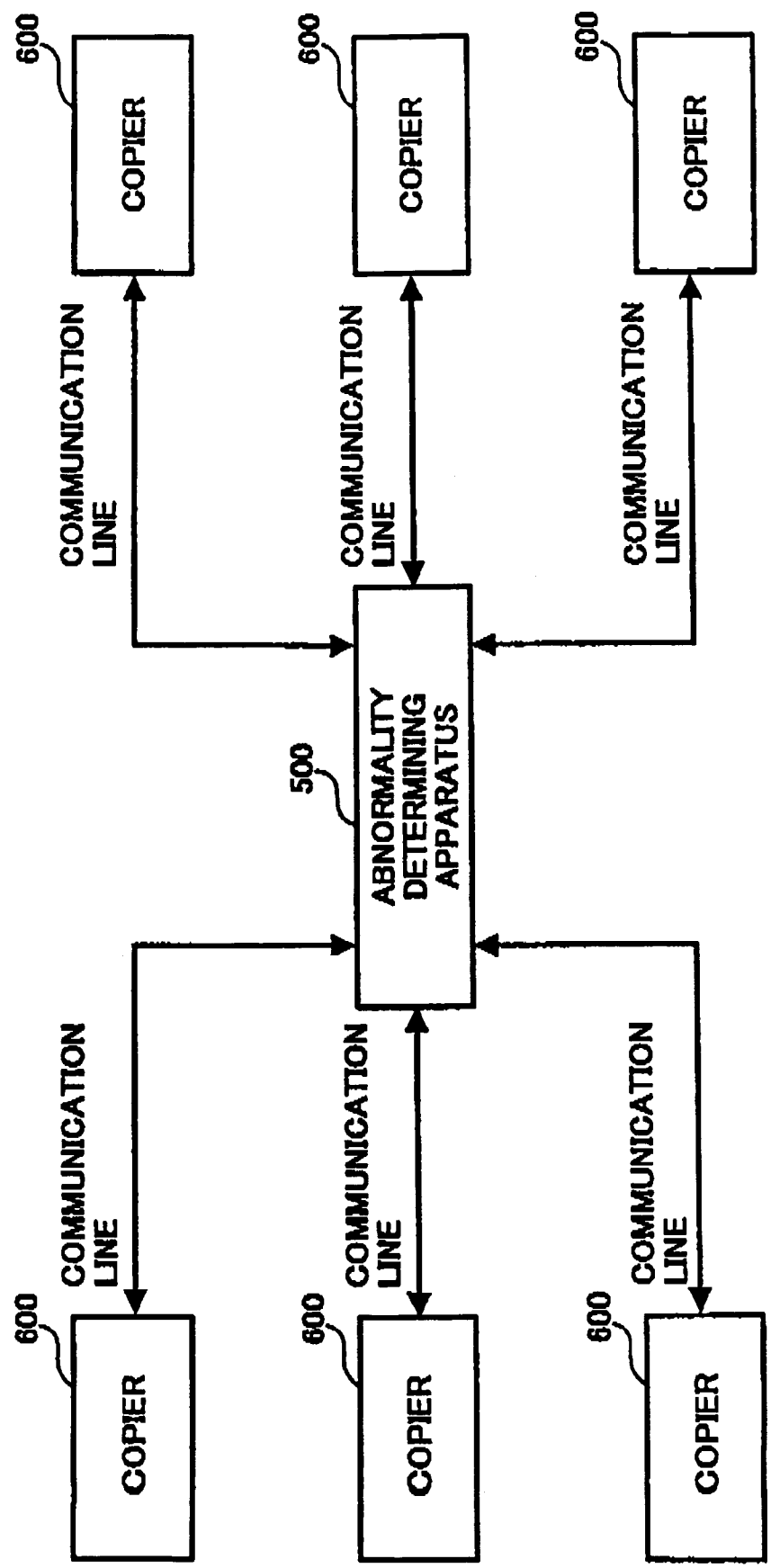
FIG. 22 is a connection diagram showing an example in which the abnormality determining apparatus is constituted separately to the copier.
Figure 23:
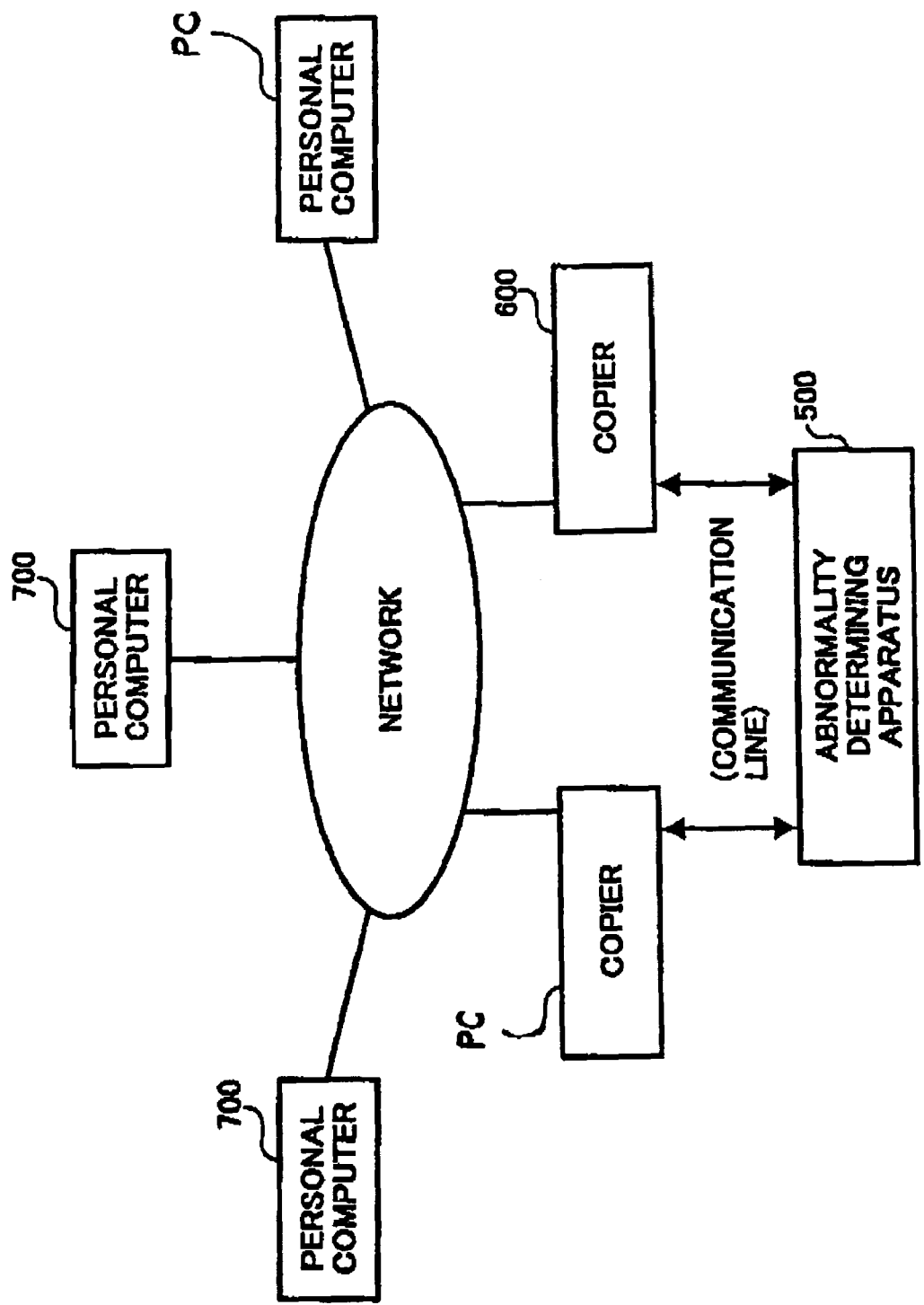
FIG. 23 is a connection diagram showing another example in which the abnormality determining apparatus is constituted separately to the copier.

In the latter case, i.e. when the abnormality determining apparatus is constituted separately to the copier, a plurality of copiers 600 can be managed together by a single abnormality determining apparatus 500 in a remote location, as shown in FIG. 22. Further, as shown in FIG. 23, the plurality of copiers 600 connected to a plurality of personal computers PC on a network such as an in-house LAN or the Internet can be managed together by the single abnormality determining apparatus 500 via a communication line. When performing general management of this type, if the data input portion 504 is constituted to receive data input of the thresholds transmitted over the communication line, then data input of the thresholds into the abnormality determining apparatus can be performed by a user in a remote location. Further, if the determination result output unit 505 is constituted to output the determination result over the communication line, then the determination result can be transmitted to various copiers disposed in different remote locations, and thus notifies to the respective users. The communication line may take any form, either wired or wireless, using optical fiber instead of electric lines, and so on. Note that when the abnormality determining apparatus is constituted separately to the copier, the information obtaining means comprising the control unit, various sensors, operation display unit (1, 2, 3 in FIG. 4), and so on in the copier do not function as the information obtaining unit 501 of the abnormality determining apparatus. Instead, reception means for receiving various information transmitted from the copier over the wired or wireless communication line function as the information obtaining unit 501 of the abnormality determining apparatus.

Figure 24:
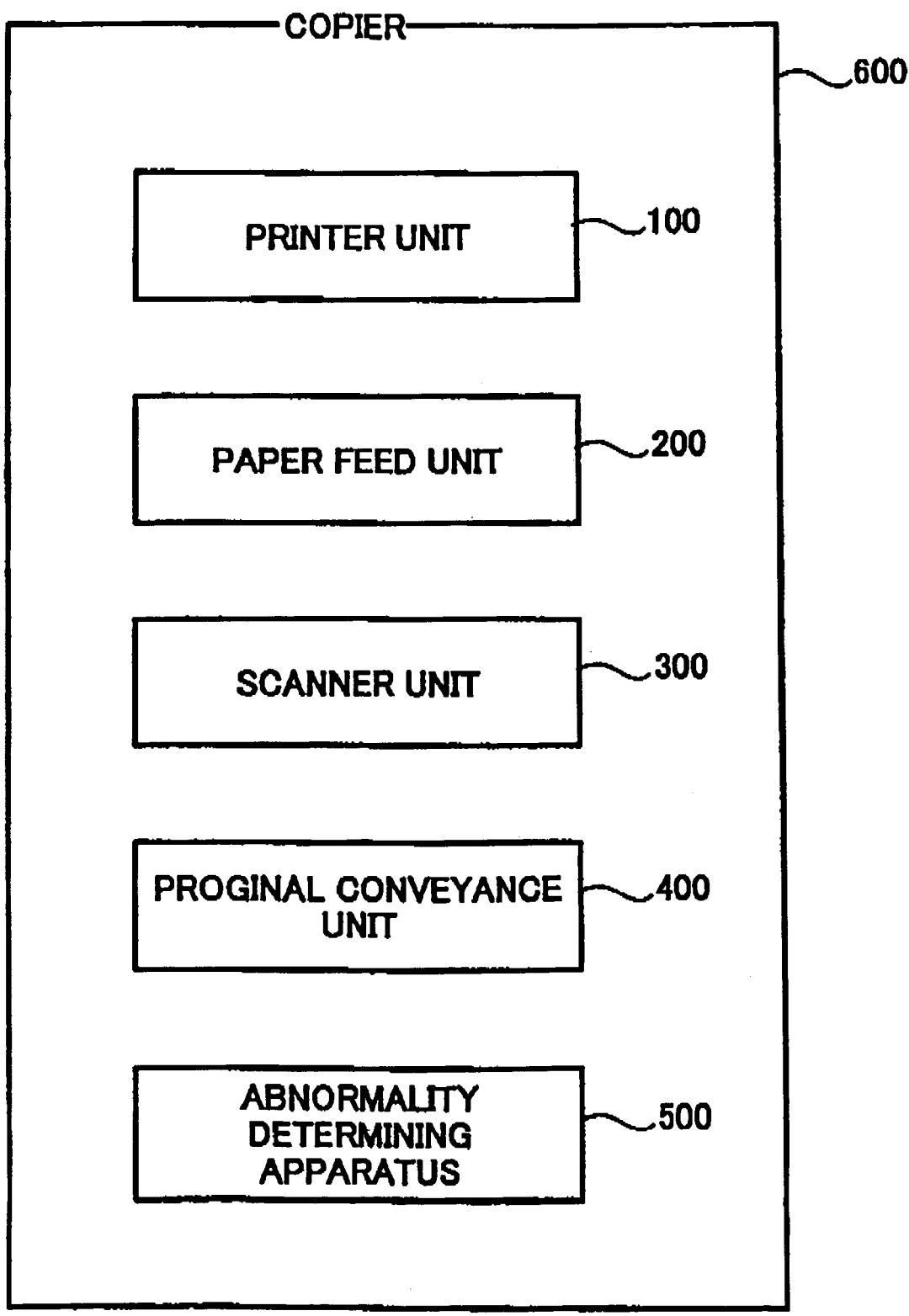
FIG. 24 is a view showing an example in which the abnormality determining apparatus is constituted integrally with the copier.

In the former case, on the other hand, that is when the abnormality determining apparatus 500 is constituted integrally with the copier 600 to function as a part of the copier 600, as shown in FIG. 24, the information obtaining means of the copier 600 also function as the information obtaining means of the abnormality determining apparatus 500. More specifically, the information obtaining means comprising the control unit 1, various sensors 2, operation display unit 3, and so on, shown in FIG. 4, function as the information obtaining unit 501 of the abnormality determining apparatus. In this case, the control unit 1 of the copier may double as the abnormality determining unit (502 in FIG. 21) and the information storage unit (503 in FIG. 21) of the abnormality determining apparatus. Furthermore, the operation display unit 3 of the copier may double as the data input unit (504 in FIG. 21) and determination result output unit (505 in FIG. 21) of the abnormality determining apparatus. If the determination result output unit is constituted to output determination results via a communication line, a remote repair service organization can be notified of an abnormality in the copier automatically.

As described above, the abnormality determining apparatus may be constituted integrally with or separately to the copier. In the following, however, an example in which the abnormality determining apparatus is constituted integrally with the copier will be described.

The abnormality determining apparatus determines the presence of the general abnormality and individual abnormalities described above by determining a Mahalanobis distance using an MTS method on the basis of grouped information comprising the plurality of types of information (1) to (12) obtained by the information obtaining unit 501. To realize this determination, a normal group data set obtained in advance is stored in the information storage unit 503. The abnormality determining unit 502 determines the Mahalanobis distance on the basis of the normal group data set and the grouped information comprising all or some combinations of the information of (1) to (12).

To determine the Mahalanobis distance, the normal group data set and the inverse matrix thereof must be constructed before determining the presence of an abnormality. As described above, FIG. 17 shows an obtained data table used in a normal data obtaining process performed to construct the normal group data set on the basis of the information of (1) to (12) obtained from the copier in a normal state. In this obtained data table, an example is illustrated in which n sets of grouped information comprising k types of information are obtained.

Note that the process of obtaining the information of (1) to (12) that is performed in this normal data obtaining process is not an information obtaining process performed in order to determine an abnormality, but simply a process performed to construct the normal group data set. The information obtaining process performed to determine an abnormality is implemented when the normal group data set has been constructed as a result of this normal data obtaining process.

The normal data obtaining process is performed by obtaining from the copier, which is operated in a normal state, a plurality of combinations of the information of (1) to (12) as normal grouped information. A standard device for obtaining a single normal group data set common to a plurality of finished copiers to be shipped from the factory may be used as the copier from which the data are obtained, or each of the finished copiers may be operated individually to obtain unique normal group data sets.

In the normal data obtaining process, first, k types of information $y_{11}$, $y_{12}$, . . . , $y_{1k}$, constituting a first set of grouped information, are obtained respectively by the information obtaining means of the copier, and stored in the obtained data table of FIG. 17 as data on the first row of the table. Next, k types of information $y_{21}, y_{22}, \ldots, y_{2k}$, constituting a second set of grouped information, are obtained respectively by the information obtaining means, and stored in the obtained data table as data on the second row of the table. The third set to the nth set of grouped information are then obtained similarly and stored in the obtained data table as data on the third row to the nth row of the table. Finally, the average and standard deviation σ of the respective n sets are determined for the k types of information constituting each set of grouped information, and stored in the obtained data table as data on the n+1 and n+2 rows. Thus the data in the constructed obtained data table are used as the normal group data set.

Once the normal data obtaining process is complete, an information normalization process is implemented to construct a normalized data table. As described above, FIG. 18 shows a normalized data table constructed in this information normalization process. This normalized data table is constructed on the basis of the obtained data table shown in FIG. 17.

Hereafter, the description of the first embodiment pertaining to Eqs. (1) to (4) applies similarly to the second embodiment, and therefore repetitive description thereof has been omitted.

The inverse matrix A is constructed by this series of processes comprising the normal data obtaining process, information normalization process, correlation coefficient calculation process, and matrix transformation process. All or a part of these processes may be implemented by the abnormality determining apparatus. When all of the processes are implemented, there is no need to pre-store the normal group data set in the information storage means of the copier during factory shipment. Instead, the information of (1) to (12) can be obtained as normal grouped information during an initial operating period at the shipment destination, in which an abnormality is highly unlikely to occur, and the normal group data set or inverse matrix A can be constructed from this information. Immediately after shipment, the finished copiers are in a normal state, having recently undergone inspection, and therefore the obtained results of the various information obtained during the initial operation may be used as normal values. When any one of the series of processes described above is not implemented by the abnormality determining apparatus, the inverse matrix A must be stored in the information storage means of the copier during factory shipment. In this case, the pre-stored inverse matrix A may be constituted by an inverse matrix common to each finished copier, which is constructed on the basis of a normal group data set obtained from the aforementioned standard device, or individual inverse matrices may be constructed by obtaining individual normal group data sets from each finished copier. Note that the normal group data set may be pre-stored, whereby the abnormality determining apparatus implements transformation of the inverse matrix A from the normal group data set.

As noted above, a common normal group data set for each finished copier, which is obtained from a standard device, may be used as the normal group data set, or each finished copier may be operated individually to obtain a unique normal group dataset. In the latter case, variation among finished products in the normal values of the various information used to determine an abnormality, caused by precision errors in the various components and so on, can be avoided, thus preventing deterioration of the determination precision. Moreover, by constituting the abnormality determining apparatus so as to obtain the normal group data set during the initial operating period after factory shipment, cost increases due to the labor required to test run the finished products at the factory prior to shipment in order to obtain the respective normal group data sets can be avoided.

Regardless of the manner in which the normal group data set is obtained, the inverse matrix A constructed as described above is stored in the information storage unit 503 of the abnormality determining apparatus during abnormality determination. The abnormality determining unit 502 then calculates the Mahalanobis distance D on the basis of the set of all-type grouped information, comprising all of the information of (1) to (12) obtained by the information obtaining unit 501, the inverse matrix A, and the aforementioned Eq. (5).

As shown in FIG. 13, in the procedure for calculating the Mahalanobis distance D in this embodiment, first k types of data $x_1, x_2, \ldots, x_k$ in any condition are obtained (S2-1). The data types correspond to $y_{11}, y_{12}, \ldots, y_{1k}$, and so on. Next, the obtained data are normalized respectively to $X_1, X_2, \ldots, X_k$ on the basis of the aforementioned Eq. (1). Then, using the aforementioned Eq. (5), which is determined using the element $a_{kk}$ of the constructed inverse matrix A, the square of the Mahalanobis distance D is calculated.

Note that in the copier, the information of (1) to (12) is obtained, but since the information in (4) to (8), (11), and (12) is obtained for the four colors (four types), the k in $x_k$ equals 5+7×4=33 [types].

The abnormality determining unit 502 determines the presence of the general abnormality by comparing the Mahalanobis distance D for the all-type grouped information (grouped information constituted by 33 types of information) determined in this manner with the general abnormality threshold. As the Mahalanobis distance D increases beyond [1], the detected data diverge further from a normal state. When the Mahalanobis distance D exceeds the general abnormality threshold, it is determined that the general abnormality is "present".

When it is determined that the general abnormality is present, the abnormality determining apparatus determines the presence of the three individual abnormalities (paper jam, photosensitive body deterioration, image density variation) included in the general abnormality, respectively. FIG. 19, which was referenced above, shows an example of a relationship between the various individual abnormalities in the copier and the grouped information required to determine their presence.

The first through third sets of grouped information relating to each of the three abnormality types have been described already with reference to FIG. 19. As is clear from FIG. 19, the first, second, and third sets of group information each have a different combination of information. This is due to the fact that the combination of information required to determine an abnormality differs according to the type of abnormality. By determining the Mahalanobis distance D for each of the first, second, and third grouped information in the example in FIG. 19, the type of abnormality can be narrowed down.

Hence when the abnormality determining apparatus determines the general abnormality to be "present", the Mahalanobis distance D of each of the first, second, and third grouped information is determined. By comparing the respective determined Mahalanobis distances D with the thresholds, the presence of an abnormality relating to a paper jam, deterioration of the photosensitive body, and variation in the image density is determined. Note that the values of the thresholds for determining the individual abnormalities relating to a paper jam, deterioration of the photosensitive body, and variation in the image density typically differ from the value of the general abnormality threshold. Accordingly, the three Mahalanobis distances D determined on the basis of the first, second, and third grouped information respectively are compared to individually corresponding thresholds relating to a paper jam, deterioration of the photosensitive body, and variation in the image density.

In this abnormality determining apparatus, a serviceperson or user inputs the three thresholds relating to a paper jam, deterioration of the photosensitive body, and image density variation into the data input unit 504 in accordance with the user information, and hence the serviceperson or user is capable of performing initial setting and updating of these thresholds. Examples of the user information reflected in the three thresholds include the copier maintenance proficiency and degree of fault perception. The reason for reflecting this information in the thresholds is as described above. Other examples of user information that may be reflected in the thresholds include the intended use of the copier, the industry sector, the department, the relationship between paper size and usage frequency, and the relationship between the type of output image and output frequency. Naturally, the required image quality, and therefore the user's degree of fault perception, differ when the intended use of the copier is to produce a written product such as an instruction manual, and when the intended use is to create a personal printout, test-print an image, and so on. The required image quality and the frequency of abnormality occurrence also differ according to the industry sector or department of the user. It is also possible for a fault to be perceived or not perceived depending on the paper size, regardless of personal differences. For example, when the vicinity of the end part of a drum-form photosensitive body is damaged, the resulting image disturbance occurs near the end portion of comparatively large paper, but does not occur on comparatively small paper. Hence, this type of image disturbance is more likely to be perceived by a user who uses comparatively large paper frequently, regardless of personal differences. Further, deterioration of the image quality is more likely to be perceived on a photographic image than a text image, regardless of personal differences, and hence image quality deterioration is more likely to be perceived by a user who outputs photographic images frequently. By reflecting the intended use of the copier, the industry sector, the department, the relationship between paper size and usage frequency, and the relationship between the type of output image and the output frequency in the three thresholds, the individual abnormalities can be detected with a precision corresponding to each individual user.

An example of a method for reflecting user information in the thresholds is multiplication of a coefficient corresponding to the user information by a standard threshold. This standard threshold is determined on the basis of a typical user (a user with a typical level of proficiency and so on). FIG. 25 shows an example of a standard threshold for the three thresholds relating to a paper jam, deterioration of the photosensitive body, and variation in the image density.

The standard threshold shown in FIG. 25 is merely one example thereof, and the value that is actually set is not limited thereto. Moreover, an example is shown in which the standard threshold increases in succession of deterioration of the photosensitive body, paper jam, and variation in the image density, but the actual succession is not limited thereto.

Next, FIG. 26 shows an example of the relationship between the proficiency level, serving as user information, and the threshold coefficient.

In FIG. 26, as the proficiency level rises from low, to medium, to high, the threshold coefficient increases from "0.9", to "1.0", to "1.2". The reason for this is as follows. As the value of the Mahalanobis distance D increases, so does the extent of the abnormality. Accordingly, as the threshold that is compared to the Mahalanobis distance D decreases, the abnormality is detected more acutely. Meanwhile, as the proficiency level of the user rises, even when the extent of the abnormality stays the same, it is more unlikely that a request for repairs will be issued. Therefore, to match the abnormality detection precision to each individual user, the thresholds must be increased so that an abnormality is less likely to be detected as the proficiency level of the user rises. Hence the threshold coefficient to be multiplied by the threshold rises from "0.9", to "1.0", to "1.2" as the proficiency level increases from low, to medium, to high.

Next, FIG. 27 shows an example of the relationship between the degree of fault perception, serving as user information, and the threshold coefficient.

In FIG. 27, the threshold coefficient decreases from "1.2", to "1.0", to "0.8" as the degree of fault perception increases from low, to medium, to high. The reason for this is as follows. As noted above, an abnormality is detected more acutely as the threshold to be compared to the Mahalanobis distance D decreases. Meanwhile, as the user's degree of fault perception rises, even when the extent of the abnormality stays the same, it is more likely that a request for repairs will be issued. Therefore, to match the abnormality detection precision to each individual user, the thresholds must be decreased so that an abnormality is more likely to be detected as the user's degree of fault perception rises. Hence the threshold coefficient to be multiplied by the threshold decreases from "1.2", to "1.0", to "0.8" as the degree of fault perception rises from low, to medium, to high.

Next, FIG. 28 shows an example of the relationship between the industry sector and department of the user, and the threshold coefficient.

When the industry sector of the user is printing-related and the department of the user is production-related, it is highly likely that the intended use of the copier will be to produce written materials. It is therefore highly likely that the user will have an acute perception of decreases in image quality and increases in the frequency of paper jams. Hence in FIG. 28, the threshold coefficient is set to a minimum value of "0.8" in this case.

FIG. 29 shows a relationship between the type of output image, the output frequency, and the threshold coefficient.

An abnormality in the image quality (variation in the image density, for example) typically becomes more likely to be perceived in order of written documents, drawings, advertising leaflets, and photographs, regardless of personal differences among users in the degree of perception. Hence a user who outputs written documents more often than other types of images is less likely to perceive an abnormality in the image quality, regardless of personal differences. In contrast, a user who outputs photographs more often than other types of images is more likely to perceive an abnormality in the image quality. Therefore, in the example in FIG. 29, the threshold coefficients are set in consideration of the output frequency order of the four types of images comprising written documents, drawings, advertising leaflets, and photographs, and the order in which abnormalities are perceived in these four types of images. For example, an abnormality in the image quality is least likely to be perceived, regardless of personal differences, when written documents, drawings, advertising leaflets, and photographs are printed with a decreasing order of output frequency. In this case, the threshold coefficient takes a value of "1.00", which is lower than all of the other output frequency orders. Conversely, an abnormality in the image quality is most likely to be perceived, regardless of personal differences, when photographs, advertising leaflets, drawings, and written documents are printed with a decreasing order of output frequency. In this case, the threshold coefficient takes a value of "1.50", which is higher than all of the other output frequency orders.

As described above, by reflecting user information in the thresholds (relating to a paper jam, deterioration of the photosensitive body, and variation in the image density), the individual abnormalities can be detected with a precision corresponding to each individual user.

As well as user information, it is desirable that information regarding the environment in which the copier is placed be reflected in the thresholds (relating to a paper jam, deterioration of the photosensitive body, and variation in the image density). The reason for this is as follows. Even when the calculation result of the Mahalanobis distance D is constant, it is possible for the degree of perception of an abnormality to vary according to the environment, regardless of personal differences. For example, even when the calculation result of the Mahalanobis distance D is constant, paper jams may occur more or less frequently depending on the humidity of the environment in which the copier is used. In such a case, inappropriate notification of the occurrence of an abnormality due to a varying degree of abnormality perception depending on the environment, regardless of personal differences, can be prevented by setting the thresholds in accordance with information relating to the environment of the copier.

When an old copier is replaced with a new one due to circumstances such as the old copier reaching the end of its lifespan, the thresholds (relating to a paper jam, deterioration of the photosensitive body, and variation in the image density) in the new copier are preferably set initially to the same values as those of the thresholds used in the old copier. The reason for this is as follows. Initial setting of the thresholds rarely results in values which are perfectly suited to the user at that time, and hence it is preferable that the thresholds be gradually updated to appropriate values in accordance with repeated abnormality detection, and the degree of abnormality perception and soon of the user. By updating the thresholds in this manner, when an old copier is replaced with a new one, the thresholds used in the old copier are updated to values which are more suited to the user than the initially set values, and are therefore highly likely to approach the requirements of the user. If the old thresholds are not employed in the new copier, and values which reflect user information in only a general sense are employed instead, these values become far removed from the requirements of the user. This is why the thresholds are set initially to the same values as those used in the old copier. In so doing, deterioration of the abnormality detection precision caused by initial setting of the thresholds in a new copier to values which reflect user information in only a general sense can be avoided.

Further, the thresholds (relating to a paper jam, deterioration of the photosensitive body, and variation in the image density) are preferably updated in accordance with information regarding the repair request history of the user based on the occurrence of abnormalities. By updating the thresholds in this manner, the thresholds can be modified gradually from their initial setting to values corresponding to the requirements of the user.

The normal group data set stored in the information storage unit 503 is preferably updated according to the relationship between the determination result of the general abnormality and the result of an inspection of the copier. More specifically, when an abnormality is confirmed in the copier during an inspection despite the general abnormality having been determined as "absent", this indicates that non-normal grouped information is included in the normal group data set. As a result, the normal space range in the Mahalanobis space becomes larger than usual, making it impossible to detect abnormalities. In this case, the normal group data set is updated by deleting the non-normal grouped information from the normal group data set. The normal group data set may then be updated by adding new normal grouped information to replace the deleted grouped information. By deleting the non-normal grouped information, mis-detections due to such grouped information being included in the normal group data set can be avoided. Note that non-normal grouped information can be identified by extracting data having a large standard deviation from the normalized data table described above.

In this abnormality determining apparatus, the information obtaining unit 501 and abnormality determining unit 502 are constituted to vary the frequency with which the various information is obtained and the frequency with which the presence of the general abnormality is determined according to the Mahalanobis distance D, which serves as the calculation result of the general abnormality. More specifically, when the Mahalanobis distance D of the general abnormality nears the general abnormality threshold to a certain extent, the various information obtaining frequency and the determination frequency are increased. The reason for this will now be described using FIGS. 30 to 32.

Figure 30:
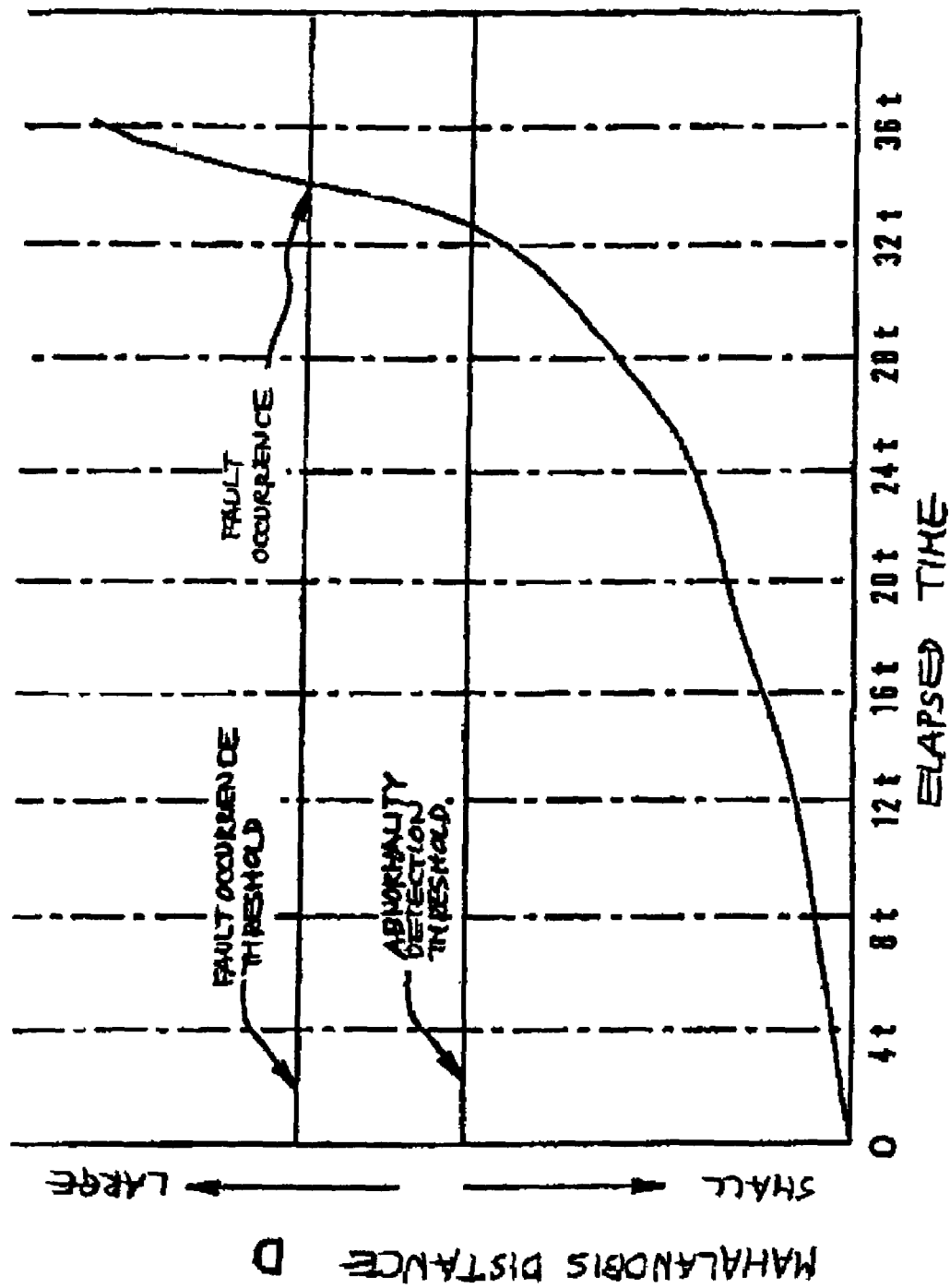
FIG. 30 is a graph showing an example of a relationship between the Mahalanobis distance D of a general abnormality in the copier of the second embodiment, and the elapsed time (running time)

FIG. 30 is a graph showing an example of a relationship between the Mahalanobis distance D of the general abnormality in this copier and the elapsed time (running time). In the graph, the abnormality detection threshold refers to the general abnormality threshold used to determined the presence of the general abnormality. The fault occurrence threshold takes the same value as the Mahalanobis distance D when an individual abnormality has progressed to the extent that a fault occurs in the copier. When the Mahalanobis distance D increases to the fault occurrence threshold, a fault occurs in the copier. Depending on the types of individual abnormality included in the general abnormality, the increase rate of the Mahalanobis distance D begins to rise rapidly after approaching the fault occurrence threshold to a certain extent, as shown in the graph. In such a case, detection of the general abnormality detection is greatly delayed.

Figure 31:
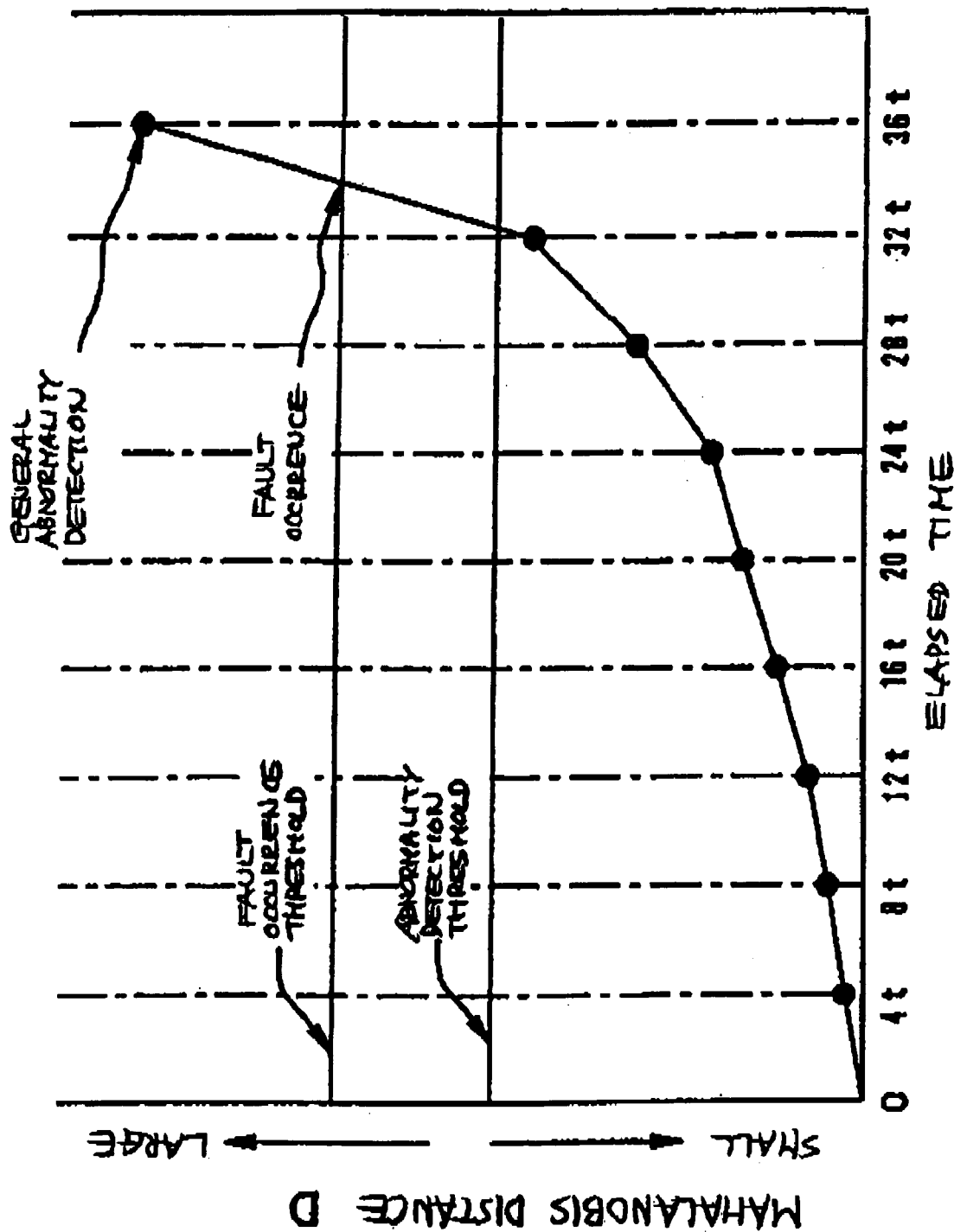
FIG. 31 is a graph showing a relationship between the Mahalanobis distance D and the elapsed time when the general abnormality is determined at a time interval of 4$t$ in the copier exhibiting the characteristics shown in FIG. 30.

Specifically, FIG. 31 is a graph showing the relationship between the Mahalanobis distance D when the presence of the general abnormality is determined at time intervals of $4t$, and the elapsed time, in the copier having the characteristics shown in FIG. 30. In the graph, a fault occurs between a time $32t$ and a time $36t$, but at the time $32t$ the Mahalanobis distance D has not yet reached the abnormality detection threshold, and hence the general abnormality is not detected. After the time $32t$, the next general abnormality determination is performed at the time $36t$, but during this period, the abnormality progresses rapidly so that the general abnormality occurs before the time $36t$. Hence, in the example shown in the drawing, the general abnormality is detected after a fault has occurred, and thus the occurrence of the general abnormality cannot be predicted.

Figure 32:
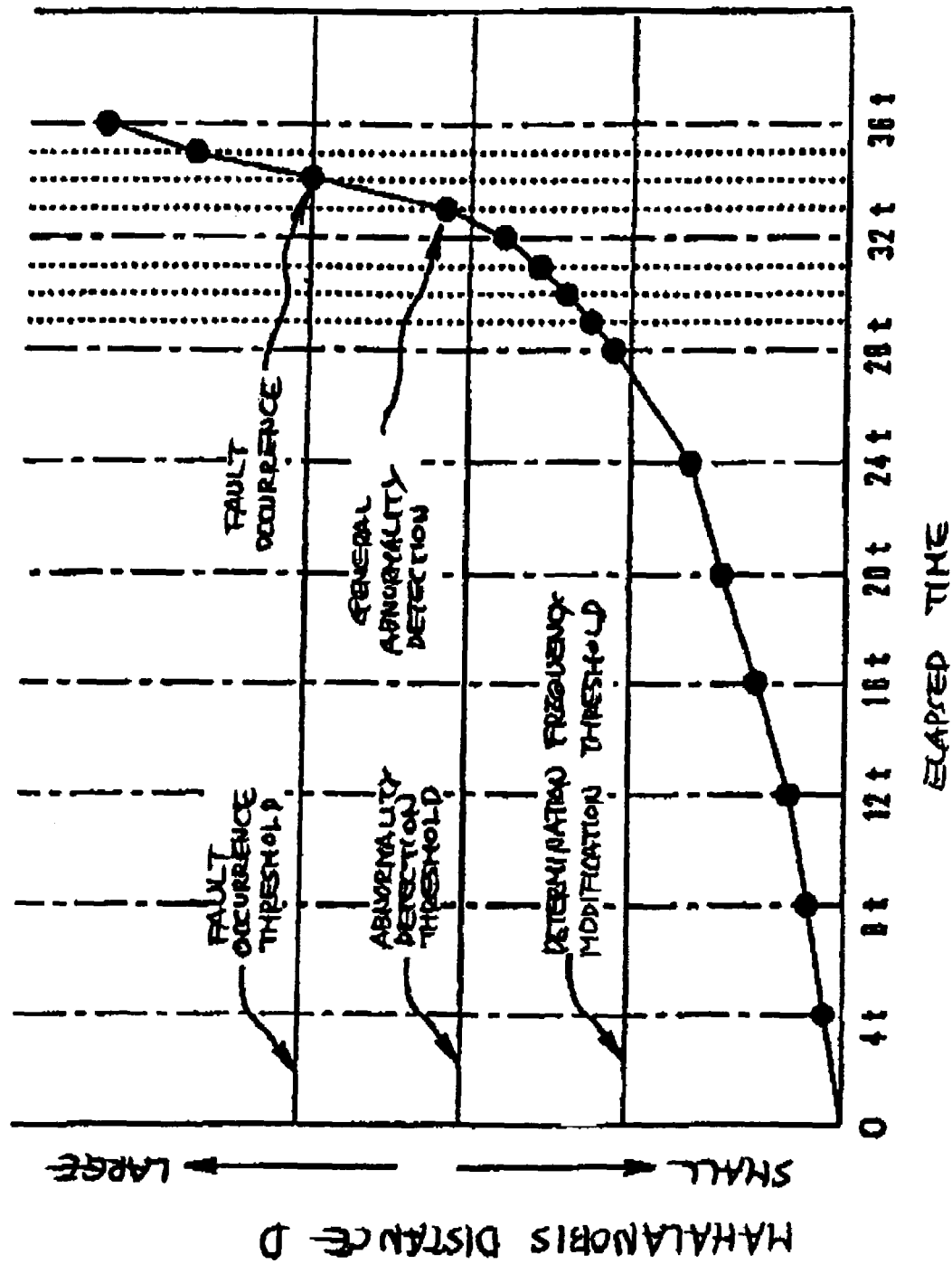
FIG. 32 is a graph showing an example of a relationship between the Mahalanobis distance D and the elapsed time when the frequency of general abnormality determination is raised at the stage where the Mahalanobis distance D for the general abnormality approaches the abnormality detection threshold to a certain extent.

FIG. 32 is a graph showing an example of the relationship between the Mahalanobis distance D, in a case where the general abnormality determination frequency is raised when the Mahalanobis distance D of the general abnormality approaches the abnormality detection threshold to a certain extent, and the elapsed time. In the graph, a determination frequency modification threshold is used to determine whether or not to modify the determination frequency of the general abnormality, and is set to a smaller value than the abnormality detection threshold. In the illustrated example, the Mahalanobis distance D becomes gradually larger as time passes, and from a time $24t$, the increase rate (increase amount per unit time) of the Mahalanobis distance D begins to increase. Slightly before a time $28t$, the Mahalanobis distance D reaches the determination frequency modification threshold. The abnormality determining unit 502 recognizes this at the time $28t$, and raises the determination frequency of the general abnormality from $4t$ intervals to $1t$ intervals. The Mahalanobis distance D then reaches the abnormality detection threshold at a time $32.5t$. At a time $33t$, which is only slightly later than $32.5t$, the presence of the general abnormality is detected by the abnormality determining unit 502, and at a time $34t$, a fault occurs. By raising the determination frequency at the time $28t$, the general abnormality is detected before a fault occurs. Therefore, by constituting the abnormality determining unit 502 to modify the frequency with which the general abnormality is determined in accordance with the Mahalanobis distance D of the calculation result, situations in which it becomes impossible to predict the occurrence of the general abnormality due to a rapid increase in the increase rate of the Mahalanobis distance D can be avoided.

Depending on the determination result, it is desirable that the image forming conditions be modified or a part of the image forming operation be restricted. More specifically, the following responses in (a) to (c) may be considered.

(a) Halting the Apparatus

In cases such as when the Mahalanobis distance D reaches the abnormality threshold or the increase rate of the Mahalanobis distance D rises over time, the apparatus may be halted forcibly and a request for maintenance transmitted to the user.

(b) Restricting the Image Forming Operation or Modifying the Control Parameters
(b-1) Modifying the color mode
(b-2) Modifying the recording speed
(b-3) Modifying the screen ruling in the halftone portion of the image
(b-4) Modifying the halftone processing method
(b-5) Restricting the types of paper that can be used
(b-6) Modifying the registration control parameters
(b-7) Modifying the image formation process parameters (uniform charging potential, exposure amount, development bias, transfer bias, etc.).

(c) Replenishing or Replacing Consumables or Components

Replenishment or replacement may be performed automatically on the basis of the Mahalanobis distance D calculation result.

Depending on the type of the individual abnormality, it may be possible to continue operations until preparations for repairs are complete by restricting the functions of the copier even when a fault occurs as the individual abnormality progresses. For example, assuming that the vicinity of the end portion of the drum shaft of a drum-shaped photosensitive body is greatly damaged for some reason, when printing is performed on large paper which uses substantially the entire axial direction range of the photosensitive body, a dramatic deterioration in image quality, contamination, and so on occur near the end portion of the paper. However, when printing is performed on small paper which need not use the damaged region of the photosensitive body, such image quality deterioration and contamination do not occur. Hence by restricting the functions of the copier such that the use of large paper is prohibited when the vicinity of the end portion of the drum shaft of the drum-shaped photosensitive body is greatly damaged, the copier can be operated to implement printing until preparations for repairs are complete. For this purpose, the abnormality determining apparatus is provided with function restricting means for restricting the functions of the copier in accordance with the occurrence of the individual abnormalities. FIG. 33 is a pattern diagram showing an example of a display screen on the operation display unit of the copier that is displayed when function restriction is performed by the function restricting means. This is an example of a display screen displayed to indicate that image quality deterioration and contamination can be avoided by using paper that is smaller than A4 size.

Next, a modification of this abnormality determining apparatus will be described.

Figure 34:
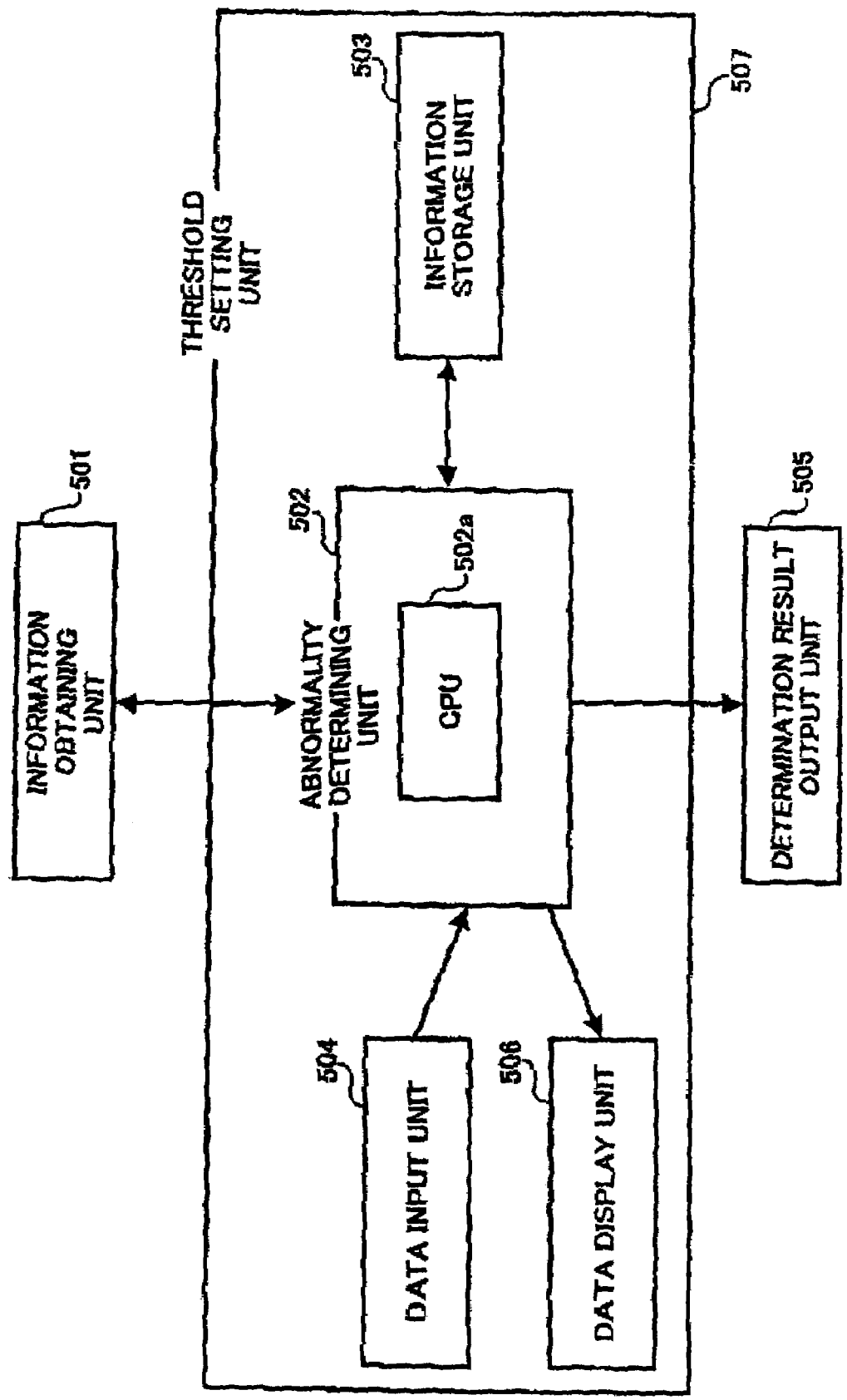
FIG. 34 is a block diagram showing the constitution of the main parts of an electric circuit in the abnormality determining apparatus according to the second embodiment.

FIG. 34 shows the constitution of the main parts of an electric circuit in the abnormality determining apparatus according to this modification. Comparing this diagram to FIG. 21, it can be seen that the constitution of the electric circuit of this abnormality determining apparatus is substantially identical to that of the abnormality determining apparatus according to the second embodiment described above, but differs in comprising a data display unit 506, and in that a threshold setting unit 507 serving as threshold setting means is constituted by the abnormality determining unit 502, information storage unit 503, data input unit 504, and data display unit 506.

Likewise in this abnormality determining apparatus, the information obtaining unit 501 is used to obtain the aforementioned information of (1) to (12) from the detection subject copier. The abnormality determining unit 502 determines the presence of the general abnormality and the three individual abnormalities relating to a paper jam, deterioration of the photosensitive body, and variation in the image density, which are included in the general abnormality, on the basis of various data stored in the information storage means and the information of (1) to (12) obtained by the information obtaining unit 501. Determinations as to the presence of the respective abnormalities are performed similarly to the second embodiment, i.e. by comparing the Mahalanobis distance D to the unique thresholds of the three individual abnormalities. The presence of the three individual abnormalities is determined only when the general abnormality is detected. The data display unit 506 is constituted by a liquid crystal display or the like, and displays images on the basis of image signals transmitted from the abnormality determining unit 502.

The threshold setting unit 507 constituted by the abnormality determining unit 502, information storage unit 503, data input unit 504, and data display unit 506 sets the general abnormality threshold and the respective thresholds relating to a paper jam, deterioration of the photosensitive body, and variation in the image density, which are stored in the information storage unit 503. A specific method of performing this setting is as follows. A question implementation program for asking the user predetermined questions in order to obtain user information is stored in the information storage unit 503. The abnormality determining unit 502 displays various question information on the data display unit 506 on the basis of this question implementation program. Examples of these questions include "If paper jams began to occur frequently, would you be capable of searching for the cause?", "Are you capable of replacing a photosensitive body by yourself?", and so on. Once the user has inputted response data to each of these questions into the data input unit 504, the abnormality determining unit 502 stores the inputted response data in the information storage unit 503 as user information.

When the question implementation program is complete, a plurality of user information is stored in the information storage unit 503. The abnormality determining unit 502 then performs initial setting of the three thresholds relating to a paper jam, deterioration of the photosensitive body, and variation in the image density on the basis of the user information and the various data stored in the information storage unit 503. The various data used at this time are the data shown in FIGS. 25 to 29, for example. As a result of this initial setting, the user information is reflected in the three thresholds relating to a paper jam, deterioration of the photosensitive body, and variation in the image density, and hence the determination precision of the individual abnormalities is matched to the user.

The abnormality determining apparatus constituted in this manner differs greatly from the abnormality determining apparatus according to the first embodiment in that the data input into the data input unit 504 are user information rather than the thresholds themselves. Instead of having the user input the thresholds, user information is input in the form of responses to questions. In most cases, the user is unaware of the abnormality determination method. If the user is forced to calculate and input the respective thresholds relating to a paper jam, deterioration of the photosensitive body, and variation in the image density while referring to a manual or the like, s/he may feel inconvenienced. However, by inputting user information in the form of responses to questions and setting the thresholds on the basis of these responses, as in this abnormality determining apparatus, situations such as that described above, in which the user feels inconvenienced, can be avoided. Moreover, situations in which the user is forced to perform complicated calculations in order to determine the thresholds can be avoided.

The threshold setting unit 507 not only performs initial setting of the thresholds relating to a paper jam, deterioration of the photosensitive body, and variation in the image density on the basis of the user information, but also alters these thresholds if necessary. More specifically, as noted above, the initially set thresholds are rarely perfectly suited to the user. In most cases, the thresholds do not become complete unless they are adjusted little by little through real experience. It is therefore desirable that the thresholds corresponding to the respective individual abnormalities be updated gradually in accordance with the detection precision of each individual abnormality. For this purpose, the threshold setting unit 507 in this abnormality determining apparatus is constituted to alter the thresholds relating to a paper jam, deterioration of the photosensitive body, and variation in the image density on the basis of predetermined data input into the data input unit 504 by the user.

These predetermined data are preferably input by the user in the following manner. A threshold update program is stored in the information storage unit 503 in advance. The user is told in advance to activate this threshold update program by performing a predetermined operation on the data input unit 504 using a manual or the like. When the threshold update program is activated by the user operation, display such as "How did you feel about the timing of the abnormality notification? Please press the appropriate key. 1: The notification was too early, 2: The notification was too late" is displayed on the data display unit 506. When the user presses the corresponding key, display such as "How about the type of abnormality? Please press the appropriate key. 1: Paper jam, 2: Deterioration of photosensitive body, 3: Variation in image density" is then displayed. When the user presses the corresponding key, the threshold of the corresponding abnormality is altered on the basis of the information "the notification was too early" or "the notification was too late". This information corresponds to the aforementioned predetermined data. In the case of "the notification was too early", the threshold should be increased, and in the case of "the notification was too late", the threshold should be decreased.

Figure 35:
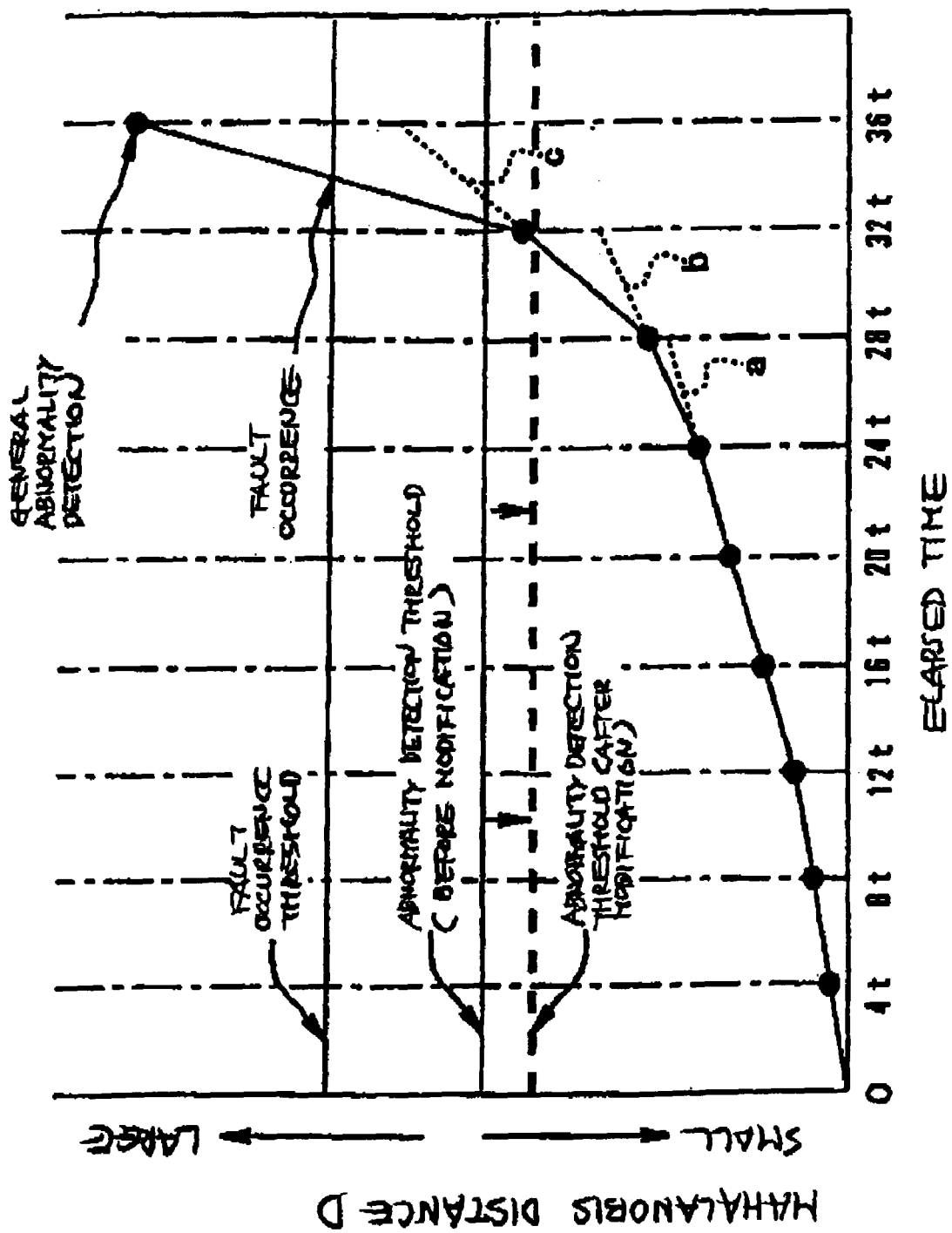
FIG. 35 is a view in which an extended line for facilitating understanding of variation in the Mahalanobis distance D has been added to a graph showing an example of the relationship between the Mahalanobis distance D of the general abnormality in the copier, and the elapsed time.

The threshold setting unit 507 is also constituted to change the general abnormality threshold in accordance with the rate of change in the Mahalanobis distance D serving as the calculation result of the general abnormality. The reason for this constitution is as follows. FIG. 35 is a graph showing an example of the relationship between the Mahalanobis distance D of the general abnormality in this copier and the elapsed time, to which a line of extension has been added to facilitate understanding of the manner in which the Mahalanobis distance D changes. In the drawing, a bar graph in the period from a time 12$t$ to a time 24$t$ comprises a diagonal line which rises to the right in a substantially rectilinear fashion, indicating that the rate of change in the Mahalanobis distance D per unit time is substantially constant. From the time 24$t$ onward, however, the rate of change per unit time begins to increase with time, and hence the drawing becomes a line graph. A dotted line a in the drawing shows the Mahalanobis distance D if the rate of change from the time 24$t$ to a time 28$t$ were the same as that from the time 20$t$ to the time 24$t$. However, it can be seen from the actual graph that the rate of change increases at a sharp angle. The rate of change increases similarly from the time 28$t$ to a time 32$t$, and from the time 32$t$ to a time 36$t$. In the illustrated example, similarly to that of FIG. 31 described above, the general abnormality can no longer be detected at the time 32$t$, when "Mahalanobis distance D<abnormality detection threshold" is established, and at the time 36$t$, a fault may occur before the general abnormality is detected. Therefore, the threshold setting unit 507 of this abnormality determining apparatus reduces the abnormality detection threshold as shown in the drawing when the rate of change increases over two consecutive time periods. As a result, the abnormality detection threshold used at the time 32$t$ takes the new smaller value, enabling the general abnormality to be detected at the time 32$t$. By detecting the general abnormality in this manner, situations in which the occurrence of the general abnormality cannot be predicted due to a rapid increase in the increase rate of the Mahalanobis distance D can be avoided.

Figure 36:
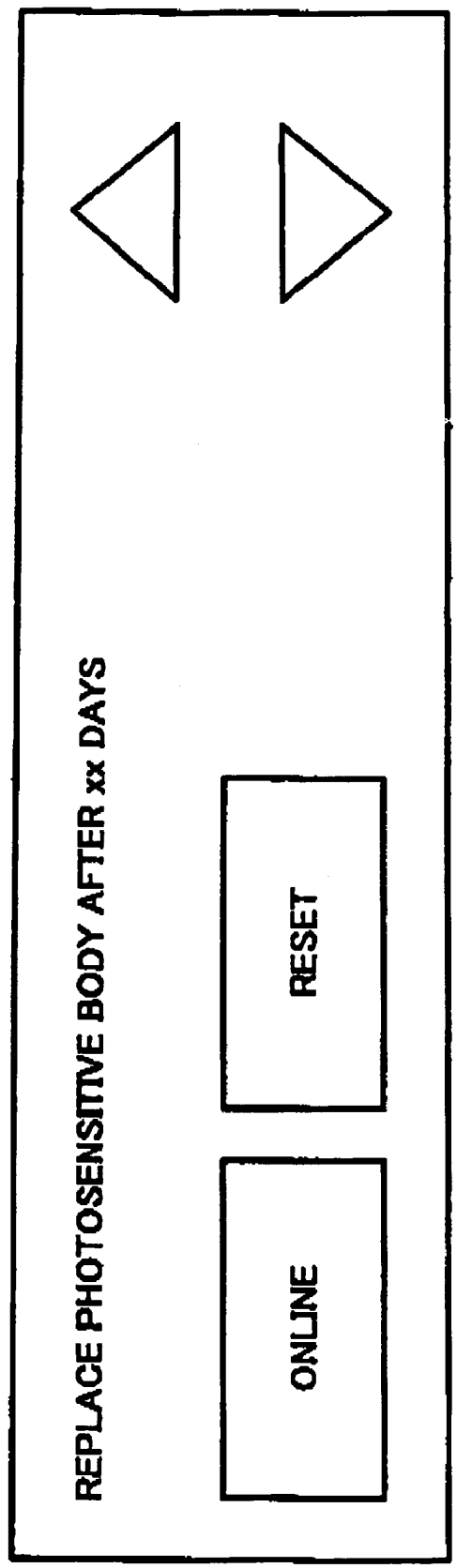
FIG. 36 is a pattern diagram showing an example of an image output to a data display unit when an abnormality relating to deterioration of a photosensitive body is detected.

Note that instead of changing the general abnormality threshold in accordance with the rate of change of the Mahalanobis distance D, the frequency with which the presence of the general abnormality is determined may be increased at the point where the Mahalanobis distance D approaches the general abnormality threshold to a certain extent, as in the abnormality determining apparatus according to the second embodiment described above. Further, in this abnormality determining apparatus, the operation display unit 3 of the copier shown in FIG. 4 may double as the data input unit 504 and data display unit 506 of the abnormality determining apparatus shown in FIG. 34. Also in this abnormality determining apparatus, the determination result is output to the data display unit 506 similarly to the abnormality determining apparatus according to the second embodiment described above. FIG. 36 shows an example of a screen that is output on the data display unit 506 when an abnormality relating to deterioration of the photosensitive body is detected. This abnormality determining apparatus also comprises similar function restricting means to those of the abnormality determining apparatus according to the second embodiment.

In the abnormality determining apparatus according to the second embodiment, by initially setting at least one of the thresholds relating to a paper jam, deterioration of the photosensitive body, and variation in the image density, which are used individually in the respective processes for determining each individual abnormality, in accordance with information regarding the environment in which the detection subject copier is disposed, or in other words by reflecting environmental information in the thresholds, it becomes possible, for the reasons described above, to avoid providing notification of the occurrence of an abnormality at an inappropriate timing due to a varying degree of abnormality perception depending to the environment, regardless of personal differences.

Further, in the abnormality determining apparatus according to the second embodiment, by initially setting at least one of the three thresholds in accordance with information regarding the frequency of maintenance technician visits to the location in which the copier is disposed, or information regarding the distance from the maintenance service providing organization to the disposal location, it becomes possible to avoid situations in which the timing of abnormality detection is delayed inappropriately due to an excessive time lag between a request for repairs from the user to the service organization and the actual departure of the serviceperson to the location of the user.

Further, in the abnormality determining apparatus according to the second embodiment, when replacing an old copier with a new one, by initially setting the three thresholds used to determine the presence of an abnormality in the new copier to the same respective values as the three thresholds of the old copier, it becomes possible, for the reasons described above, to avoid deterioration of the abnormality detection precision caused by initially setting values reflecting the user information in a general sense as the thresholds.

Further, in the abnormality determining apparatus according to the second embodiment, by updating at least one of the three thresholds in accordance with information regarding the repair request history of the user, based on the occurrence of abnormalities, the thresholds can be changed gradually from their initial setting to values corresponding to the requirements of the user.

In the abnormality determining apparatuses of the first embodiment and second embodiment, the Mahalanobis distance is determined as a calculation result during a calculation process performed in the process for determining the general abnormality, on the basis of the normal group data set stored in the information storage unit 503 serving as information storage means and the information obtained by the information obtaining unit 501 serving as information obtaining means. By updating the normal data set on the basis of the determination as to the presence of the general abnormality and the result of an inspection of the copier, it is possible, for the reasons described above, to avoid mistaken determinations due to the inclusion of non-normal grouped information in the normal group data set.

Further, in the abnormality determining apparatus according to the second embodiment, by using a device which receives data input of the thresholds transmitted via a communication line as the data input unit 504 serving as data input means, data input of the thresholds into the abnormality determining apparatus can be performed by a user in a remote location.

In the abnormality determining apparatus according to the modification described above, by providing the threshold setting unit 507 serving as threshold setting means, the user need only input user information rather than the thresholds themselves. As a result, situations in which the user is forced to perform complicated calculations in order to determine the thresholds can be avoided.

In the abnormality determining apparatus according to the modification described above, the threshold setting unit 507 asks the user predetermined questions, and obtains user information on the basis of response data input into the data input unit 504 by the user. In so doing, user information can be drawn from the user in a natural manner, without making the user aware of the need to adjust the abnormality determination precision, and as a result, the thresholds can be set initially to values which are suited to the user.

In the abnormality determining apparatus according to the modification described above, the threshold setting unit 507 is constituted to modify the three thresholds relating to a paper jam, deterioration of the photosensitive body, and variation in the image density, which are used respectively to determine the presence of the individual abnormalities, on the basis of predetermined data input into the data input unit 504 by the user. With this constitution, for the reasons described above, the three thresholds can be adjusted little by little on the basis of the actual experience of the user toward values that are perfectly suited to the user. Further, in the abnormality determining apparatus according to the modification described above, the threshold setting unit 507 is constituted to modify the general abnormality determining threshold, which is used to determine the presence of the general abnormality, in accordance with the rate of change of the Mahalanobis distance D, which is the calculation result of the general abnormality. By means of such a constitution, for the reasons described above, situations in which occurrence of the general abnormality cannot be predicted due to a rapid rise in the increase rate of the Mahalanobis distance D can be avoided.

In the abnormality determining apparatuses of the second embodiment and the modification thereof, the abnormality determining unit 502 serving as determining means is constituted to determine the Mahalanobis distance D on the basis of the normal group data set stored in the information storage unit 503, and the obtained results of the information obtaining unit 501, and determine the presence of the general abnormality on the basis of the result of a comparison between the Mahalanobis distance D and the general abnormality threshold. By means of this determination, the general abnormality incorporating the plurality of individual abnormalities can be detected easily.

Further, in the abnormality determining apparatus according to the second embodiment, the abnormality determining unit 502 is constituted to modify the frequency with which the presence of the general abnormality is determined in accordance with the Mahalanobis distance D, which is the calculation result of the general abnormality. By means of this constitution, as described above, situations in which occurrence of the general abnormality cannot be predicted due to a rapid rise in the increase rate of the Mahalanobis distance D can be avoided.

Further, in the abnormality determining apparatuses of the second embodiment and the modification thereof, by providing function restricting means for restricting the functions of the copier in accordance with the type of individual abnormality that has occurred, the copier can be operated to implement printing until preparations for repairs are complete.

As described above, in the second embodiment and the modification thereof, the presence of a general abnormality which is capable of incorporating a plurality of types of abnormality in the detection subject is determined. When it is determined that the general abnormality is present, individual determinations are made as to the presence of the plurality of abnormalities (to be referred to as "individual abnormalities" hereafter) that may be incorporated into the general abnormality, thus enabling the type of abnormality to be specified. In so doing, the presence of the individual abnormalities need only be determined when the general abnormality has been confirmed as "present", rather than determining the presence of all of the individual abnormalities every time the presence of the general abnormality is determined, and hence increasingly complicated control caused by individual determinations for each type of abnormality can be suppressed. Further, by specifying the type of abnormality that has occurred when the general abnormality is determined as"present", complicated maintenance responses following the determination can be avoided.

Further, the plurality of thresholds required to determine the presence of the individual abnormalities respectively are subjected to initial setting in accordance with user information such as proficiency level and degree of fault perception. In so doing, the presence of each individual abnormality can be determined with a precision that is suited to each individual user.

Further, the plurality of thresholds required to determine the presence of the individual abnormalities respectively may be initially set or updated in accordance with user information which is input into the data input means by a serviceperson or the user. By means of such initial setting or updating, the presence of each individual abnormality can be determined with a precision that is suited to each individual user.

Further, by initially setting or updating the plurality of thresholds required to determine the presence of the individual abnormalities respectively in accordance with user information obtained from the user by threshold setting means, the presence of each individual abnormality can be determined with a precision that is suited to each individual user.

Hence, the presence of an abnormality can be determined with a precision that is suited to each individual user while avoiding complicated control to determine the presence of each type of abnormality individually and complicated maintenance responses following the determination.

Third Embodiment

The third embodiment mainly serves to achieve the aforementioned third object of the present invention.

Note that FIGS. 1 to 3, 5 to 13, 17, and 18, and the description pertaining to these drawings, which were referenced in the first embodiment, are also applied substantially to the third embodiment. Accordingly, repetitive description has been omitted, and the particular features of the third embodiment are described in detail.

Figure 37:
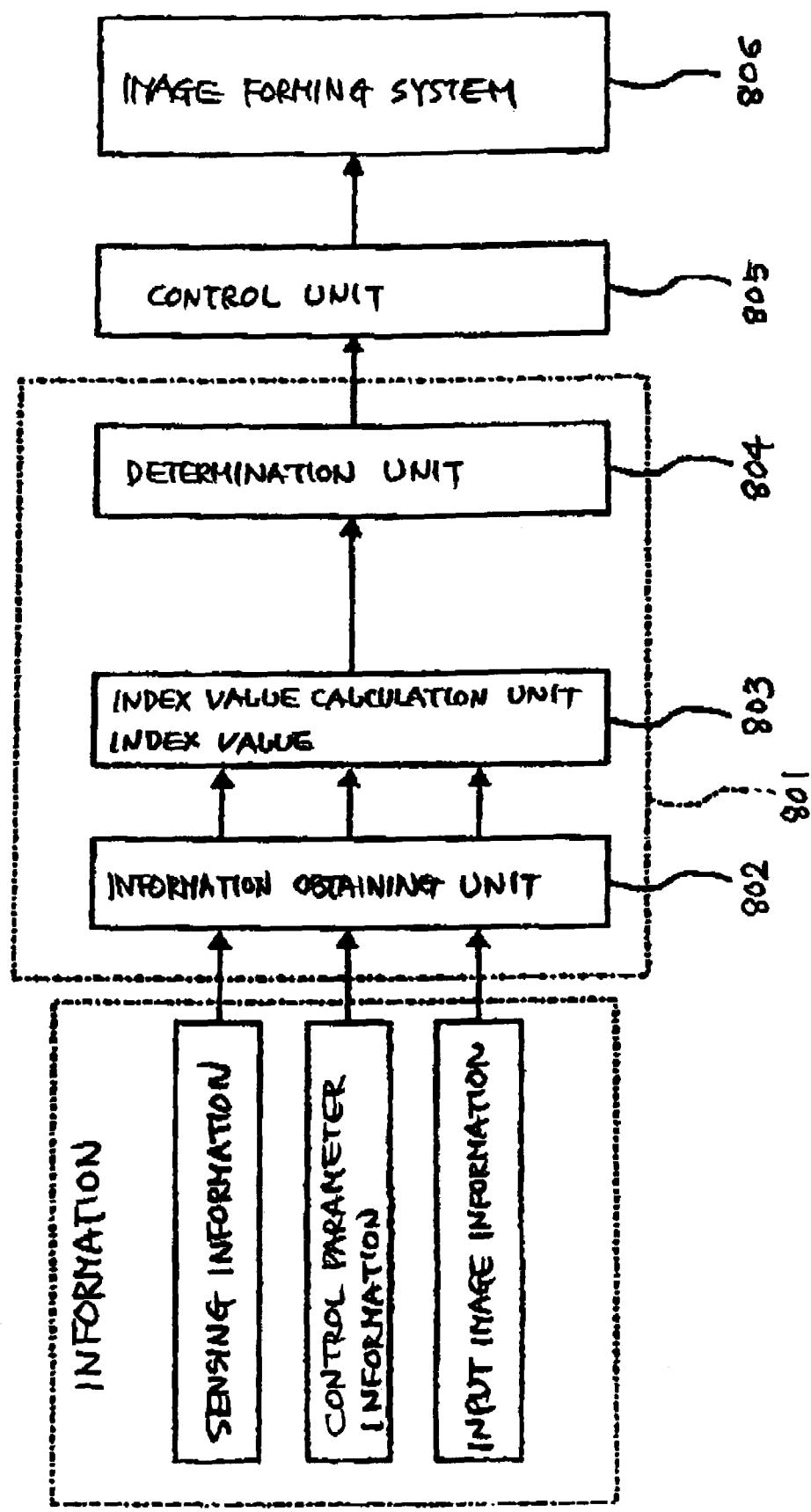
FIG. 37 is a block diagram showing the basic constitution of an abnormality predicting system comprising a state determining apparatus which is capable of implementing an abnormality predicting method according to a third embodiment of the present invention.

FIG. 37 shows the basic constitution of an abnormality predicting system comprising a state determining apparatus according to the third embodiment. A state determining apparatus 801 comprises an information obtaining unit 802 serving as information obtaining means, an index value calculation unit 803 serving as index value calculating means, and a determination unit 804 serving as change of state determining means. The information obtaining unit 802 obtains a plurality of types of information relating to an image forming operation of an image forming apparatus. The index value calculation unit 803 calculates a single index value on the basis of the plurality of types of information obtained by the information obtaining unit 802. The determination unit 804 determines variation in a subsequent state of the image forming apparatus on the basis of data relating to temporal variation in the index value calculated by the index value calculation unit 803. The data relating to temporal variation in the index value calculated by the index value calculation unit 803 and data relating to the determination result of the determination unit 804 may be used by a control unit 805 which serves as control means for controlling the various devices in an image forming system 806 serving as image forming means, or outputted to display means such as a display or an external apparatus.

The information obtaining unit 802 obtains the plurality of information to be described below, and is constituted by a communication interface or the like for performing data communication between various sensors for detecting various sensing information, the control unit 805, and an image data processing unit not shown in the drawing. The information obtaining unit 802 transmits a data obtaining request to the various sensors, the control unit 805, and the image data processing unit. As a result, various sensing information data from the various sensors, control parameter information data from the control unit 805, and input image information data from the image data processing unit can be received.

The control unit 805 is constituted by a CPU, RAM, ROM, an I/O interface unit, and so on. The index value calculation unit 803 and determination unit 804 may be provided separately to the control unit 805 as devices constituted by a unique LSI or the like, or may double as hardware resources constituting the control unit 805, such as the CPU.

The information that is obtained by the information obtaining unit 802 and inputted into the index value calculation unit includes sensing information, control parameter information, and input image information. The sensing information comprises data obtained by the various sensors provided within or around the image forming apparatus. Examples of such sensing information include the dimensions of each portion of the apparatus, the speed of the moving bodies in the apparatus, time (timing), weight, current value, potential, oscillation, sound, magnetic force, light amount, temperature, and humidity.

The control parameter information is typically information which accumulates as the results of control of the apparatus. Examples of this control parameter information include the user operating history, power consumption, toner consumption amount, the setting history of various image formation conditions, and the warning history.

The input image information is obtained from information inputted into the image forming system 806 as image data. Examples of this input image information include the cumulative number of color pixels, the ratio of the character portion, the ratio of the halftone portion, the ratio of colored characters, the toner consumption distribution in the main scanning direction, RGB signals (total toner amount per pixel unit), the size of the original, an original with borders, and the character type (size, font).

The state determining apparatus is constituted by the information obtaining unit, the index value calculation unit, and the determination unit. A plurality of types of information such as those indicated in the input information is obtained in the information obtaining unit, a single index value is calculated from this information in the index value calculation unit, and a determination as to whether or not the apparatus is normal is performed by the determination unit on the basis of the index value. If the apparatus appears close to an abnormal state, measures such as performing correction control on the image forming system through the control unit or issuing and displaying a warning to the outside are taken. Note, however, that the present invention merely claims index value calculation and state determination, and its scope does not extend to operations following those of the control unit. In the flow of "obtain information→calculate index value→determine state", information relating to a normal data set gathered in advance is required to calculate the index value. This normal data set information is formed into a matrix and used thus to calculate the index value. In the subsequent description, this matrix will be referred to as a "calculation parameter". The calculation parameter corresponds to the reference space in the MT method (Mahalanobis Taguchi method). The calculation parameter is calculated using the following method.

Figure 38:
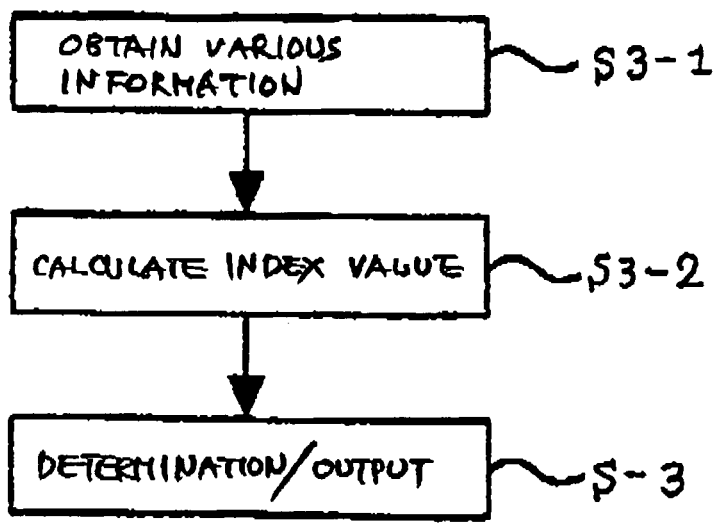
FIG. 38 is a flowchart showing a basic operation of the abnormality predicting system.

FIG. 38 is a flowchart showing a basic operation of the abnormality predicting system constituted as described above. The aforementioned plurality of types of information, which is assumed to be related to the state of the image forming apparatus, is inputted into the state determining apparatus 801 of the abnormality predicting system (step 3-1). The plurality of types of information is obtained at a required timing by the information obtaining unit 802, whereupon a single index value is calculated in the index value calculation unit 803 on the basis of the obtained information according to a predetermined calculation method (step 3-2). Data regarding temporal variation in the calculated index value are used to determine an abnormality, such as a fault, in the image forming apparatus, or outputted to a display or an external apparatus (step S3-3).

Before the index value is calculated, the index value calculation method (calculation formula) must be determined. In this embodiment, a multidimensional space is defined with different coordinate axes for each of the inputted plurality of information, and the index value is calculated as a distance within this multidimensional space. For this purpose, a plurality of groups of the plurality of information obtained in FIG. 37 is determined when the image forming apparatus is operating normally.

FIG. 12, which was referenced above, is a flowchart showing a procedure for determining the calculation method (calculation formula) of the index value.

First, n groups of k pieces of information thought to be related to the state of the image forming apparatus are obtained while operating the image forming apparatus (S1-1). The information is obtained in the manner described above, a specific example of which will be described hereafter.

FIG. 17, which was referenced above, shows the constitution of the data for the obtained information. Under the initial condition (for example, the first day, first machine, or similar), k pieces of data are obtained. These are set as y11, y12, ..., y1k. The data obtained similarly under the next condition (the second day, second machine, or similar) are set as y21, y22, ..., y2k, and so on until n groups of data are obtained.

Next, the raw data (for example, yij) are normalized for each information type (j) by an average value (yj) and a standard deviation ($\sigma$j) using the aforementioned Eq. (1) (S1-2). FIG. 18, which was referenced above, shows the results of normalization of the data shown in FIG. 17 using Eq. (1).

Next, all of the correlation coefficients rpq (=rqp) between two groups of data from among the k types of information are determined using the equation shown in Eq. (2), and these correlation coefficients are expressed as a matrix R, as shown in Eq. (3) (S1-3). An inverse matrix of the correlation coefficient matrix R is then determined, and the result of this determination is expressed as a matrix A, as illustrated in Eq. (4) (S1-4).

By means of this process, the value of the calculation parameter in the calculation formula used when calculating the single index value is determined. The data sets here all express a normal state, and it is therefore assumed that the various pieces of obtained information have a fixed correlation. When the apparatus diverges from a normal state and it appears that an abnormality such as a fault may occur, these correlations become unbalanced such that the "distance" from the origin (stable state average) in the multidimensional space defined as described above increases. This "distance" serves as the index value.

FIG. 13, which was referenced above, is a flowchart showing a procedure for calculating the index value in the step S3-2 in FIG. 38. The index value at an arbitrary timing is determined in the following manner. First, k types of data x1, x2, ..., xk in any state are obtained (S2-1). The data types correspond to y11, y12, ..., y1k, and so on. Next, the data for the obtained information are normalized using the aforementioned Eq. (6) (S2-2). Here, the normalized data correspond to X1, X2, ..., Xk. Then, using the calculation formula shown in Eq. (7) (S2-3), which is determined using the element akk of the determined inverse matrix A, the index value $D^2$ is calculated. Note that D, which is the square root of the index value, is known as a "Mahalanobis distance". Further, the symbol $\Sigma$ in the Eq. (7) denotes the sum relating to the suffixes p and q.

Figure 39:
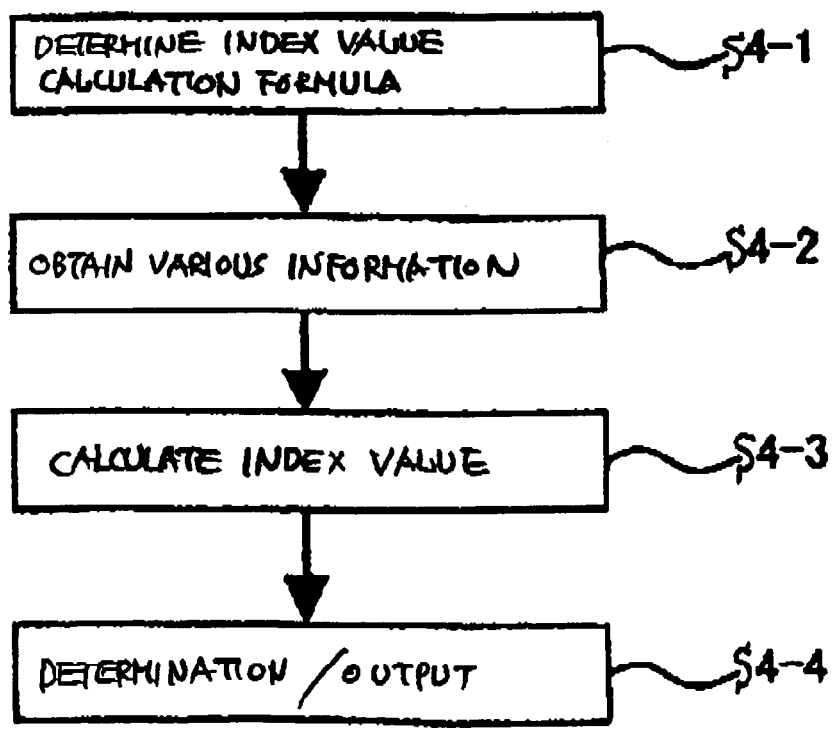
FIG. 39 is a flowchart showing a basic operation of an abnormality predicting system according to a modification of the third embodiment.

Note that the processing for determining the calculation method of the index value, or in other words the calculation formula of the index value, and the processing for calculating and updating the index value D using this calculation formula, may be executed continuously while the image forming system 806 is operative. In the processing flowchart in this case, the processing steps of FIG. 38 and the processing steps of FIG. 12 are combined, as shown in FIG. 39.

The description from "(a) Sensing information" to "(c) Input image information" in the first embodiment is applied as is to the types of information to be obtained in order to predict an abnormality in the copier shown in FIG. 1, to which this embodiment is applied, and the method of obtaining this information.

Thus the index value D is calculated from these various types of information, and an abnormality such as a fault is predicted by determining, on the basis of the index value, the latent possibility of an abnormality such as a fault occurring. Basically, the possibility of a fault occurring is determined to be high when the magnitude of the index value D calculated from the plurality of information as described above is greater than a predetermined threshold. This threshold is typically determined in advance through experiment. Alternatively, the threshold may be set at an arbitrary initial value (10, for example), and then updated as data accumulate.

The index value D is a gauge expressing the degree to which the correlation between the obtained information has diverged from a normal state. As the index value increases, this divergence from the normal state is determined to be greater. Hence the possibility of a fault occurring can be forecast even when the faulty mechanism is unclear.

Next, a treatment method, implemented after the index value D has been calculated and the occurrence of an abnormality has been predicted by determining the state of the image forming apparatus on the basis of the index value D, will be described. Measures such as those cited in the following sections (d) to (j) may be taken following calculation of the index value and abnormality prediction.

(d) Outputting the Calculation Result, State Determination Result, and Abnormality Prediction Result.

Examples of the content of this output include the calculation result of the index value D or a numerical value reflecting the index value, a determination result indicating a change in the state of the image forming apparatus, and a prediction result indicating the occurrence of an abnormality such as a fault or expiration of a component in the form of a warning or the like notifying the user than a fault is about to occur. Data relating to temporal variation in the value of the index value D or the numerical value reflecting the index value D may be outputted as a graph. The following methods may be cited as examples of output methods.

(d-1) Display of numerical value data or a message on display means such as a liquid crystal display in an operating unit panel or the like.

(d-2) A notification or warning constituted by a voice or a specific sound pattern that is output by audio output means such as a speaker.

(d-3) Recording onto a recording medium (transfer paper).

The results in (d) are outputted to display means or audio output means provided in the corresponding image forming apparatus, or recorded onto a recording medium (transfer paper) and then outputted. The result may also be transferred by transmission means to a printer server connected via a network, or a monitoring center connected by a communication line, which monitors the state of various apparatuses.

(e) Transferring the Calculation Result, State Determination Result, and Abnormality Prediction Result.

Similar content to that described in (d) may be transferred to a printer server or monitoring center.

(f) Storing the Calculation Result, State Determination Result, and Abnormality Prediction Result.

Similar content to that described in (d) is stored in a storage device (memory) provided in each image forming apparatus, the printer server, or a device in the monitoring center. The content that is stored in the storage device may also be read to perform control.

(g) Halting the Device

In cases such as when the calculation result of the index value D exceeds a predetermined reference value, or the increase rate of the index value D rises, the image forming apparatus is halted forcibly and maintenance is requested.

(h) Restricting Operations or Modifying Control.

Related parts of the calculation result of the index value D and the various information sources are estimated, and control modification such as restricting related operations is performed. The following may be cited as examples of such control modification.

(h-1) Modifying the color mode
(h-2) Modifying the recording speed
(h-3) Modifying the halftone screen ruling
(h-4) Modifying the halftone processing method
(h-5) Restricting the paper type (h-6) Modifying the registration control parameters
(h-7) Modifying the image Formation process parameters (in the case of an electrophotographic image forming apparatus, for example, the charging potential, exposure amount, development bias, transfer bias, etc.).

(i) Replenishing or Replacing Consumables or Components

Replenishment or replacement is performed automatically on the basis of the calculation result of the index value D.

(j) Automatic Repair

When the presence of an abnormality is determined in a specific site from both the index value D and the various information sources, a mode is executed to perform repairs on the specified site.

In this embodiment, individual index values or a single common index value are determined prior to product shipment using the copier shown in FIGS. 1 to 3, and following shipment, the index value is monitored online so that maintenance can be performed when the index value increases. As for the specific content of the types of information to be obtained and the method of obtaining this information, the description in the first embodiment from "(1) Temperature" to "(5) Photosensitive body uniform charging potential (for four colors)" and (7) Colored area ratio (for four colors) is applied thereto as is.

In this embodiment, the following description is also added.

(7) LD Drive Current

The drive current value of an LD (laser diode) which performs image exposure is monitored according to color on a drive circuit, and used.

(8) Total Counter (Cumulative Number of Print Screens Per Color)

Cumulative data obtained by counting the number of print screens for each color are used. For example, when one screen is formed in full color mode, Y, M, C, and Bk increase by one count each, and when one screen is formed in monochrome (black) mode, only Bk increases by one count. In Y and M modes, only Y and M increase by one count. These data are stored in a storage element, and the results are used.

(9) Development γ Value

A graded latent image potential is formed on the photosensitive bodies in a test mode, and by developing the latent image under specific conditions, a graded density pattern is formed. This is read by a reflection density sensor, and a relationship between the potential (potential difference) and the developed reflection density is determined. The gradient thereof is set as the γ value. This value is determined for each color, and used.

(10) Development Starting Voltage

The relationship between the potential and the developed reflection density is determined in the test mode described above, and a potential at which development reaches zero is determined by extrapolation. The result is set as the development starting voltage. This value is determined for each color, and used.

In this embodiment, the following test was implemented. A test printer was prepared, and a running test emulating various usage modes was performed in a laboratory. During the test, the 10 items and 30 types of data described above were gathered several times every day. A part of the gathered data is shown in FIG. 40.

In actuality, 50 groups of data were gathered, and during that time, operations continued with no particular problems.

Calculations using the aforementioned Eq. (1) to Eq. (6) were performed on the basis of the data to determine the calculation parameter in Eq. (7). Using the result of this determination, the average value of D of the 50 groups obtained during a normal operation was approximately 1. Thus the calculation method (calculation formula) of the index value D was defined.

Next, following the sale of products manufactured on the basis of the test machine, continuous monitoring of these products was performed on the market. The obtained data were identical to those of the previous test.

Figure 41:
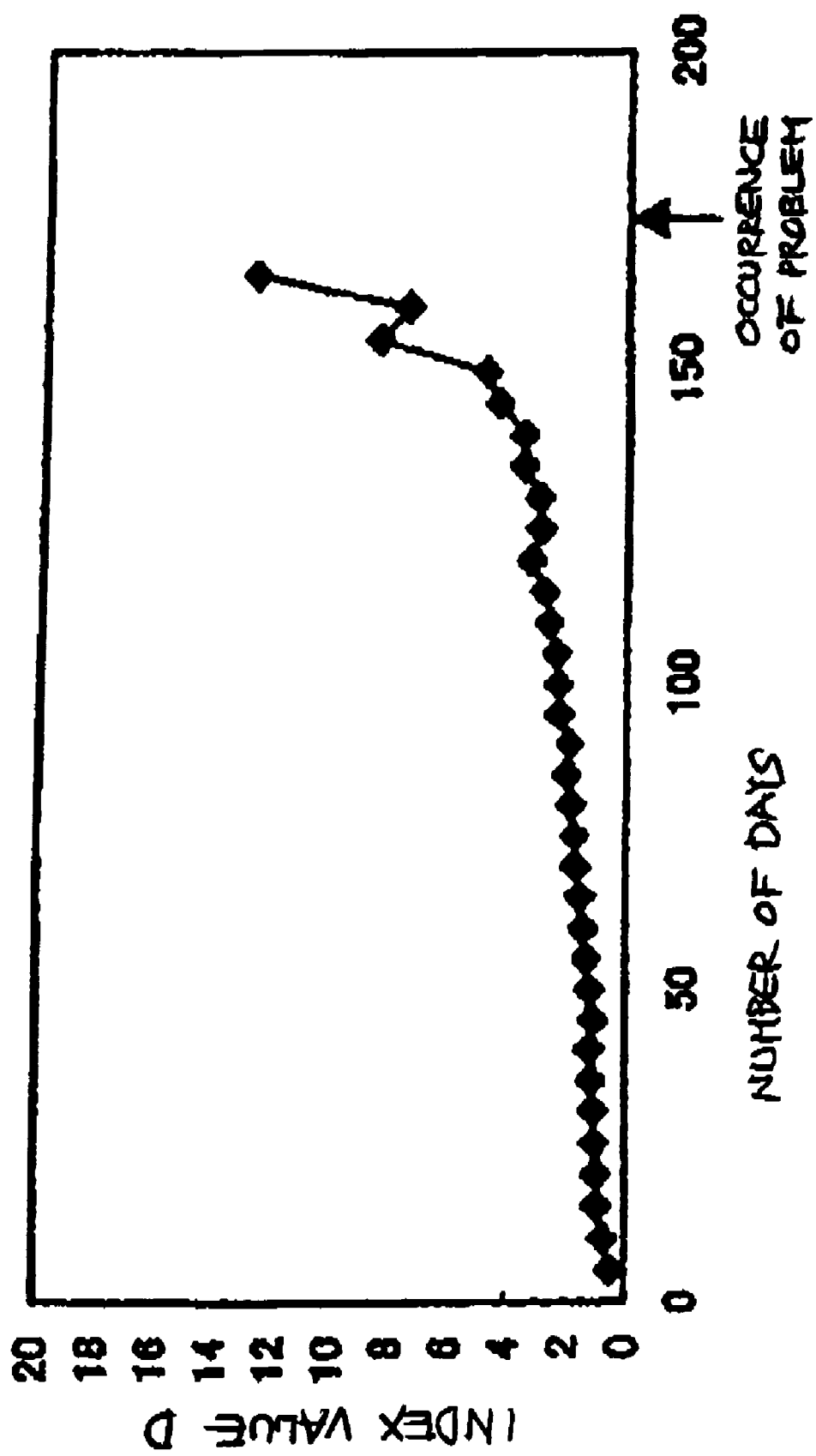
FIG. 41 is a graph showing movement (temporal variation) of an index value D calculated in the third embodiment.

FIG. 41 is a graph showing movement (temporal variation) in the index value D calculated in this embodiment. In FIG. 41, the timing at which a problem (abnormal state) occurs in the image forming apparatus is indicated by the arrow. In this case, the problem that occurs is toner filming onto the photosensitive body. The index value D rises prior to the occurrence of this abnormality. From this result, it can be seen that there is a close correlation between an increase in the index value D and the occurrence of an abnormality, and hence by following the temporal variation data of the index value D, this problem (toner filming) can be predicted prior to its occurrence. In other words, an approaching change in the state of the printer can be determined on the basis of temporal variation in the rising index value D, and thus the remaining amount of time before the index value D reaches a value at which the problem (toner filming) occurs can be learned. Hence it is possible not only to determine the presence of the problem (toner filming), but also predict the remaining amount of time before the problem (toner filming) occurs.

Note that in this embodiment, the image forming apparatus is connected to a monitoring system via a communication line, and the value of the index value D is transmitted to the monitoring system constantly. In the monitoring system, setting is performed to monitor variation in the index value D and issue a warning when the index value D begins to increase and exceeds a specific value. When a warning is issued, a potential fault is considered to be present, and hence a serviceperson is dispatched to perform maintenance. The serviceperson checks the state of the image forming apparatus directly, and takes necessary measures such as component replacement, or electrical and mechanical adjustments. After taking these measures, the serviceperson confirms that the value of the index value D is within the normal range, whereupon maintenance is complete. Further, the value of the index value D or a comment corresponding thereto is displayed at all times, and thus the user is informed of the state and encouraged to perform preliminary maintenance.

As described above, by using this calculation parameter, defined by the normal data set alone, the index value can be calculated from the input information data sets obtained thereafter, the obtained index value having a characteristic whereby it increases in value when the input information data set used in the calculation differs from the normal data set of the calculation parameter. In other words, the index value increases as the apparatus diverges from a normal state, and this characteristic can be used to determine the state of the apparatus. The index value corresponds to a Mahalanobis distance in the MT method, having a value of approximately one in a normal state, and gradually increasing in an abnormal state. A value of approximately 3 is typically used as a threshold between a normal and an abnormal state.

Figure 42:
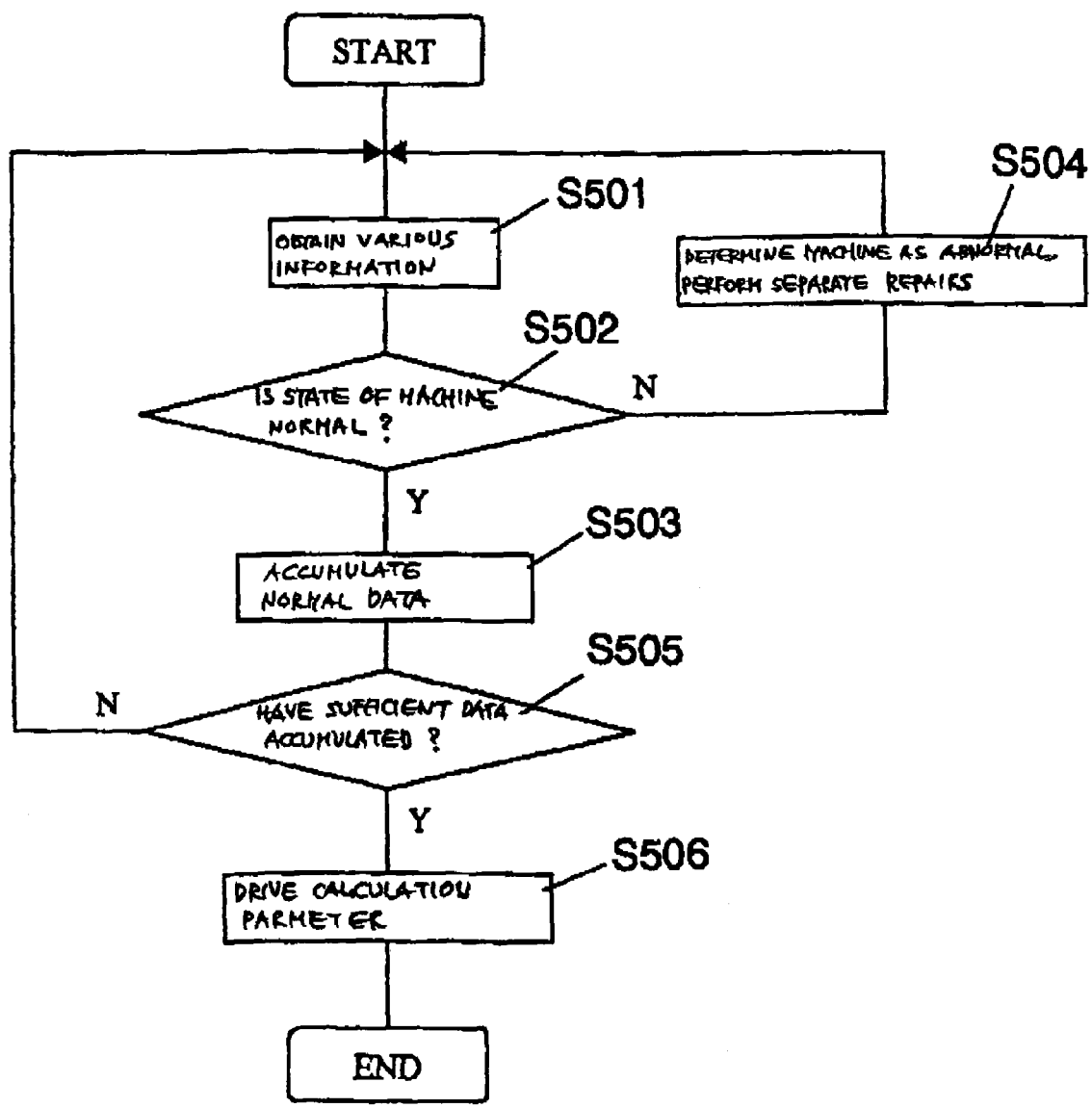
FIG. 42 is a flowchart for deriving a calculation parameter.
Figure 43:
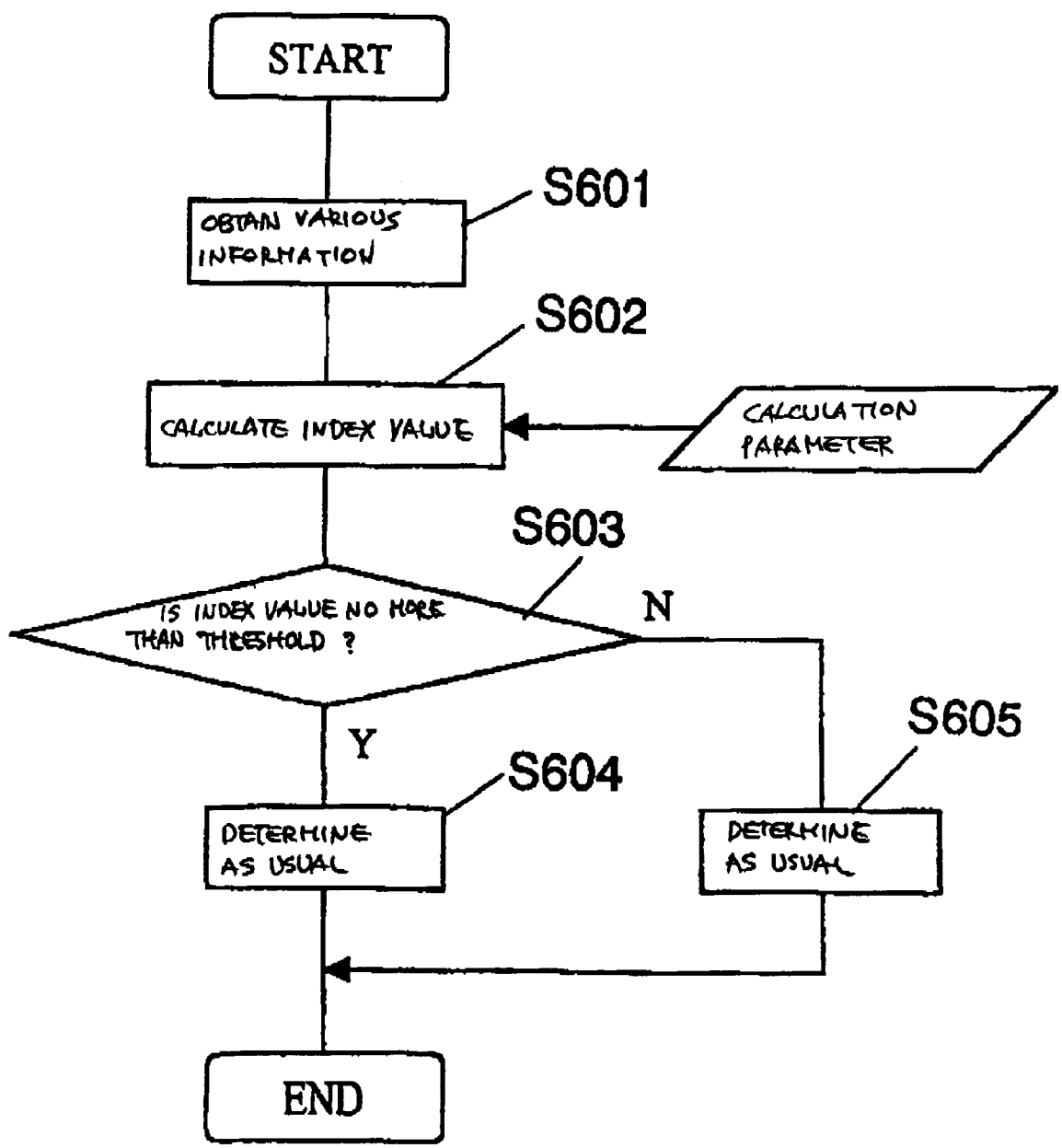
FIG. 43 is a flowchart for calculating an index value and determining a state.

A flowchart for deriving the calculation parameter is shown in FIG. 42, and a flowchart for calculating the index value and determining the state of the apparatus is shown in FIG. 43.

In the calculation parameter derivation method shown in FIG. 42, first various input information is obtained (step S501) This input information is the sensing information (a), control parameter information (b), input image information (c) and so on, shown in FIG. 37. Next, the state of the image forming apparatus while these data are obtained is determined separately by some means (step S502). As the determination means, a manual determination performed by the operator or an automatic determination performed by a sensor may be employed. If, as a result of the determination, the machine is determined to be normal (step S502-Y), the input data information is accumulated as normal data (step S503), and if the machine is determined to be abnormal, the machine is repaired (step S504), whereupon information gathering is restarted. If the state of the machine is normal, normal data are accumulated gradually, and when a fixed amount of data has been gathered or a data gathering period has elapsed (step S505-Y), calculation parameter derivation is performed (step S506) to determine the calculation parameter. Note that there is a lower limit to the fixed amount of data whereby, if there are k types of input information data, then k+1 groups of data must be gathered. This is a required condition for determining the calculation parameter as an inverse matrix.

In the index value calculation and state determination method shown in FIG. 43, first the various input information are obtained similarly to FIG. 42 (step S601). The input information types must be exactly the same as the input information types from which the calculation parameter is derived. If the number of types is different, the index value cannot be calculated normally, and if different types of input information are gathered, even if the number of types is the same, the calculation parameter becomes meaningless, and hence it becomes impossible to perform a state determination using the calculated index value. In the case of index value calculation, the index value is calculated every time information is inputted (step S602).

The timing of information input is set, for example, at a fixed number of printed sheets, a certain time every day, or in another manner. During index value calculation, the calculation parameter derived in FIG. 42 is used to determine whether or not the state of the apparatus is normal on the basis of the magnitude of the determined index value (step S603). The index value threshold used during a determination is typically set to approximately 3, as noted above, but the threshold may be set independently according to the system to which it is applied, the types of input information, and a user-requested level. If the index value is equal to or less than the threshold, the entire machine is determined to be normal (step S604), and if the index value exceeds the threshold, the machine is determined to be approaching an abnormal state (step S605). If the index value greatly exceeds the threshold (reaching a two-figure or three-figure value), the machine is determined to be in a definite abnormal state. Thus in the aforementioned state determination method, state determinations are performed according to the flows shown in FIGS. 42 and 43. Note that in the case of abnormality prediction, temporal variation in the index value is monitored in order to predict the time at which a definite abnormality is due to occur, and hence this is basically identical to the state determination method illustrated in FIGS. 42 and 43.

In this type of image forming apparatus, the plurality of types of information to be obtained are, as described above:

(a) Sensing Information

Developer information (toner concentration, fluidity, bulk density, electric resistance, consumption amount, remaining amount, and so on), photosensitive body information (surface potential, color, irregularities, coefficient of friction, electric resistance value, and soon), paper conveyance information (deviation in the conveyance timing, vibration noise during conveyance, and so on), paper information (strength, thickness, surface condition, moisture content, and so on), driving information (rotation speed, drive current, drive noise, and soon), output image information (density, γ characteristic, halftone reproducibility, and so on), environment information (temperature, humidity, airflow, atmospheric composition, and so on), etc;

(b) Control Parameter Information

Image formation parameters (various bias values, light amount, linear speed, fixing temperature, and so on), user scanning history, power consumption, consumption amount of combustibles, etc; and (c) Input Image Information Pixel number, character ratio, halftone portion ratio, color ratio, font information, etc.

By gathering this information continuously during a normal operation when the image forming apparatus has been shipped onto the market and is in use, the precision of the calculation parameter can be raised. The calculation parameter is an index expressing the normal state of the apparatus, and hence ideally should include all possible combinations of data that are determined as being in a normal state. If a certain normal data combination is not included in the calculation parameter, the index value calculated in relation to that normal data combination will take a large value, and hence the data combination will be determined as abnormal. To avoid this, the normal data set from which the calculation parameter is derived must include all possible combinations of normal data. However, it is impossible to prepare such a normal data set prior to shipment of the apparatus since the environment in which the apparatus will be placed at the user destination and the manner in which the apparatus will be used cannot be predicted. In consideration of this point, the normal data set is gathered continuously at the user destination following shipment of the apparatus, and the calculation parameter is derived and fixed only when a sufficient amount of data has been gathered.

To realize this continuous gathering of the normal data set, means must be provided for determining whether or not the image forming apparatus is in a normal state. In this embodiment, image quality detecting means for detecting the image quality of an output image are provided in order to determine whether or not the image forming apparatus is operating normally. The image quality detecting means may take either a line form such as a CCD, or a spot form such as a P sensor. A line sensor such as a CCD is required for measuring the image quality of the entire output image, but since a large data amount is produced, image quality calculation processing increases in bulk, and hence under the current circumstances, a spot sensor is more realistic. It should be noted, however, that a line sensor such as a CCD is also suitable for an application such as that of the present invention, in which speed is not required. The image quality detecting means are disposed so as to detect the medium onto which the toner image is formed, more specifically on the photosensitive body, the intermediate transfer body, the transfer paper, or a similar position. The most appropriate disposal position for checking the operational state of the entire apparatus is on the final output medium, or in other words the transfer paper, and hence by detecting the image quality on the transfer paper, the state of the entire apparatus can be learned. Note, however, that a method of providing image quality sensors on the intermediate transfer body and photosensitive body, and checking conditions downstream thereof with individual sensors, may also be considered.

(11) Image quality detection

Here, an outline of an image quality detecting sensor will be provided.

1. Outline of Image Quality Detection

First, an outline of image quality detection will be provided with reference to FIGS. 44 to 54.

1.1 General Outline

The basic constitution of the entire image forming apparatus serving as the subject of image quality detection is as described in FIG. 1, and the main parts of the image forming unit are as illustrated in FIG. 2.

Note that in FIG. 1, a full color apparatus using a four-drum tandem type intermediate transfer method is shown as an example of the image forming apparatus, but this is merely a representative example of an image forming apparatus, and as will be described below, a full color apparatus using a four-drum tandem type direct transfer system, a single-drum type intermediate transfer system, or another system may be used. The present invention may also be applied to a direct transfer type monochrome apparatus or an image forming apparatus using another system.

1.2 Image Quality

Figure 44:
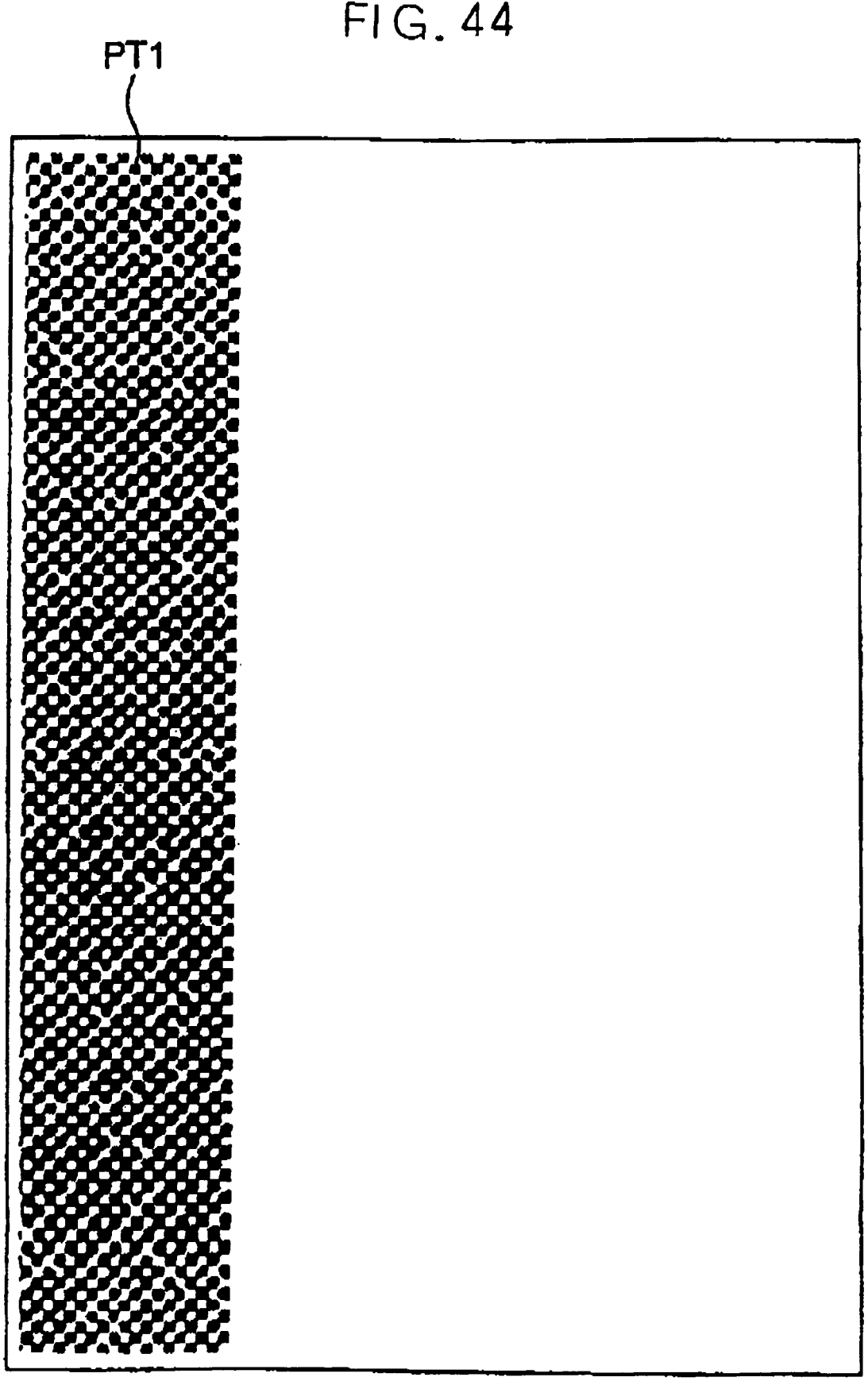
FIG. 44 is an enlarged photograph showing an initial image PT1 of a halftone dot image formed on recording paper by the image forming apparatus of FIGS. 1 and 2, comprising a 600 dpi writing system.
Figure 45:
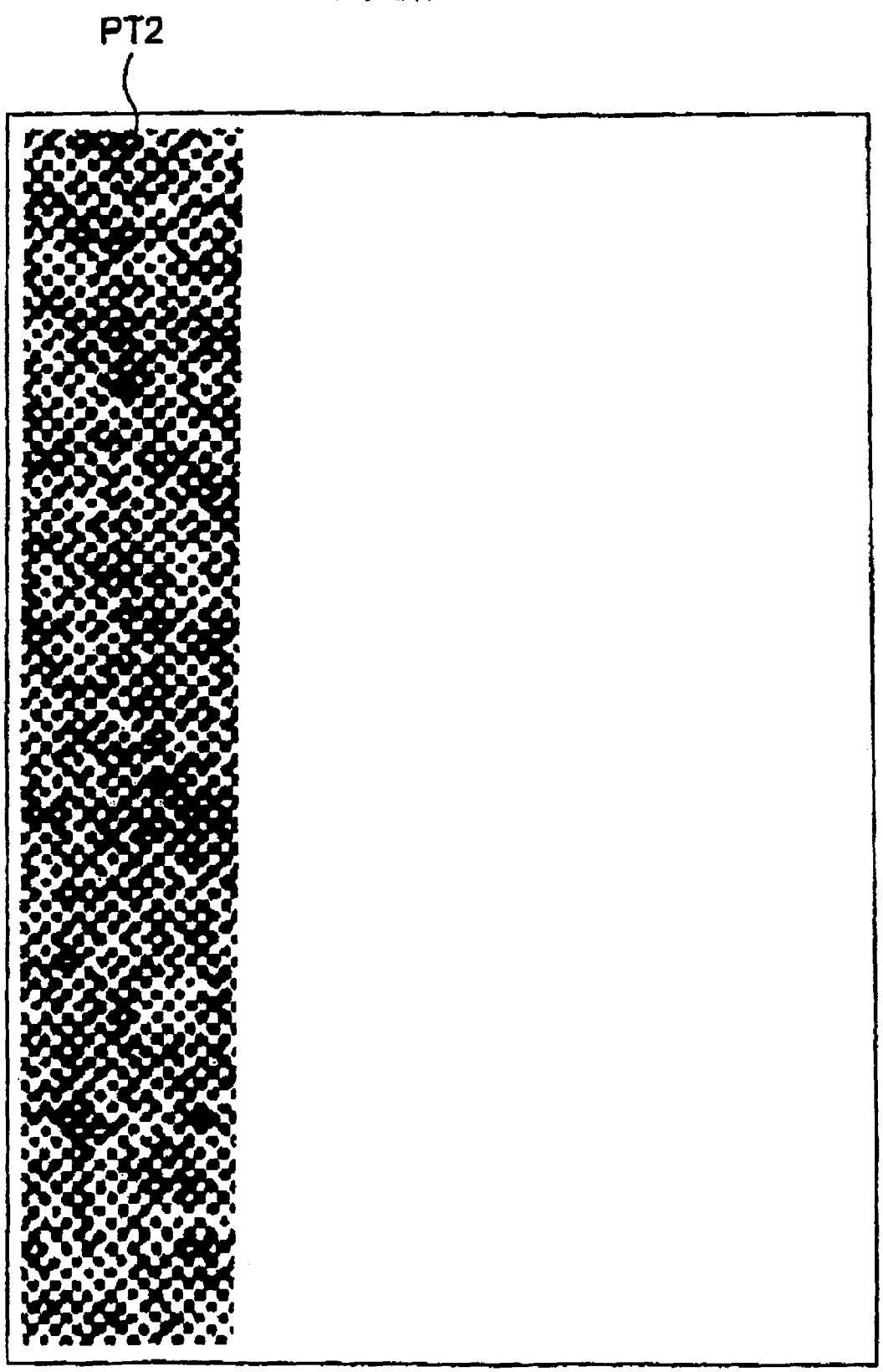
FIG. 45 is an enlarged photograph of a halftone dot image showing an image PT2 following printing over an extremely long time period under certain conditions.

FIGS. 44 and 45 are enlarged photographs (for convenience of description, binarization processing was implemented during image capture) showing a halftone dot image (the size of one halftone dot is [2 pixels×2 pixels]) formed on transfer paper by the image forming apparatus shown in FIGS. 1 and 2, comprising a 600 dpi writing system. FIG. 44 shows an initial image PT1, and FIG. 45 shows an image PT2 following printing performed over an extremely long period of time under certain conditions. The initially uniform halftone image PT1 shown in FIG. 44 becomes the rough halftone image PT2 shown in FIG. 45 due to various factors such as deterioration of the developer and photosensitive body during the long image-creating process. The roughness of the halftone image PT2 in FIG. 45 may be quantified as a spatial frequency characteristic of the fine density unevenness and expressed as a characteristic value such as "granularity", for example.

Figure 46:
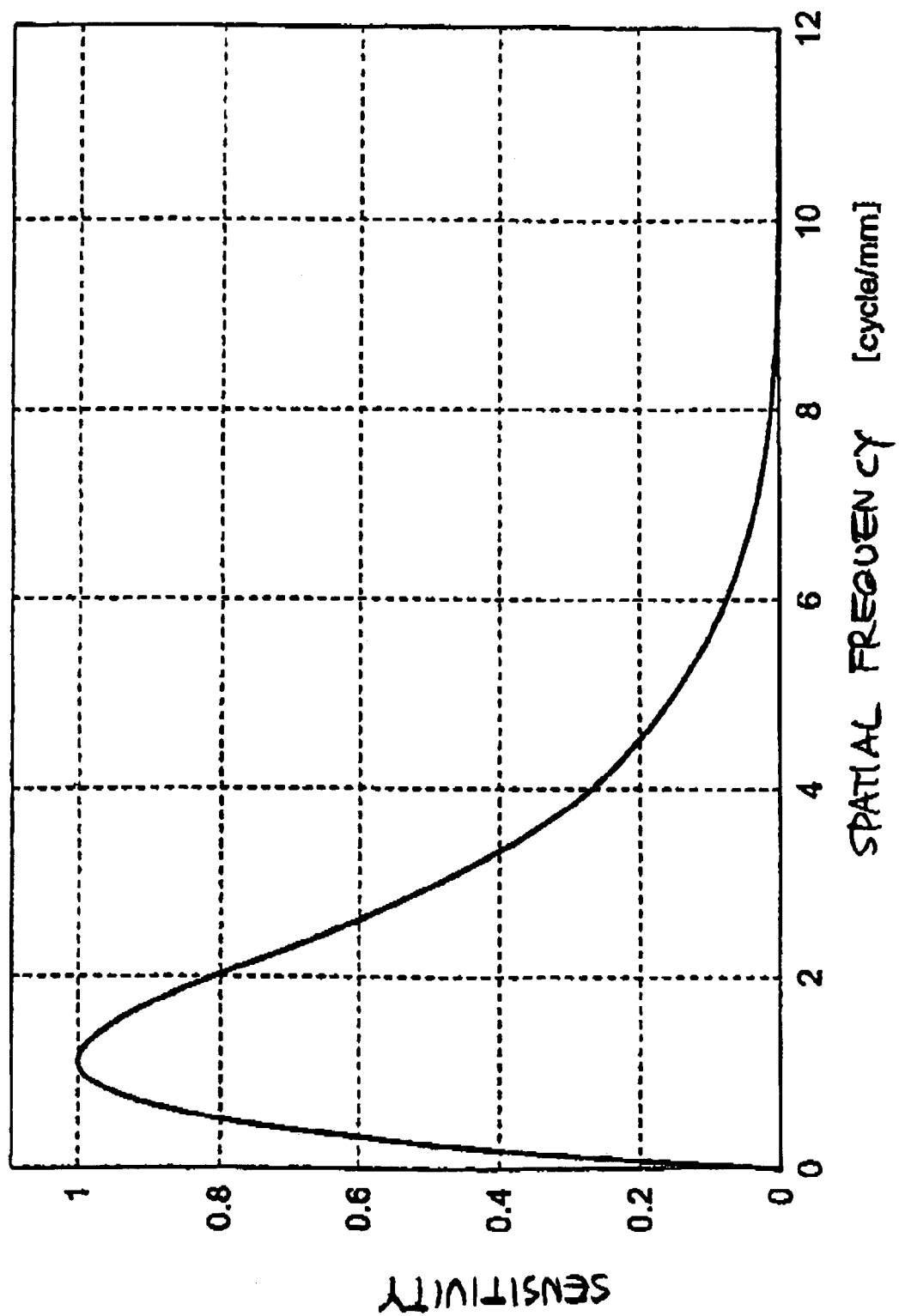
FIG. 46 is a graph showing a relationship between the spatial frequency of human sight and sensitivity.

An image having a high degree of granularity (high graininess) is an image showing great roughness, and an image having a low degree of granularity (low graininess) is a uniform image showing little roughness. However, not all density unevenness can be perceived visually as roughness, and as long as no sense of roughness is perceived by the human eye, the image quality of a printed image may be deemed satisfactory. The spatial frequency characteristic of the sight of an average trial subject in relation to density unevenness is shown in FIG. 46*. It is known that the spatial frequency at which density unevenness can be perceived by the human eye is limited to a spatial frequency range of 0 [cycle/mm] to approximately 10 [cycle/mm], with a peak of approximately 1 [cycle/mm], as noted above.

Figure 47:
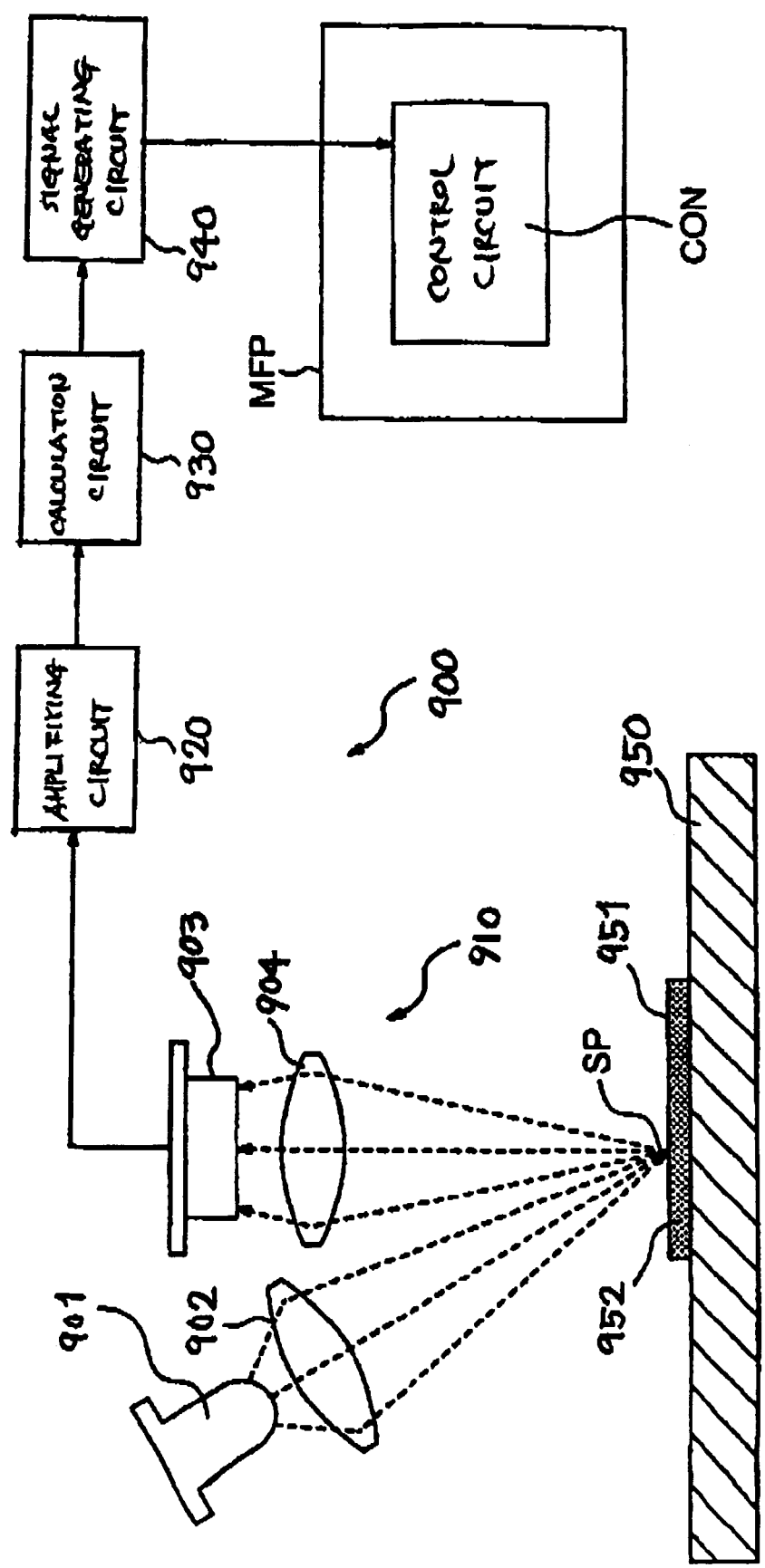
FIG. 47 is a view showing an outline of the constitution of an image quality detecting apparatus for measuring fine unevenness in the density of an image.
Figure 48:
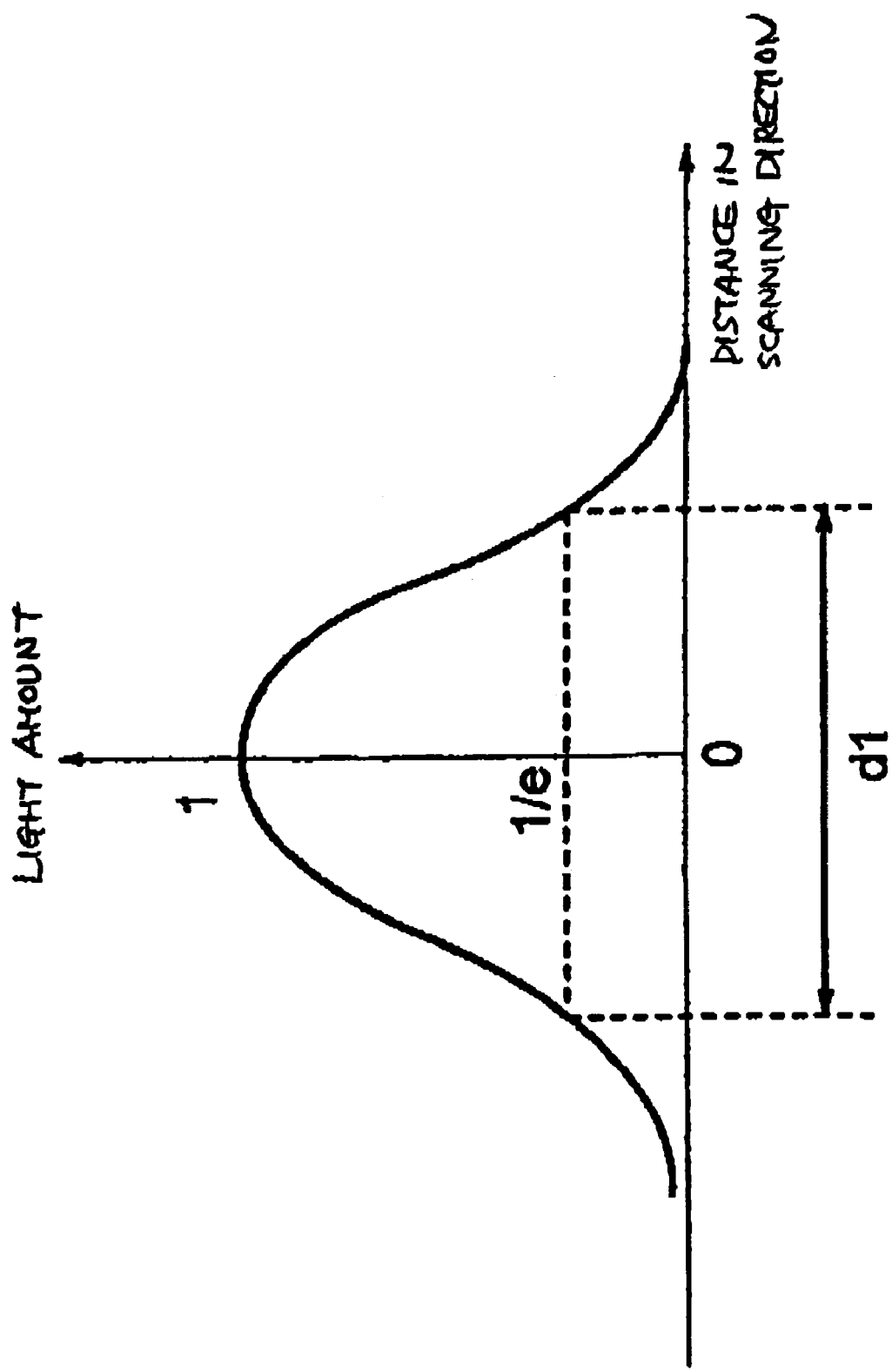
FIG. 48 is a characteristic diagram showing a relationship between distance in a scanning direction (beam diameter) and a light amount.

FIG. 47 is a view showing an outline of the constitution of an image quality detecting apparatus for measuring fine density unevenness in an image. In the drawing, an image quality detecting apparatus 900 comprises a reflection type optical sensor (photo-reflector) 910, an amplifying circuit 920 for amplifying an electric signal from the reflection type optical sensor 910, a calculation circuit 930 serving as calculating means for performing predetermined calculation processing on the basis of the signal that is amplified by the amplifying circuit 920, and a signal generating circuit 940 serving as signal generating means for generating a signal required for optical recording control on the basis of the calculation output of the calculation circuit 930. The reflection type optical sensor 910 comprises an LED (light-emitting diode—light-emitting element) 901 serving as a light source, a condenser lens 902 for condensing the light emitted from the LED 901 to a light beam having a predetermined beam diameter, a photoelectric converter element (light-receiving element) 903 for receiving reflection light from an image pattern 951 on an image carrier 950 and converting the reflection light into an electric signal, and an imaging lens 904 for forming the reflection light from the image pattern 951 into an image on an image forming surface of the photoelectric converter element 903. As can be seen from the characteristic diagram in FIG. 48, showing the relationship between distance in the scanning direction (the beam diameter) and light amount, the reflection type optical sensor 910 uses a reflection type optical sensor in which the irradiation beam diameter is narrowed to a spot light SP.

The reflection type optical sensor 910 condenses an irradiation beam from the light source constituted by the LED 901 using the condenser lens 902 such that the circular beam diameter on the surface of the image pattern 951 formed on the image carrier 950 reaches approximately 400 [μm]. The light that is reflected therefrom is detected by the photoelectric converter element 903, such as a photodiode, and thus adhesion unevenness of toner particles 952 within the image pattern 951 can be grasped as variation in the light amount entering the photoelectric converter element 903.

Variation in the light amount corresponding to the toner adhesion amount may be learned by a method of detecting this variation according to differences in the specular reflection characteristic or irregular reflection characteristic of the toner particles and the surface of the image carrier, a method of detecting this variation according to differences in the reflection spectroscopy characteristic of the toner particles and the image carrier surface, and so on. By combining these methods, highly sensitive detection can be performed. When differences in the specular reflection characteristic or irregular reflection characteristic are used, a material having a high degree of glossiness and a strong specular reflection characteristic is preferably used for the surface of the image carrier 950 due to the typically strong irregular reflection characteristic of a toner image. When detection is performed according to differences in the reflection spectroscopy characteristic, a light source wavelength at which the reflection spectroscopy characteristic of the toner particles 952 differs greatly from the reflection spectroscopy characteristic of the surface of the image carrier 950 is preferably used. The measuring apparatus in FIG. 47 uses the LED 901 having a light-emitting wavelength of 870 [μm], and in this case, a detection method using the difference in their regular reflection characteristic of the toner particles 952 and the surface of the image carrier 950 is implemented. The beam diameter (d1 in FIG. 48) relating to the scanning direction of at least the spot light SP must be set to no more than 1 [μm] so that density unevenness of approximately 1 [cycle/mm], which is the most sensitive value in the spatial frequency characteristic of the human eye shown in FIG. 46, can be detected.

This beam diameter d1 is derived from the inverse 1 [μm] of the maximum value 1 [cycle/mm] of the spatial frequency in FIG. 47, and here, the beam diameter d1 is set at approximately 400 [μm]. The beam diameter d1 is defined here as the distance between points on the two sides of the light beam at which the power per unit area of the spot light SP on the beam irradiation surface falls to a maximum value of 1/e.

Figure 49:
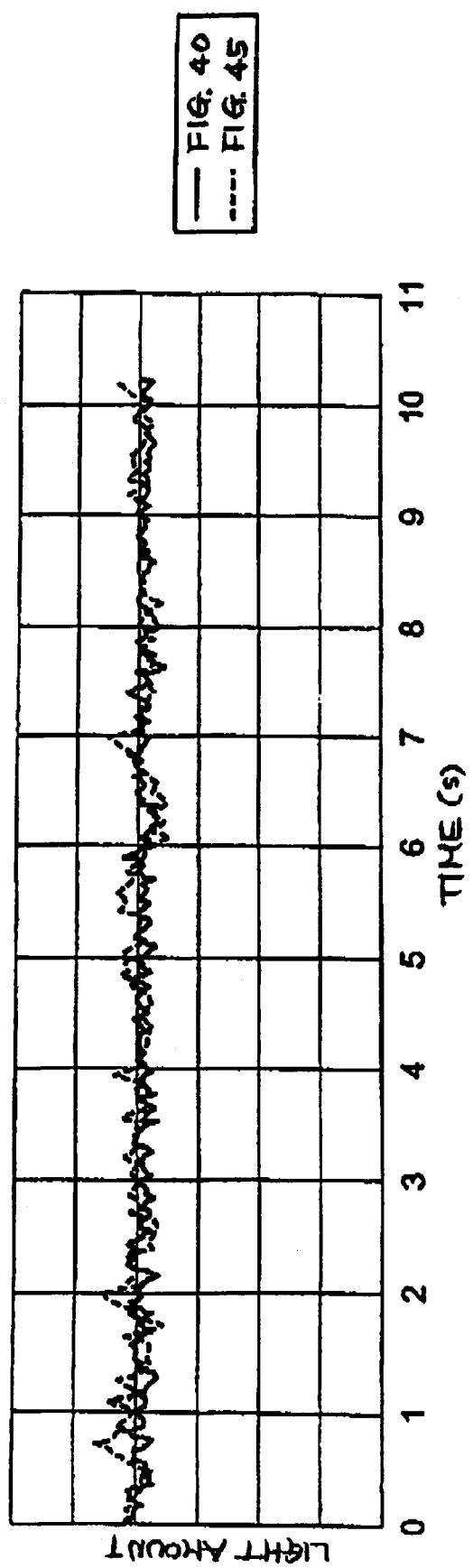
FIG. 49 is a graph showing a state of output when an amount of light is output with time as a parameter.

FIGS. 44 and 45 described above show an example of the constitution of an image creating process of the image forming apparatus in which the reflection type optical sensor (image quality sensor) 910 shown in FIG. 47 is disposed opposite an intermediate transfer belt immediately after the developing process. Scanning of the image on the photosensitive body by the spot light SP is performed by driving the photosensitive body to rotate, and the reflection light output when the images PT1, PT2 shown in FIGS. 44 and 45 are scanned in the paper conveyance direction (the longitudinal direction in the drawings) is detected. The state of variation in the light amount (voltage) of the reflection light from the amplifying circuit 920 is shown in FIG. 49. The scanning conditions of the spot light SP at this time area scanning speed of 200 [μm/s], a scanning distance of approximately 11 [mm], and a data sampling cycle of 75 [μs]. In other words, the sampling pitch on the image is approximately 15 [μs], and scanning is performed only once, without including an averaging process or the like. Note that by determining the average light amount value in FIG. 52, the average adhesion amount of the toner particles 952 adhering to the pattern can be calculated.

1.4 Visual Noise (Image Quality)

1.4.1 Noise Amount Calculation

Figure 50:
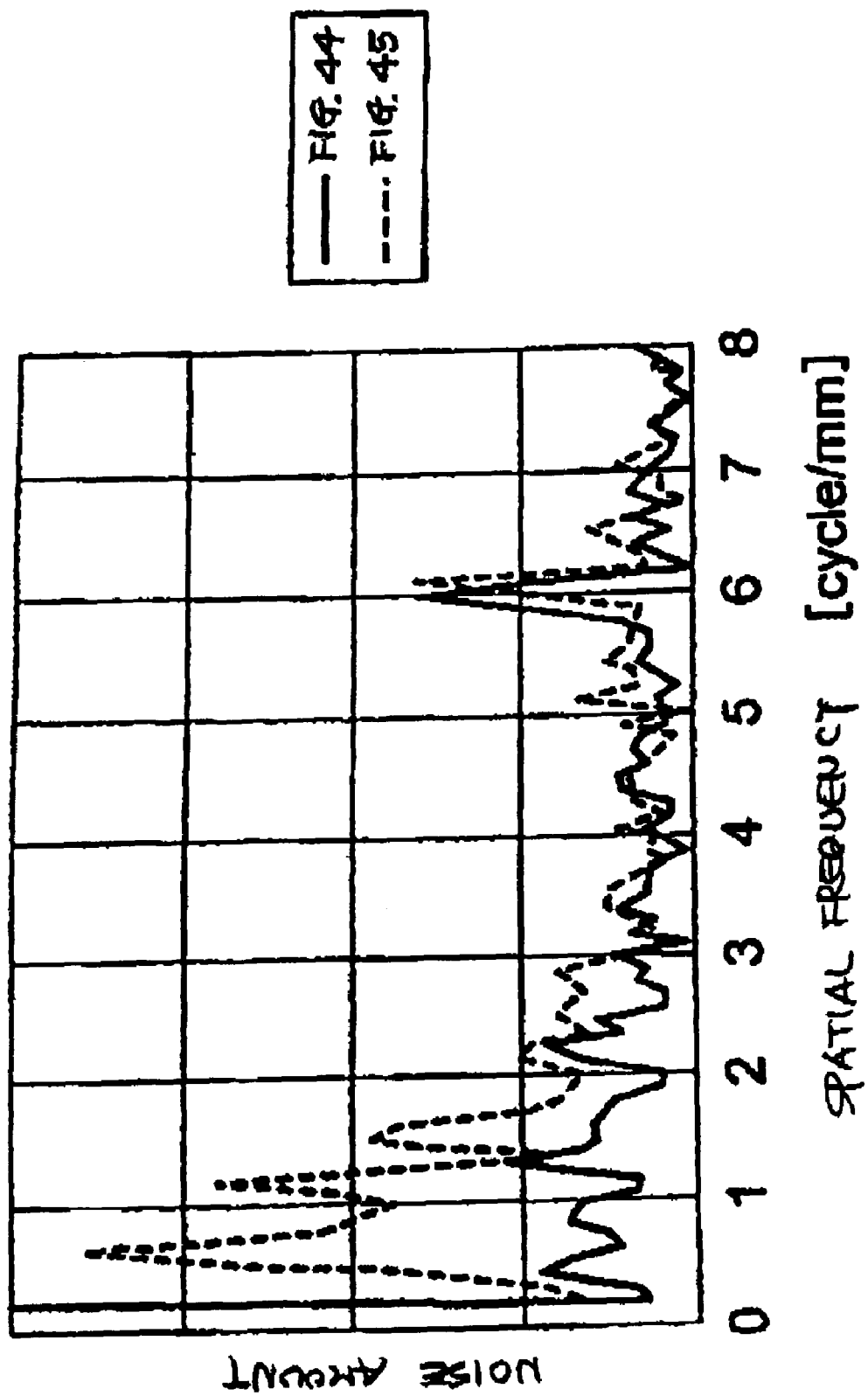
FIG. 50 is a graph showing a transformation result (spatial frequency characteristic) produced by fast Fourier transformation.

With the state of output shown in FIG. 49, where an amount of light is output with time as a parameter, the spatial frequency characteristic of image density unevenness cannot be read, and therefore the spatial frequency characteristic is calculated by the calculation circuit 930. Well-known means such as fast Fourier transformation (FFT) are preferably applied to calculate the spatial frequency characteristic from the point of view of processing speed. The transformation result of the fast Fourier transformation is shown in FIG. 50. Note that the peak seen at 6 [cycle/mm] in FIG. 50 is due to the repetition frequency of the dot pattern in FIGS. 44 and 45.

As can be seen from FIG. 46, the visual characteristic is extremely sensitive to density unevenness having a spatial frequency in the vicinity of 1 [cycle/mm], and therefore, by comparing this to the noise amount in the vicinity of 1 [cycle/mm] in FIG. 50, for example, the degree of deterioration in the image quality of the pattern (image PT2) shown in FIG. 45 from the pattern (image PT1) shown in FIG. 44 can be learned. When a deterioration in image quality is detected in this manner, signal generation is performed by the signal generating circuit 940 in the measuring apparatus shown in FIG. 47 in order to effect appropriate control of the image forming conditions. This signal is received, whereupon the image forming conditions are controlled automatically by a control circuit CON of the image forming apparatus MFP shown in FIG. 47, and thus automatic control is performed to restore normal image quality to the greatest extent possible.

When image quality restoration is deemed impossible by automatic control alone, the control circuit CON instructs on a display device, not shown in the drawing, that parts such as the developer and photosensitive body be exchanged, and thus encourages parts exchange. In so doing, the life span of the developer, photosensitive body, and so on can be extended to a maximum. Moreover, since the size of minimum required pattern is approximately 1 [μm]×approximately 10 [μm], the amount of toner consumed by pattern image formation can be held to a minimum.

1.4.2 Visual Noise Amount Calculation

Figure 51:
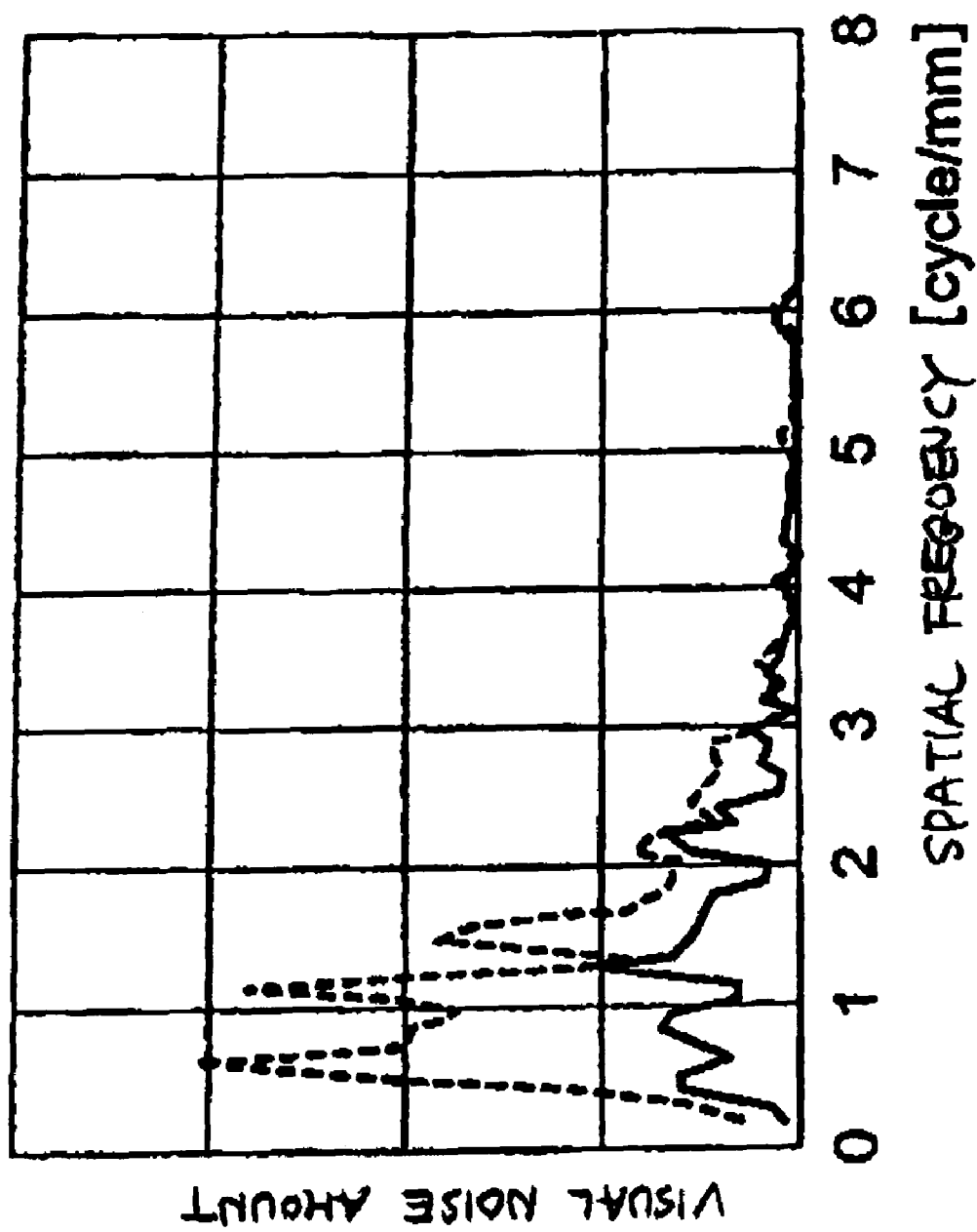
FIG. 51 is a graph showing a visual noise amount.

After obtaining the spatial frequency characteristic in FIG. 50, weighting of the visual spatial frequency characteristic shown in FIG. 46 is performed on the spatial frequency characteristic by the calculation circuit 930 to determine the visual noise amount. FIG. 51 shows the relationship between the visual noise amount and the spatial frequency, and illustrates the state of output of the visual noise amount by the calculation circuit 930. Weighting is performed by multiplying the characteristic shown in FIG. 51 to the characteristic shown in FIG. 50. As a result of this calculation, the visual spatial frequency characteristic alone can be extracted, and hence the target image quality detection can be performed easily. Moreover, the signal portion appearing in the vicinity of 6 [cycle/mm] caused by the image pattern structure can be eliminated, and hence information which is unrelated to the image quality under observation can be removed. By removing such information which is unrelated to the image quality, the occurrence of detection errors can be substantially eliminated.

1.4.3 Total Visual Noise Amount

Figure 52:
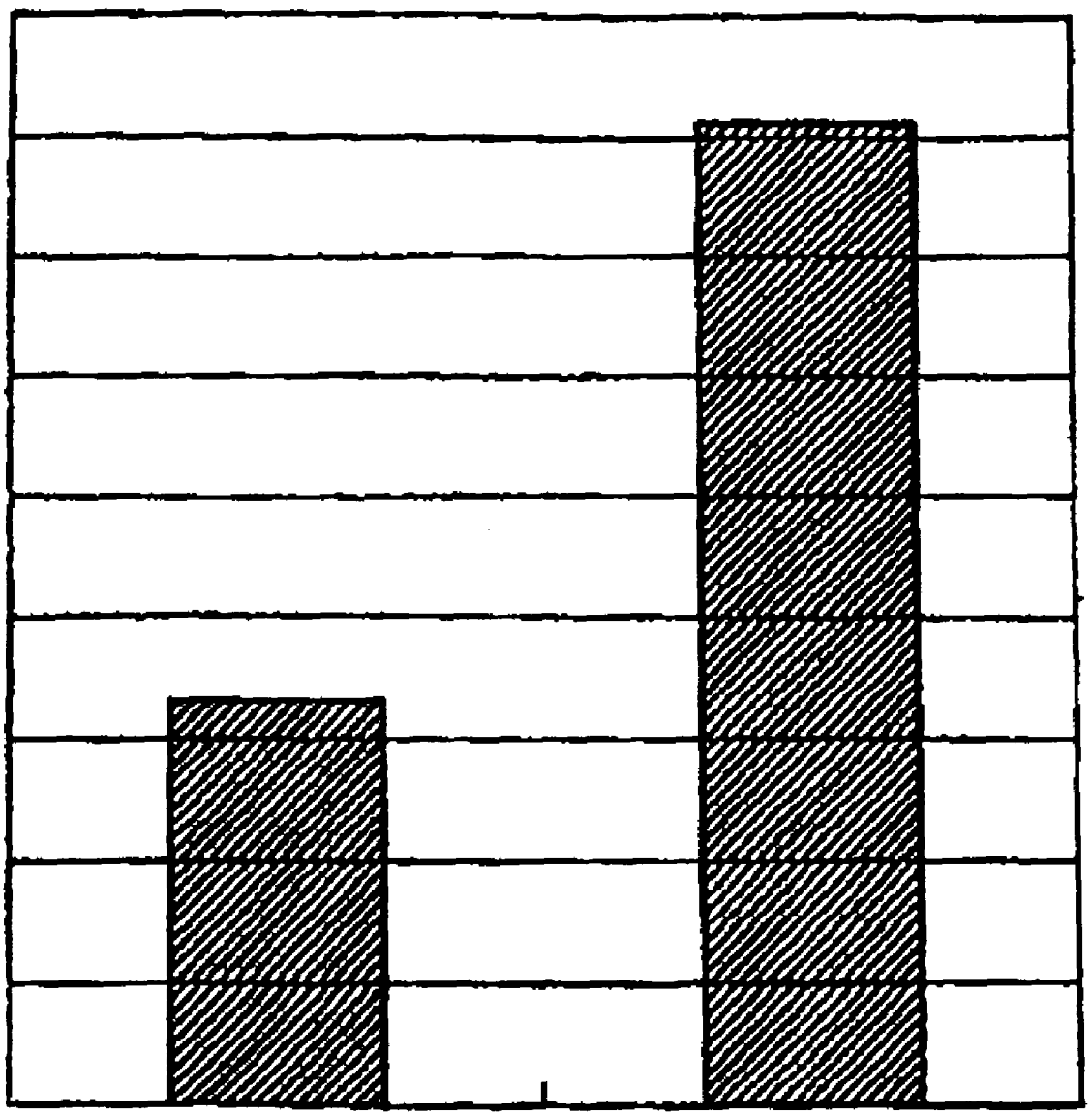
FIG. 52 is a graph showing a calculated total visual noise amount.

By integrating the visual noise amount shown in FIG. 51 for a spatial frequency range of 0.2 [cycle/mm] to 4 [cycle/mm] using the calculation circuit 930, a total visual noise amount is calculated, as shown in FIG. 52. With this value, the total image quality variation over substantially the entire spatial frequency range that is perceived visually can be learned.

Note that an image quality evaluation pattern to be described below preferably uses an approximately 50% halftone image. This is due to the fact that graininess is striking. First, continuous density variation data in the sub scanning direction of the image pattern are gathered in the case of a monocular sensor such as that shown in FIG. 47, or in the case of a line sensor, continuous density variation data in the main scanning direction are gathered. When a monochrome sensor is used, continuous data on only a specific wavelength (color) are gathered, and when a color sensor is used, continuous data on a plurality of wavelengths (colors) are gathered.

The gathered continuous data are Fourier transformed as described above to obtain a density variation power spectrum. The visual spatial frequency characteristic (VTF) is multiplied by the square root of the power spectrum (the amplitude of the variation), and then weighting of the density variation based on the visual characteristic is performed in the frequency range described above. By integrating the weighted density variation amount, the granularity is determined. Thus granularity is determined using density as a reference. Recently, however, the granularity of brightness, which has a favorable linearity with the human eye, has been employed. Hence, to determine the granularity of brightness, first the density data must be converted into brightness data. Further, to determine color granularity, the granularity is calculated using color information in addition to brightness information. Thus graininess information is determined from density variation data. By performing feedback control on the basis of the graininess information determined in this manner, images having a stable graininess can be outputted continuously.

To detect the image quality on the basis of density unevenness, instead of the pattern shown in FIG. 44, a pattern may be used in which dots having a minimum unit of 600 dpi form a single unit of 2 pixels×2 pixels, and a repetition cycle z1 of the dot array in the scanning direction of the spot light SP is set at approximately 170 [μm] (a spatial frequency f1 is approximately 5.9 [cycle/mm], for example). When such a pattern is scanned by the spot light SP having a beam diameter of approximately 400 [μm], as described above, a spectrum appears at a spatial frequency in the vicinity of 6 [cycle/mm], as in FIG. 50. To prevent the spectrum generated by the image pattern itself from overlapping with the detection range of the image quality detection signal, the repetition cycle z1 of the dot array in the scanning direction must be set at less than 250 [μm], and preferably less than 200 [μm]. Hence in this case, z1=170 [μm].

In either case, to detect the image quality as shown by the flowchart in FIG. 54, to be described below, an image quality detection function may be realized by a computer program comprising a step of forming an image pattern on the aforementioned image carrier, a step of irradiating the image pattern with a spot light, a step of scanning the image pattern with the spot light to detect the amount of light that is reflected by the image pattern, and a step of detecting the image quality on the basis of the detected light amount. This computer program is used after having been recorded onto a computer-readable recording medium, or downloaded from a server or the like via a network.

Note that this control is executed by a CPU of the control circuit of the image forming apparatus MFP on the basis of an output signal from the signal generating circuit 940 of the image quality detecting apparatus 900. The CPU executes the various processes on the basis of a ROM, not shown in the drawing, or a downloaded program, using a RAM, not shown in the drawing, as a work area. The program data are downloaded to a storage device such as a hard disk, not shown in the drawing, or upgraded from a server via a network, not shown in the drawing, or from a recording medium such as a CD-ROM or SD card, for example, via a recording medium driving device, not shown in the drawing.

Figure 53:
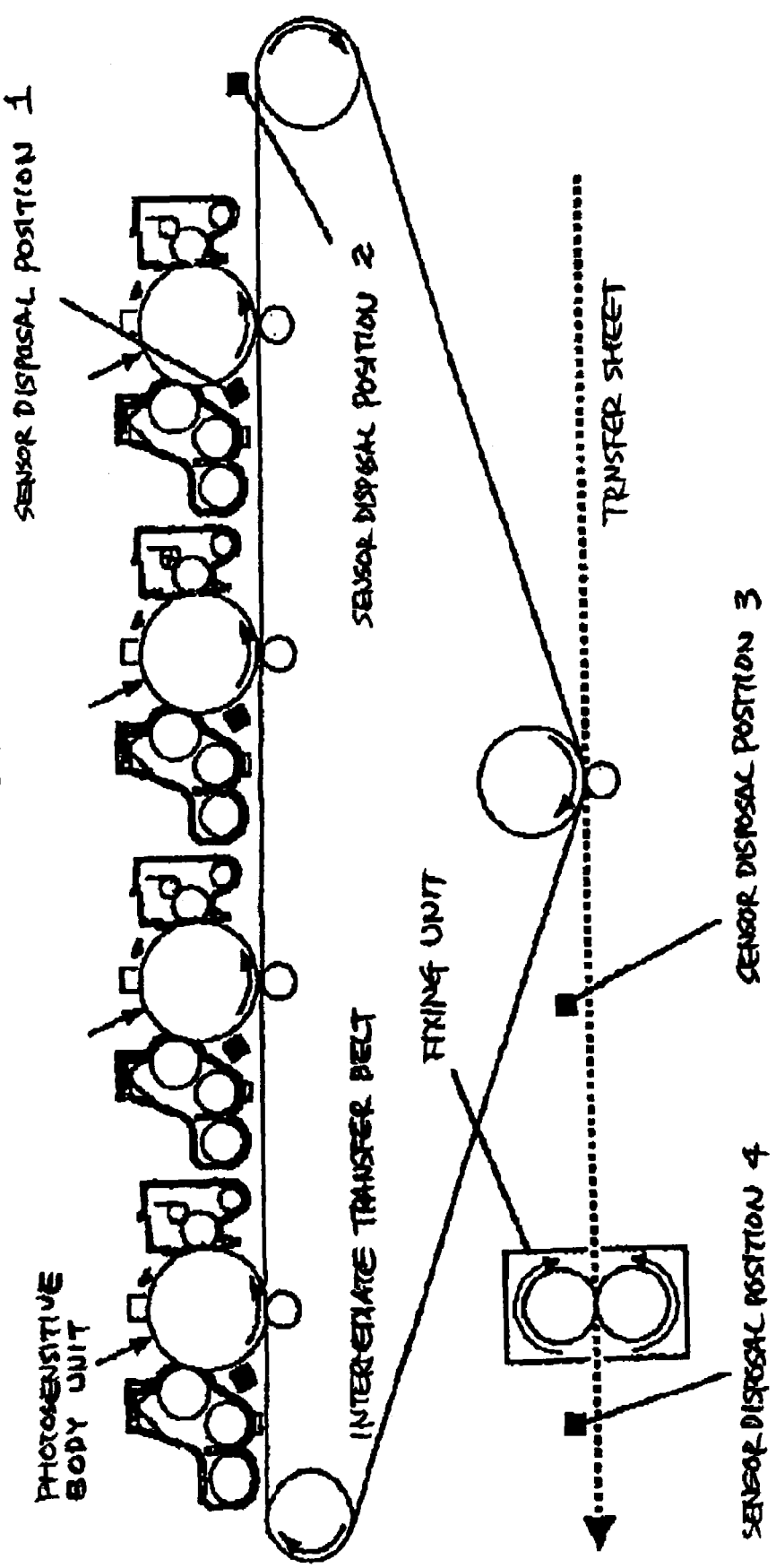
FIG. 53 is a view showing disposal positions of an image quality sensor (image quality detecting means)

FIG. 53 shows the disposal positions of the image quality sensor (image quality detecting means). A disposal position 1 is on the photosensitive body, a disposal position 2 is on the intermediate transfer belt, a disposal position 3 is on an unfixed image on the transfer paper, and a disposal position 4 is on a fixed image on the transfer paper. As described above, the disposal position 4 is ideal, but in this case, the patch pattern for detecting the image quality must be formed on the transfer paper, and hence may be unacceptable to the user. When the image quality sensor is disposed on the photosensitive body or the intermediate transfer belt, the formed toner image can be cleaned by the cleaning devices disposed on the respective photosensitive bodies, and hence these disposal positions are unproblematic in terms of the load (transfer paper) on the user. In this case, however, the final output image cannot be checked, and hence when the image quality is detected at the sensor disposal position 2, for example, the state of the image forming apparatus must be determined comprehensively after adding individual information such as the secondary transfer current value, the fixing temperature, and the transfer paper conditions.

Figure 54:
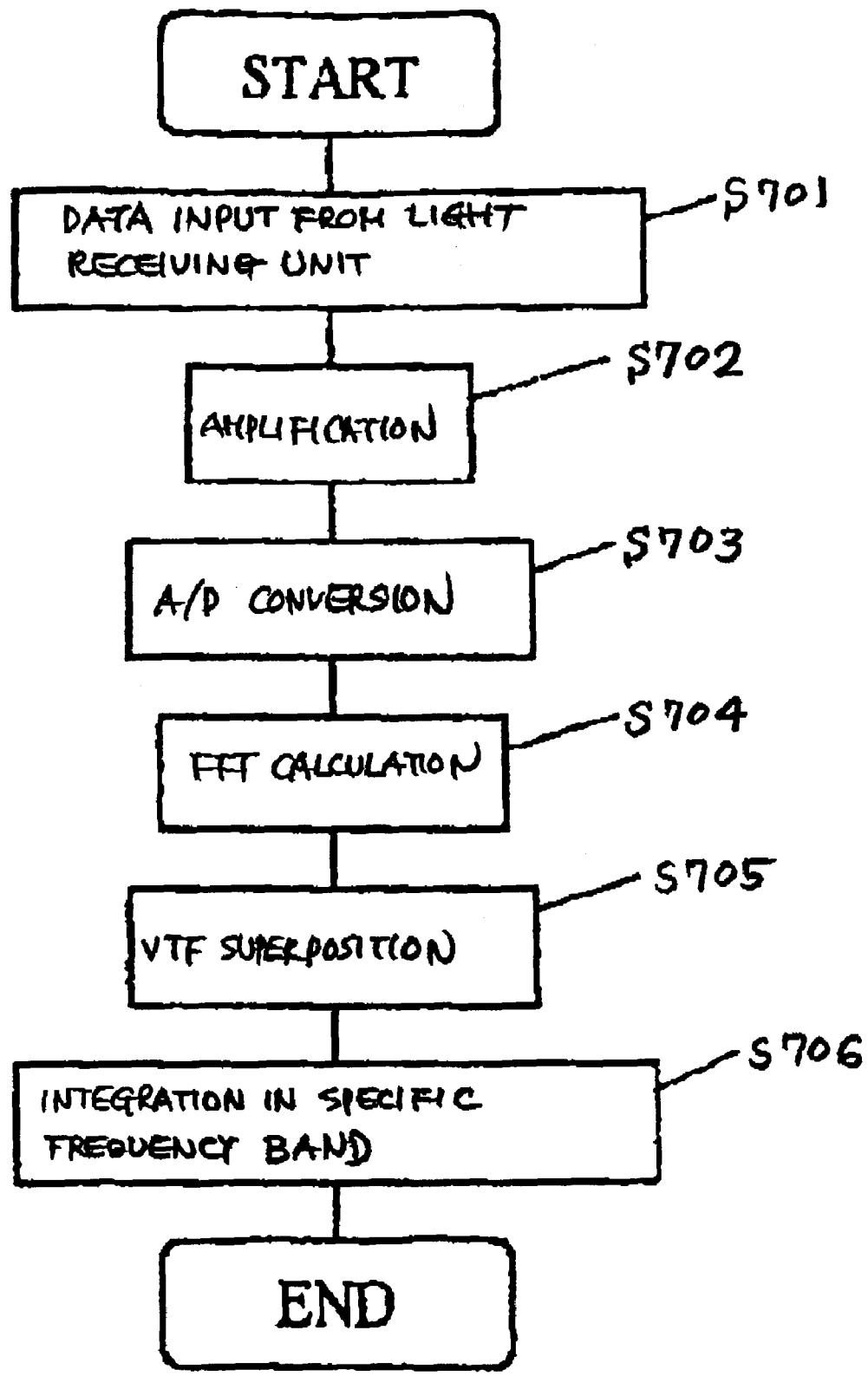
FIG. 54 is a flowchart showing the flow of data processing by the image quality sensor.

FIG. 54 is a flowchart showing the flow of data processing in the image quality sensor.

The output of a light receiving unit (step S701) which receives light from the CCD sensor 903, spot light sensor, or the like is amplified to a desired value by the amplifier (amplifying circuit) 920 (step S702), and this value is converted into digital data by an A/D converter (step S703). Fourier transformation (FFT calculation) is then performed by the calculation circuit 930 (step S704) to obtain frequency band data. The VTF, which is the human sight characteristic, is then superposed onto the frequency band data (step S705), whereupon the data for the frequency band that is perceivable to the human eye are weighted. Finally, only the data for the frequency band that is sensitive to the human eye are integrated (step S707), and thus a numerical value of the image quality is obtained.

Thus image quality information is obtained. However, it is a fact that different levels of image quality are demanded by users. In normal office use, the required degree of image quality is not so high, but in a design-related office, a corresponding degree of image quality is required. In other words, a corresponding image quality threshold must be set for a user who demands high image quality, and the machine must be determined as abnormal when the threshold is exceeded. Hence, allowable image quality information of the user must be pre-stored as a threshold in storage means within the apparatus to serve as a reference for determining whether or not the image quality detected and calculated by the image quality detecting means is normal. This allowable image quality information may be determined by showing the user image quality samples upon delivery of the apparatus, for example, and may then be stored in the storage means of the image forming apparatus through input by a serviceperson, by reading the image quality samples with a scanner, or by a similar method.

When a plurality of types of information are obtained continuously in order to calculate the calculation parameter using the threshold of the allowable image quality information determined for each user as a reference, the threshold of the allowable image quality information may be determined by a method such as that described above. A flowchart used when information is obtained continuously using the threshold as a reference is as shown in FIG. 42. At the first condition bifurcation "Is the state of the machine normal?" (step S502), the image quality detected by the image quality detecting apparatus 900 is compared to the threshold of the allowable image quality information for each user, stored in advance in the storage means. If the image quality is equal to or less than the threshold, the apparatus is determined to be normal, and if not, the apparatus is determined to be abnormal. Information is obtained continuously only when the apparatus has been determined to be normal. When the apparatus is determined to be abnormal, repairs are performed separately, whereupon information obtaining is resumed (steps S501 to S503). As normal data accumulate, the data accumulation amount or accumulation period reaches a prescribed amount, whereupon the calculation parameter is derived therefrom and fixed (steps S503 to S506). Once the calculation parameter has been fixed, there is no longer any need to gather normal data for the calculation parameter, and hence the state of the image forming apparatus MFP no longer need be determined by the image quality detecting apparatus 900. Hence in the present invention, the image quality detecting apparatus 900 is constituted separately to the main body of the image forming apparatus MFP as an additional unit which may be detached from the main body of the image forming apparatus following determination of the calculation parameter after the image forming apparatus MFP has operated on the market for a fixed time period.

The image quality detecting means serving as an additional unit may be loaned to the user from a maker, for example, and removed by the maker when it is no longer needed. The merits of this on the user side are that by installing the additional unit for a fixed time period, a function is obtained for predicting the occurrence of an abnormality by determining the state of the machine, by removing the unit once this function has been established, space is not occupied by the unit, the unit need not be purchased, and so on. The merits on the maker side are that the image quality detecting means can be recycled, the image quality detecting means do not have to be sold to the user, and so on. It may be said that these merits are closer to business model merits than technological merits.

Figure 55:
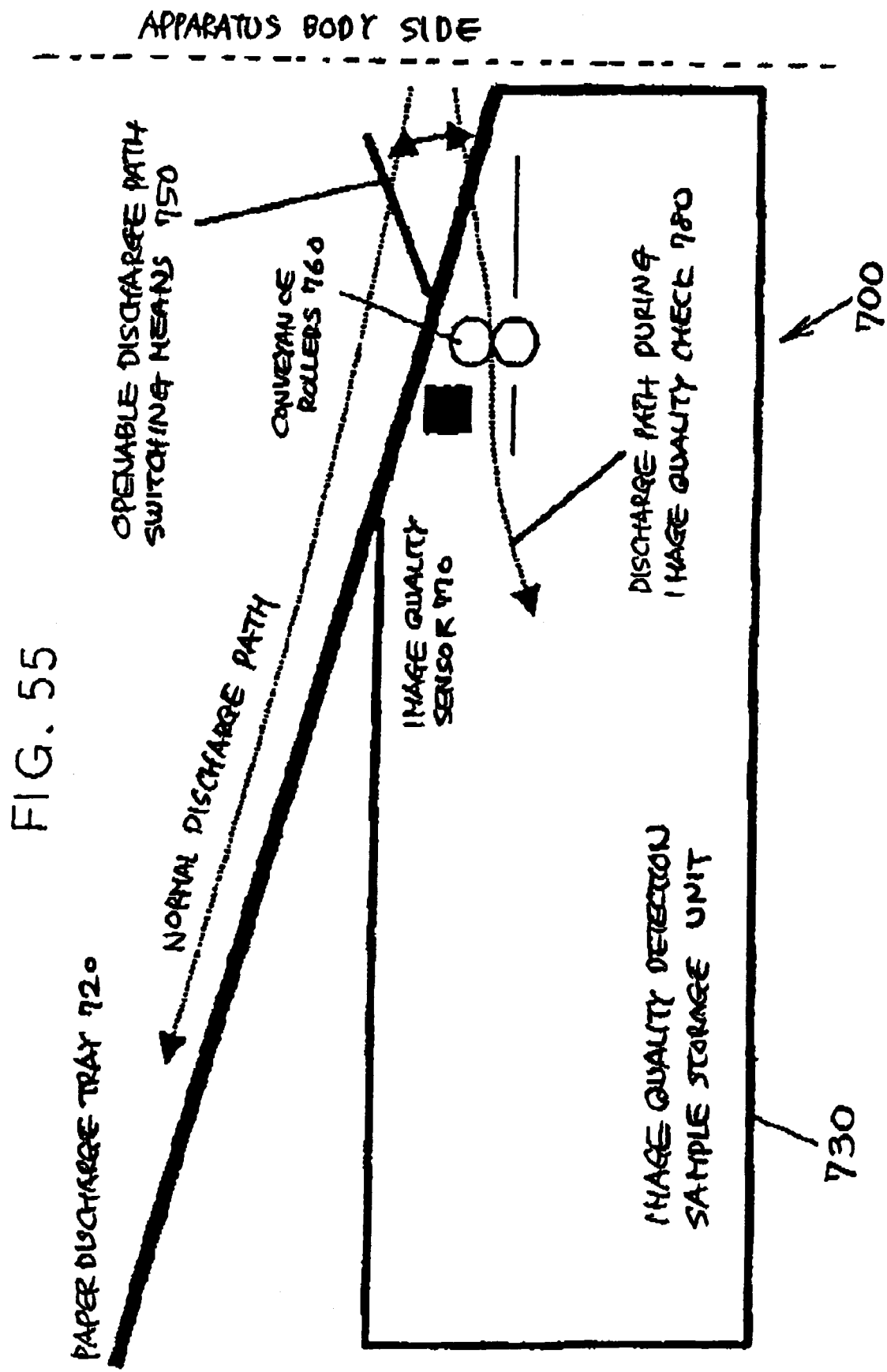
FIG. 55 is a view showing a specific constitutional example of an additional unit when the image quality detecting means are constituted separately as an additional unit.

FIG. 55 is a view showing an example of the specific constitution of the image quality detecting apparatus when constituted as a separate additional unit 700.

In this example, the additional unit 700 has both a paper discharge tray function and an image quality detecting function. A conventional paper discharge tray 720 onto which paper is discharged along a normal discharge path 710 is disposed on top of the additional unit 700, and a box-shaped container 730 is disposed therebelow. The additional unit 700 is constituted similarly to a normal paper discharge tray that is attached to the main body of the image forming apparatus, and is also connected to the image forming apparatus main body side electrically. Accordingly, communication means are interposed between the two components in order to notify the image forming apparatus main body side of image quality detection information. During a normal printing operation, transfer paper is discharged onto the upper paper discharge tray 720. However, during an operation to gather normal data for the calculation parameter, an image quality detection mode is activated to determine the state of the image forming apparatus, and hence discharge path switching means 750 of the additional unit 700 open automatically to switch to a discharge path leading into the interior of the additional unit 700, or in other words an image quality detection discharge path 740.

Conveyance rollers 760 and an image quality sensor 770 are disposed at an inlet portion inside the additional unit 700, and the transfer paper carrying a patch pattern for image quality detection, which is conveyed from the image forming apparatus, is stabilized by the conveyance rollers 760 and thus drawn into the additional unit 700. The patch pattern is then read by the image quality sensor 770 disposed at the subsequent stage, whereupon a numerical value of the image quality is calculated by a calculation unit not shown in the drawing. Having passed the image quality detection sensor 770 unit, the transfer paper is stacked onto an image quality detection sample storage unit 780. The volume of the image quality detection sample storage unit 780 is determined in accordance with the time required to gather the plurality of types of information for calculating the calculation parameter, and hence the user does not have to remove the sample following detection. Once sufficient data have been gathered, the additional unit 700 is removed together with the image quality detection samples stacked in its interior, whereupon the normal paper discharge tray 720 is disposed in its place.

Note that the image quality calculating unit may be disposed in the vicinity of the image quality sensor, or the calculation unit of the image forming apparatus main body may be used. Moreover, although not illustrated in detail in the drawing, the additional unit comprising the image quality sensor may be attached in an easily removable manner in the image quality sensor disposal positions shown in FIG. 53, and removed by a serviceperson after use. In this case, the additional unit functions only as an image quality sensor, but may be used satisfactorily as long as it is disposed so as to be easily removable.

Determining the fixed time period for gathering the calculation parameter data corresponds to the determination of "Have sufficient data accumulated?" in the step S505 of the flowchart in FIG. 42. When the time period is determined according to the number of output sheets, the determination condition of "Have sufficient data accumulated?" becomes a determination condition of "Have X sheets been printed?".

This method is considered the most straightforward. For example, data are gathered at fixed sheet number intervals while counting the number of sheets by monitoring the output of a discharge sensor or a write starting signal, and when a certain number of sheets has been reached, data gathering ends. In this case, the calculation parameter includes information relating to deterioration of the durability of the image forming apparatus when the apparatus is driven for a period corresponding to a fixed number of sheets. A case in which the time period is determined according to a integrated value of the photosensitive body rotation speed is similar conceptually to sheet number management.

In this case, the data gathering interval corresponds to an interval of a fixed rotation speed integrated value, and data gathering ends when a certain rotation speed integrated value is reached. In this case also, the calculation parameter comprises information relating to deterioration of the durability of the apparatus. These methods can be said to be data gathering methods using the operating time of the apparatus as a reference, and when employed, information relating to deterioration of the durability of the apparatus can be included as desired. However, variation in the disposal environment of the machine is believed to affect the gathered data, and when a data gathering method based on the operating time is employed, the influence of environmental variation may offset the data. In this case, if the apparatus is disposed in a different environment (or the environment changes greatly due to a change of season), the apparatus may be determined to be abnormal when operating normally. To avoid this, the time period may be determined by a number of operating days.

In this case, the reference is a number of days, and hence a method of gathering data at certain times and a certain number of times per day, for example, may be employed. When the reference is the number of operating days, the calculation parameter may include the effect of environmental variation during the set number of days. Particularly when the time period determined according to the number of operating days is set at one year, environmental information for all four seasons, spring, summer, fall, and winter, is incorporated into the calculation parameter, and hence the calculation parameter has a high degree of reliability in relation to environmental variation. However, the demerits of this are that a period of one year is too long (both as the period up to the beginning of fault prediction after fixing of the calculation parameter, and as the loan period of the image quality detecting means), and that variation occurs in the operating time of the machine, leading to irregularities in the effect of the durability deterioration information of the apparatus.

With a user who prints a small number of sheets, deterioration of the apparatus may not progress such that normal data can only be obtained in a small range. Conversely, with a user who prints a large number of sheets, deterioration of the apparatus may progress so far that a fault occurs, causing an obstruction to normal data gathering. Alternatively, the time period may be set up to the point at which the amount of data reaches an arbitrary value. In this case, the data gathering interval must be determined using a desired method (with the operating time or the number of days as a reference), but since the calculation parameter is derived from a fixed amount of normal data, the amount of parent population data is always sufficient. Moreover, the image quality detecting means may be removed as soon as the minimum required data amount has been secured, and hence the image quality detecting means can be operated efficiently. This method, in which the time period is based on the amount of gathered data, is believed to be most rational.

As described above, there are various ways of determining the time period, but in actuality, these methods may be combined. Basically, the amount of data for calculating the calculation parameter has a lower limit, and hence the most realistic method is presumably to gather data while counting the amount of data, and when the lower data amount limit is secured, define the time period based on the operating time or the number of days. In certain cases, the operating time reference and the number of days reference may also be combined.

When the plurality of types of obtained information and the detected and calculated image quality information are transmitted to an external information processing apparatus over a communication line, the external information processing apparatus refers to a printer sever or a monitoring center of a maker, for example. The aim of transmitting the gathered data to the external information processing apparatus is to determine a calculation parameter for a collective of image forming apparatuses using the data for a plurality of image forming apparatuses gathered in the external information processing apparatus. Since information from a plurality of image forming apparatuses is gathered in the external information processing apparatus, it is possible to determine, for example, a calculation parameter for an office floor unit, a calculation parameter for each industrial sector using the machine, a calculation parameter for each geographical area, a calculation parameter for each machine type, and so on.

By determining a calculation parameter for a collective of image forming apparatuses in this manner, a calculation parameter which is suited to each collective can be determined, thereby improving the reliability of state determination. Moreover, the state of the plurality of image forming apparatuses can be learned with a certain fixed level as a reference, and this can be used to set an order of priority for serviceperson visits, for example.

According to this embodiment as described above, the following effects are achieved.

(1) Once the image forming apparatus has been shipped onto the market and is in a state of usage in the user environment, the parent population of the normal data set used to derive the calculation parameter is increased, and thus normal data sets achieving various balances under the influence of the user environment are included in the parent population. As a result, the reliability of state determination can be increased.

(2) Means for determining whether or not the image forming apparatus is in a normal state must be provided in order to gather data sets during a normal operation. By disposing image quality detecting means as these determining means, the determination as to whether or not the apparatus is normal can be made using an output image as a reference. As a result, data gathering can be performed continuously during a normal operation.

(3) The image quality detecting means quantify the image quality at the point of detection, but whether or not a user will be satisfied with the resulting image quality depends on the user. Hence, by researching the acceptable image quality level of the user during apparatus delivery, and storing this information as a threshold in storage means inside the apparatus, the state of the apparatus can be determined as normal or abnormal according to the image quality level demanded by the user. Further, by performing fault prediction corresponding to each user in a similar manner, measures can be taken before the user feels dissatisfied, and hence the number of printed sheets that are discarded due to poor image quality can be suppressed, which is meritorious in terms of saving resources.

(4) By gathering a plurality of types of data only when the image forming apparatus is determined to be in a normal state using the acceptable image quality of the user as a threshold, a calculation parameter corresponding to the image quality level required by the user is determined, and thus the state of the apparatus can be determined in accordance with each individual user.

(5) The image quality detecting means are used to derive the calculation parameter, and are therefore unnecessary once the calculation parameter has been determined. By constituting the image quality detecting means separately to the main body of the image forming apparatus as an external additional apparatus, the image quality detecting means can be removed by a service person after use. By loaning the image quality detecting means to the user, the user can obtain a function for predicting a fault in the machine automatically after a fixed time period, and need not keep the unnecessary apparatus attached to the machine on a permanent basis. The maker is able to reuse the image quality detecting means on an image forming apparatus newly introduced onto the market, and only has to manufacture the image quality detecting means as necessary. By reusing the image quality detecting means, the load on the environment is not increased.

(6) By defining the time period for the calculation parameter to stabilize according to an output number of sheets or an integrated value of the photosensitive body rotation speed, reflecting the actual operating state of the apparatus, the state of deterioration in the durability of the apparatus (an indication of the degree to which the apparatus deteriorates in relation to the usage amount) can be reflected in the calculation parameter.

(7) By defining the time period for the calculation parameter to stabilize according to a reference number of days, environmental variation, which causes disturbance, can be reflected in the calculation parameter. Particularly by setting the number of days at one year, temperature and humidity variation throughout the year can be reflected in the calculation parameter, and hence seasonal determination errors can be eliminated.

(8) The data from which the calculation parameter is derived are gathered while the image quality is determined to be normal by the image quality detecting means, and hence when the time period is defined by the number of output sheets or a reference number of days, the size of the parent data population cannot be prescribed. By setting the time period as a fixed period up to the point at which the parent data population for deriving the calculation parameter reaches a fixed size, the image quality detecting means can be reused efficiently.

(9) By transmitting the plurality of types of information regarding the image forming apparatus and the image quality information to an external information processing apparatus, the state of a plurality of image forming apparatuses can be monitored by the external information processing apparatus.

(10) By deriving a calculation parameter for a collective of image forming apparatuses in the external information processing apparatus using the information of a plurality of image forming apparatuses, calculation parameters can be derived for individual machine types, individual industry sectors of users, individual geographical areas, and so on, for example.

As described above, according to the third embodiment, determinations as to whether or not an operation of the image forming apparatus is normal are made by detecting the image quality of the final output paper using an image quality sensor, and hence the calculation parameter can be fixed at an arbitrary timing once a plurality of types of information has been obtained continuously over time on the market. As a result, elements showing signs of abnormality can be determined.

Various modifications will become possible for those skilled in the art after receiving the teachings of the present disclosure without departing from the scope thereof.

What is claimed is:

1. An abnormality determining method comprising:
an information storing step for storing information about an object in information storage means;
an information obtaining step for obtaining information about an object using information obtaining means; and
a determining step for determining the presence of an abnormality in a detection subject on the basis of the stored information in said information storage means and the obtained information obtained by said information obtaining means,
wherein, in said information storing step, a normal group data set, which is a collection of normal value combinations of grouped information constituted by a plurality of different types of information, is stored in said information storage means,
in said information obtaining step, at least two or more sets of grouped information, comprising first grouped information constituted by a plurality of different types of information and second grouped information having a different combination to that of said first grouped information, are obtained by said information obtaining means, and
in said determining step, a Mahalanobis distance is determined for each set of grouped information on the basis of said normal group data set and the obtained results of each set of grouped information, and used to determine the presence of an abnormality in the detection subject.

2. An abnormality determining method comprising:
an information obtaining step for obtaining information about an object using information obtaining means;
a determining step for determining the presence of an abnormality in a detection subject on the basis of the obtained information obtained by said information obtaining means;
a calculating step for performing a predetermined calculation on the basis of the obtained information obtained by said information obtaining means in said determining step; and
a comparing step for comparing the calculation result of said calculating step to a predetermined threshold, an abnormality being determined to be present when, in said comparing step, said calculation result has reached said threshold, exceeds said threshold, or falls below said threshold, wherein a general abnormality determining step for determining the presence of a general abnormality, which is capable of incorporating a plurality of types of abnormality, by comparing one of said calculation results obtained on the basis of a plurality of types of said obtained information to said threshold, and an individual abnormality determining step for determining, only when said general abnormality is determined as present in said general abnormality determining step, the presence of one of a plurality of types of abnormality that is incorporated into said general abnormality by comparing one of said calculation results obtained on the basis of at least one of said plurality of types of obtained information to said threshold, are implemented in said determining step, and initial setting is performed on at least one of a plurality of said thresholds, used individually in each of said individual abnormality determining steps, in accordance with information regarding a user of said detection subject.

3. The abnormality determining method as claimed in claim 2, wherein initial setting is performed on at least one of said plurality of thresholds used individually in each of said individual abnormality determining steps in accordance with information about the environment in which said detection subject is disposed.

4. The abnormality determining method as claimed in claim 2, wherein initial setting is performed on at least one of said plurality of thresholds used individually in each of said individual abnormality determining steps in accordance with information regarding the frequency of maintenance technician visits to a location in which said detection subject is disposed, or information regarding a distance from a maintenance service providing organization to said disposal location.

5. The abnormality determining method as claimed in claim 2, wherein, when said detection subject is replaced, said plurality of thresholds used individually in each of said individual abnormality determining steps for determining the presence of an abnormality in the new detection subject are set initially to respectively identical values to said plurality of thresholds used individually in each of said individual abnormality determining steps for determining the presence of an abnormality in the old detection subject.

6. The abnormality determining method as claimed in claim 2, wherein at least one of said plurality of thresholds used individually in each of said individual abnormality determining steps is updated in accordance with information regarding a repair request history of the user based on abnormality occurrence.

7. The abnormality determining method as claimed in claim 2, wherein a Mahalanobis distance is calculated as said calculation result in said calculating step of said general abnormality determining step, on the basis of a normal data set stored in said information storage means and the obtained information obtained by said information obtaining means, and said normal data set is updated on the basis of whether said general abnormality is determined to be present in said general abnormality determining step, and a result of an inspection of said detection subject.

* * * * *